(12) United States Patent
Li et al.

(10) Patent No.: US 11,265,415 B2
(45) Date of Patent: Mar. 1, 2022

(54) TERMINAL

(71) Applicant: Honor Device Co., Ltd., Guangdong (CN)

(72) Inventors: Chenlong Li, Shenzhen (CN); Xuanrui Fan, Beijing (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/260,676

(22) PCT Filed: Sep. 30, 2018

(86) PCT No.: PCT/CN2018/109102
§ 371 (c)(1),
(2) Date: Jan. 15, 2021

(87) PCT Pub. No.: WO2020/015202
PCT Pub. Date: Jan. 23, 2020

(65) Prior Publication Data
US 2021/0281673 A1     Sep. 9, 2021

(30) Foreign Application Priority Data
Jul. 17, 2018    (CN) .......................... 201810785836.5

(51) Int. Cl.
*H04M 1/72454*     (2021.01)
*H04M 1/02*        (2006.01)

(52) U.S. Cl.
CPC ..... *H04M 1/72454* (2021.01); *H04M 1/0266* (2013.01); *H04M 2250/12* (2013.01)

(58) Field of Classification Search
CPC ........... H04M 1/72454; H04M 1/0266; H04M 2250/12; H04M 1/0235; H04M 1/026; H04M 1/0277; H04M 1/0264; G01S 17/08; G01J 1/0204; G01J 1/0407; G01J 1/0271;
(Continued)

(56) References Cited

U.S. PATENT DOCUMENTS 9,536,322 B1 *   1/2017   Smith ...................... G06T 7/11
9,563,284 B2     2/2017   Zhao et al.
2010/0201822 A1  8/2010   Ichimura et al.
(Continued)

FOREIGN PATENT DOCUMENTS

CN    101807096 A    8/2010
CN    102377871 A    3/2012
(Continued)

*Primary Examiner* — Lewis G West
(74) *Attorney, Agent, or Firm* — Conley Rose, P.C.

(57) ABSTRACT

Embodiments of this application disclose a terminal. The terminal includes a bezel, a screen, a lampshade, and a proximity light assembly. A periphery of the screen is fixedly connected to the bezel. The bezel is provided with a through hole. The lampshade is located on an inner side of the bezel and partially accommodated in the through hole. The proximity light assembly is located on the inner side of the bezel. The proximity light assembly is configured to emit emitted light into the lampshade and receive induced light passing through the lampshade. The emitted light passes through the lampshade to form emergent light. The emergent light intersects with a plane on which the screen is located. The terminal has a relatively high screen-to-body ratio.

20 Claims, 33 Drawing Sheets

(58) Field of Classification Search
CPC .............. G06F 1/1684; G06F 3/0416; H04W 52/0209; H04W 52/0254; Y02D 30/70
See application file for complete search history.

(56) References Cited

U.S. PATENT DOCUMENTS

| | | | | |
|---|---|---|---|---|
| 2012/0300436 | A1* | 11/2012 | Hackett | F21S 9/037 362/127 |
| 2013/0023312 | A1* | 1/2013 | Staebler | H04M 1/04 455/575.1 |
| 2013/0147712 | A1 | 6/2013 | Zhou et al. | |
| 2017/0108206 | A1* | 4/2017 | Li | H02J 7/025 |
| 2018/0274758 | A1* | 9/2018 | Robarts | F21V 23/0435 |
| 2021/0281673 | A1 | 9/2021 | Li et al. | |

FOREIGN PATENT DOCUMENTS

| | | |
|---|---|---|
| CN | 102510423 A | 6/2012 |
| CN | 103369144 A | 10/2013 |
| CN | 103401961 A | 11/2013 |
| CN | 104243646 A | 12/2014 |
| CN | 104284012 A | 1/2015 |
| CN | 204928927 U | 12/2015 |
| CN | 105635462 A | 6/2016 |
| CN | 105892751 A | 8/2016 |
| CN | 106094990 A * | 11/2016 |
| CN | 106094990 A | 11/2016 |
| CN | 206223977 U | 6/2017 |
| CN | 107147756 A | 9/2017 |
| CN | 107770315 A | 3/2018 |
| CN | 107948422 A | 4/2018 |
| CN | 207460260 U | 6/2018 |
| CN | 108509088 A | 9/2018 |
| CN | 209419659 U | 9/2019 |
| EP | 2806331 A1 | 11/2014 |
| EP | 3166229 A1 | 10/2017 |
| JP | 2001305976 A | 11/2001 |
| JP | 2016034123 A | 3/2016 |
| KR | 101249960 B1 | 4/2013 |
| NO | 2012025029 A1 | 3/2012 |

* cited by examiner

TERMINAL

CROSS-REFERENCE TO RELATED APPLICATIONS

This application is a U.S. National Stage of International Patent Application No. PCT/CN2018/109102 filed on Sep. 30, 2018, which claims priority to Chinese Patent Application No. 201810785836.5 filed on Jul. 17, 2018, both of which are hereby incorporated by reference in their entireties.

TECHNICAL FIELD

This application relates to the field of electronic product technologies, and in particular, to a terminal.

BACKGROUND

With the rapid development of intelligent terminal products, users' requirements for display effects of the terminal products gradually increase. The design of full-screen (that is, a display with an ultra-narrow bezel) appearance has become a trend of current intelligent terminal products.

A screen of a conventional terminal includes a front cover and a display screen. The front cover includes a light-transmitting region in the middle and a non-light-transmitting edge region disposed around the light-transmitting region. The display screen is fastened to the light-transmitting region to perform display through the light-transmitting region. The terminal further includes a proximity light assembly. The proximity light assembly is disposed on a peripheral side of the display screen and close to the edge region of the front cover. Therefore, a light-outlet-and-inlet region needs to be disposed at a position that directly faces the proximity light assembly and is in the edge region. The edge region needs to be provided with the light-outlet-and-inlet region. As a result, it is difficult to reduce a width of the edge region, and a screen-to-body ratio of the terminal is low.

SUMMARY

Embodiments of this application provide a terminal. The terminal has a relatively high screen-to-body ratio.

An embodiment of this application provides a terminal. The terminal may be a mobile phone. The terminal includes a bezel, a screen, a lampshade, and a proximity light (proximity light) assembly. A periphery of the screen is fixedly connected to the bezel. The bezel has two openings substantially opposite to each other. The screen covers one of the two openings. The terminal further includes a back cover configured to cover the other one of the two openings. When a user uses the terminal, the screen faces the user, one side of the terminal provided with the screen is considered as the front of the terminal, one side of the terminal provided with the back cover is considered as the back of the terminal, and an outer surface of the bezel is considered as a peripheral side of the terminal.

The bezel is provided with a through hole. The through hole runs through the bezel to communicate with an inside space and an outside space of the bezel that are opposite to each other. A side opening of the through hole is disposed on the outer surface of the bezel. The lampshade is located on an inner side of the bezel and partially accommodated in the through hole. The lampshade can transmit light. Light on the inner side of the bezel can be transmitted to an outer surface of the bezel after passing through the through hole through the lampshade. The light on the outer side of the bezel can also be transmitted to the inner side of the bezel after passing through the through hole through the lampshade.

The proximity light assembly is located on the inner side of the bezel. The proximity light assembly is configured to emit emitted light into the lampshade and receive induced light passing through the lampshade. The emitted light passes through the lampshade to form emergent light. The proximity light assembly includes an emitter and a receiver. The emitter is configured to emit the emitted light. The emitted light may be invisible light such as infrared light. The receiver is configured to receive the induced light to form a corresponding electrical signal. The emergent light is reflected by an obstacle to form reflected light. A part of the reflected light passes through the lampshade to form the induced light.

The emergent light intersects with a plane on which the screen is located. That is, the emergent light is inclined toward a direction close to the screen. Because the emergent light intersects with the plane on which the screen is located, when the user uses the terminal and gets close to the screen, the emergent light can be directed at the user. The emergent light is reflected by the user to form reflected light. A part of the reflected light passes through the lampshade to form induced light. The proximity light assembly receives the induced light to form a corresponding signal. The terminal can determine a distance between the user and the screen through the signal, thereby turning off or turning on the screen.

In this embodiment of this application, the terminal can change a direction of light through an optical refraction effect of the lampshade so that the emitted light emitted by the proximity light assembly passes through the lampshade to form the emergent light, and the emergent light intersects with the plane on which the screen is located. The emergent light can be emitted to an obstacle located in front of or in contact with the screen to detect an approaching state of the obstacle. Because the through hole is disposed on the bezel and the lampshade is partially accommodated in the through hole, the light can pass through the through hole through the lampshade, so that the proximity light assembly located on the inner side of the bezel implements detection. In other words, the terminal transmits and receives light through the through hole on the bezel, and the screen does not need to reserve a space in an edge region thereof to allow the light to come in and go out. A width of the edge region thereof is reduced and the screen even has no bezel, and a display region of the screen is increased, so that a screen-to-body ratio (screen-to-body ratio) of the terminal is relatively high. In an embodiment, the terminal can achieve full screen display, and the screen-to-body ratio of the terminal is greater than 90%.

The emitter of the proximity light assembly may be an infrared light emitting diode (light emitting diode, LED) or a vertical-cavity surface-emitter laser (vertical-cavity surface-emitter laser, VCSEL).

The screen includes a front cover and a display screen fastened to the front cover. A glass material may be used for the front cover. The display screen may be a liquid crystal display (liquid crystal display, LCD), or an organic light-emitting diode (organic light-emitting diode, OLED) display screen. In this embodiment of this embodiment, the proximity light assembly is located below the screen. A projection of the proximity light assembly on the front cover partially or wholly overlaps with that of the display screen on the front cover.

The receiver of the proximity light assembly has an induction surface. The induction surface is used to receive the induced light. A direction of the emitted light emitted by the emitter is substantially perpendicular to the induction surface.

In an optional embodiment, the lampshade includes a first surface and a second surface disposed opposite to each other. The first surface is flush with the outer surface of the bezel. In other words, the first surface transits to the outer surface of the bezel in a flush manner. For example, if the outer surface of the bezel is flat, the first surface is also flat if the outer surface of the bezel has a radian, the first surface also has a radian, and the radian is consistent with that of the outer surface of the bezel.

The emitted light enters the lampshade through the second surface. The emergent light exits the lampshade through the first surface. When the emergent light is reflected by an obstacle to form reflected light, the reflected light enters the lampshade through the first surface. The reflected light emits the induced light from the second surface after being refracted through the lampshade.

In this embodiment, because the first surface is flush with the outer surface of the bezel, the terminal has a high aesthetic appearance, and it is not easy to accumulate dust and other dirt between the first surface and the outer surface of the bezel.

The appearance of the first surface is black. The outer surface of the bezel may also be black, so that the first surface well matches the outer surface of the bezel in appearance.

In an optional embodiment, an angle greater than or equal to 25° is formed between the emergent light and the plane on which the screen is located. For ease of understanding, in this embodiment of this application, the angle formed between the emergent light and the plane on which the screen is located is defined as a front inclination angle. In this embodiment of this application, an acute angle is formed between the emergent light and the plane on which the screen is located. That is, when the emergent light has an acute front inclination angle, the emergent light tilts toward the screen at a sufficient angle, so that the emergent light can better cover a space range that needs to be detected by the proximity light assembly, so as to meet use requirements of the terminal. When the angle formed between the emergent light and the plane on which the screen is located is greater than or equal to 25°, the emergent light can basically cover the space range that needs to be detected by the proximity light assembly. In this embodiment of this application, a detection effect of the proximity light assembly when the proximity light assembly emits and receives light through the through hole on the bezel is relatively close to a detection effect of the proximity light assembly that emits and receives light through the periphery of the screen in a conventional solution.

When sensitivity of the proximity light assembly is unchanged, a larger angle formed between the emergent light and the plane on which the screen is located indicates a longer actual sensed distance of the proximity light assembly in a direction perpendicular to the plane on which the screen is located, and a higher actual proximity detection success rate.

In an optional embodiment, the bezel includes a top surface and a bottom surface disposed opposite to each other. The top surface and the bottom surface are a part of the outer surface of the bezel. The outer surface of the bezel further includes a left side surface and a right side surface disposed opposite to each other, and the left side surface and the right side surface each are connected between the top surface and the bottom surface. When the user uses the terminal, the top surface is substantially upward, the bottom surface is substantially downward, the left side surface is close to a left-hand side of the user, and the right side surface is close to a right-hand side of the user.

A side opening of the through hole is disposed on the top surface. The lampshade and the proximity light assembly are disposed at the top of the terminal. A perpendicular direction of the top surface toward the bottom surface is a vertical direction. In this embodiment of this application, a vertical direction of the terminal is defined as Y direction; a horizontal direction of the terminal is defined as X direction, and a perpendicular direction of the left side surface toward the right side surface is the horizontal direction; a thickness direction of the terminal is defined as Z direction, and a direction substantially perpendicular to the screen is the thickness direction. The X direction, the Y direction, and the Z direction are perpendicular to each other. A plane on which the X direction and the Y direction are located is an XY plane. A plane on which the X direction and the Z direction are located is an XZ plane. A plane on which the Y direction and the Z direction are located is a YZ plane. The XY plane, the NZ plane, and the YZ plane are perpendicular to each other.

A section of the lampshade in the vertical direction includes a first reference plane perpendicular to the screen. The lampshade includes a plurality of sections parallel to the vertical direction and perpendicular to the screen. The first reference plane is one of the plurality of sections. The first reference plane is parallel to the YZ plane. The first surface intersects with the first reference plane to form a first intersection line. The second surface intersects with the first reference plane to form a second intersection line. The first intersection line is parallel to the second intersection line. An emission direction of the emitted light intersects with the plane on which the screen is located.

In this embodiment, because the first intersection line is parallel to the second intersection line, light passing through the first surface and the second surface may not or almost not deflect in the direction of the first reference plane, that is, the light may not deflect in the YZ plane. In other words, in the YZ plane, when the emitted light passes through the lampshade to form the emergent light, the direction of the emergent light is substantially the same as the direction of the emitted light, so as to ensure relatively low optical noise and avoid affecting the normal use of the receiving performance of the proximity light assembly. The direction of the emitted light intersects with the plane on which the screen is located, and then the direction of the emergent light also intersects with the plane on which the screen is located. An angle greater than or equal to 25° may be formed between the direction of the emitted light and the plane on which the screen is located.

In an optional embodiment, an angle greater than or equal to 45° is formed between the emergent light and the plane on which the screen is located. In this embodiment of this application, when the front inclination angle of the emergent light is greater than or equal to 45°, the proximity sensing performance of the proximity light assembly can be significantly improved. The front inclination angle of the emergent light may be greater than or equal to 60°, and the proximity sensing performance of the proximity light assembly can achieve or be better than the performance of the proximity light assembly emitting and receiving light through the periphery of the screen in the conventional solution.

In an optional embodiment, the bezel includes a top surface and a bottom surface disposed opposite to each other. The through hole is disposed on the top surface. A perpendicular direction of the top surface toward the bottom surface is a vertical direction.

A section of the lampshade in the vertical direction includes a first reference plane perpendicular to the screen. The first surface intersects with the first reference plane to form a first intersection line. The second surface intersects with the first reference plane to form a second intersection line. The first intersection line and the second intersection line gradually move away from each other in a direction close to the screen. In other words, a first angle is firmed between the first intersection line and the second intersection line, and an opening of the first angle is toward the screen.

In this embodiment, because the first intersection line and the second intersection line gradually move away from each other in the direction close to the screen, light passing through the first surface and the second surface may deflect in the direction of the first reference plane toward the direction close to the screen, that is, the light deflects in the YZ plane toward the direction close to the screen, so as to increase the front inclination angle of the emergent light to improve the proximity sensing performance of the proximity light assembly.

The lampshade forms a structure similar to a prism through a relative position relationship between the first surface and the second surface, so that the light is refracted when passing through the lampshade, thereby changing a direction of a light path. Moreover, through a relative position relationship between the first surface, the second surface, and the screen, the lampshade causes the light passing through the lampshade to be closer to the screen, thereby increasing the front inclination angle of the emergent light.

The emitted light emitted by the proximity light assembly may be obliquely emitted into the second surface, and an emission angle of the emitted light intersects with the plane on which the screen is located. The emitted light deflects toward a direction close to the screen for the first time when entering the first surface, and deflects toward the direction close to the screen for the second time when the light exits the second surface and forms the emergent light, so that the emergent light has a larger front inclination angle.

The emitted light emitted by the proximity light assembly is perpendicularly emitted into the second surface. In this case, a light path when the emitted light enters the first surface hardly changes, and the light deflects toward the direction close to the screen when passing through the second surface to form the emergent light, so that the emergent light has a larger front inclination angle. In this embodiment, because the emitted light is perpendicularly emitted into the second surface, a reflection loss of the emitted light is small and light utilization is high. An induction surface of the proximity light assembly is substantially parallel to the second surface, and a distance between the proximity light assembly and the second surface may be relatively small, so that arrangement between the proximity light assembly and the lampshade is more compact.

In an optional embodiment, an included angle greater than or equal to 45° is formed between the first intersection line and the second intersection line. In this embodiment, when the included angle between the first intersection line and the second intersection line is greater than or equal to 45°, the front inclination angle of the emergent light passing through the lampshade may be relatively large, thereby meeting use requirements.

In an optional embodiment, both the first surface and the second surface are perpendicular to the first reference plane. In this case, when the first intersection line is parallel to the second intersection line, the first surface is parallel to the second surface, a light path after the light passes through the first surface and the second surface may not or almost not deflect, and optical noise when the light passes through the lampshade is relatively low. When the first intersection line and the second intersection line gradually move away from each other in the direction close to the screen, the first surface and the second surface also gradually move away from each other in the direction close to the screen, an included angle is formed between the first surface and the second surface, the lampshade forms a structure similar to a prism, and the light further deflects toward the direction close to the screen after passing through the first surface and the second surface.

In an optional embodiment, the bezel includes a left side surface and a right side surface disposed opposite to each other. The left side surface and the right side surface each are connected between the top surface and the bottom surface. A center plane of the left side surface and the right side surface is an axial surface. A distance between the axial surface and the left side surface is substantially equal to that between the axial surface and the right side surface.

An axis of the through hole is located on the axial surface. Because the lampshade is partially accommodated in the through hole, the position of the lampshade is defined by the through hole. When the axis of the through hole is located in the axial surface, the lampshade is located in a middle position of the terminal. Because a side opening of the through hole is disposed on the top surface of the bezel, the lampshade is located in a middle position at the top of the terminal, that is, the proximity light assembly performs detection through the middle position at the top of the terminal. In this case, when the user answers a call, the proximity light assembly can give consideration to experience of left and right hands and ears of the user, and ensure better proximity sensing performance.

Alternatively, an axis of the through hole is located between the axial surface and the left side surface, and a distance between the axis of the through hole and the axial surface is less than that between the axis of the through hole and the left side surface; or an axis of the through hole is located between the axial surface and the right side surface, and a distance between the axis of the through hole and the axial surface is less than that between the axis of the through hole and the right side surface.

In this embodiment, although the axis of the through hole deviates from the axial surface, the through hole is still located in a position close to the axial surface, so that the lampshade can be located in a position close to the middle of the terminal. Because a side opening of the through hole is disposed on the top surface of the bezel, the lampshade is located in a position close to the middle of the top of the terminal, that is, the proximity light assembly performs detection through the position close to the middle of the top of the terminal. In this case, when the user answers a call, the proximity light assembly can give consideration to experience of left and right hands and ears of the user, and ensure better proximity sensing performance.

In an optional embodiment, the bezel further includes a left side surface and a right side surface disposed opposite to each other. The left side surface and the right side surface each are connected between the top surface and the bottom surface. A center plane of the left side surface and the right side surface is an axial surface.

The axis of the through hole and the axial surface are arranged at an interval. The section of the lampshade in the vertical direction includes a second reference plane parallel to the screen. The lampshade includes a plurality of sections parallel to the vertical direction and parallel to the screen. The second reference plane is one of the plurality of sections. The second reference plane is parallel to the XY plane. The second reference plane is perpendicular to the first reference plane. The first surface intersects with the second reference plane to form a third intersection line, the second surface intersects with the second reference plane to form a fourth intersection line, and the third intersection line and the fourth intersection line gradually move away from each other in a direction close to the axial surface. In other words, a second angle is formed between the third intersection line and the fourth intersection line, and an opening of the second angle is toward the axial surface.

In this embodiment of this application, when the lampshade and the proximity light assembly cannot be arranged in the middle of the terminal (for example, to avoid a device such as a receiver arranged in the middle), the lampshade and the proximity light assembly may be arranged close to the middle of the terminal. Because the third intersection line and the fourth intersection line gradually move away from each other in a direction close to the axial surface, light passing through the first surface and the second surface may deflect in the direction of the second reference plane toward the direction close to the axial surface, that is, the light deflects in the XY plane toward the direction close to the middle position of the terminal, so that the proximity light assembly can detect a space in front of the middle position of the terminal to give consideration to experience of left and right hands and ears of the user and ensure better proximity sensing performance.

In this embodiment of this application, the terminal may cause, through the relative position relationship between the first surface and the second surface of the lampshade and the relative position relationship between the first surface, the second surface, and the plane on which the screen is located, the light passing through the first surface and the second surface to deflect in the YZ plane toward the direction close to the screen, thereby achieving front inclination. The terminal may further cause, through the relative position relationship between the first surface and the second surface of the lampshade and the relative position relationship between the second surface and the axial surface, the light passing through the first surface and the second surface to deflect in the XY plane toward a direction close to a middle position of the terminal, thereby implementing detection on the middle position of the terminal. Thus, the light can deflect in both the YZ plane and the XY plane through the setting of the first surface and the second surface of the lampshade, an exit angle of the emergent light of the proximity light assembly after superimposition of the two not only ensures deflection toward the direction close to the screen, but also ensures an effect of deflection toward the direction close to the axial surface, thereby ensuring reliability of detection of the proximity light assembly in terms of two dimensional spaces.

In an optional embodiment, the bezel includes a top surface and a bottom surface disposed opposite to each other. The through hole is disposed on the top surface. A perpendicular direction of the top surface toward the bottom surface is a vertical direction. The second surface includes an incident region and an exit region. The incident region and the exit region may be disposed adjacent to each other or arranged at an interval. The emitted light is emitted into the lampshade through the incident region. The induced light exits the lampshade through the exit region.

A section of the lampshade in the vertical direction includes a third reference plane and a fourth reference plane that are perpendicular to the screen. The lampshade includes a plurality of sections parallel to the vertical direction and perpendicular to the screen. The third reference plane is one of the plurality of sections, and the fourth reference plane is another one of the plurality of sections. The third reference plane and the fourth reference plane are arranged at an interval. The third reference plane and the fourth reference plane are parallel to the YZ plane. The incident region intersects with the third reference plane to form a fifth intersection line. The first surface intersects with the third reference plane to form a sixth intersection line. The exit region intersects with the fourth reference plane to form a seventh intersection line. The first surface intersects with the fourth reference plane to form an eighth intersection line.

The fifth intersection line and the sixth intersection line gradually move away from each other in a direction close to the screen. The seventh intersection line and the eighth intersection line gradually move away from each other in the direction close to the screen, and an included angle between the seventh intersection line and the eighth intersection line is less than that between the fifth intersection line and the sixth intersection line. An included angle between the fifth intersection line and the sixth intersection line is a third angle, and an opening of the third angle is toward the screen. An included angle between the seventh intersection line and the eighth intersection line is a fourth angle, and an opening of the fourth angle is toward the screen. The fourth angle is less than the third angle.

In this embodiment, because the fifth intersection line and the sixth intersection line gradually move away from each other in the direction close to the screen, light passing through the incident region and the first surface deflects by a first angle toward the direction close to the screen in the YZ plane. Because the seventh intersection line and the eighth intersection line gradually move away from each other in the direction close to the screen, light passing through the exit region and the first surface deflects by a second angle toward the direction close to the screen in the YZ plane. Because the included angle between the seventh intersection line and the eighth intersection line is less than that between the fifth intersection line and the sixth intersection line, the second angle is less than the first angle. The lampshade enables the light passing through the incident region and the first surface to deflect by a sufficient angle toward the direction close to the screen. The emergent light has a relatively large front inclination angle. Moreover, the induced light passing through the first surface and the exit region is deflected to be smoothly received by the proximity light assembly, but a deflection angle of the induced light is relatively small, so as to reduce refraction attenuation of the induced light.

Alternatively, the fifth intersection line and the sixth intersection line gradually move away from each other in the direction close to the screen. An included angle between the fifth intersection line and the sixth intersection line is a third angle, and an opening of the third angle is toward the screen. The seventh intersection line is parallel to the eighth intersection line.

In this embodiment, because the fifth intersection line and the sixth intersection line gradually move away from each other in the direction close to the screen, light passing through the incident region and the first surface deflects by a first angle toward the direction close to the screen in the YZ plane. Because the seventh intersection line is parallel to the eighth intersection line, the light passing through the exit region and the first surface does not deflect or almost does not deflect in the YZ plane. The lampshade enables the light passing through the incident region and the first surface to deflect by a sufficient angle toward the direction close to the screen. The emergent light has a relatively large front inclination angle. Moreover, the induced light passing through the first surface and the exit region does not deflect or almost does not deflect, thereby reducing refraction attenuation of the induced light.

When the seventh intersection line and the eighth intersection line gradually move away from each other in the direction close to the screen, the exit region may be parallel to an induction surface of the receiver of the proximity light assembly, so that an induction direction of the receiver is perpendicular to the exit region to reduce refraction attenuation of the induced light.

In an optional embodiment, both the first surface and the second surface are perpendicular to the third reference plane. In this case, when the fifth intersection line and the sixth intersection line gradually move away from each other in the direction close to the screen, the incident region and the first surface also gradually move away from each other in the direction close to the screen, an included angle is formed between the incident region and the first surface, a partial structure between the incident region and the first surface forms a structure similar to a prism, and the light further deflects toward the direction close to the screen after passing through the incident region and the first surface. When the seventh intersection line and the eighth intersection line gradually move away from each other in the direction close to the screen, the exit region and the first surface also gradually move away from each other in the direction close to the screen, an included angle is formed between the exit region and the first surface, a partial structure between the exit region and the first surface forms a structure similar to a prism (the induction surface of the proximity light assembly may be parallel to the exit region), and the light can deflect toward a direction away from the screen after passing through the first surface and the exit region, so as to be received by the proximity light assembly.

In another embodiment, the fifth intersection line and e sixth intersection line may also gradually move away from each other in the direction close to the screen. A middle region of the seventh intersection line and the eighth intersection line protrudes toward a direction in which the seventh intersection line and the eighth intersection line depart from each other. In this case, a structure similar to a prism is substantially formed between the incident region and the first surface, and a structure similar to a convex lens is substantially formed between the exit region and the first surface.

In an optional embodiment, the lampshade includes a fixed portion and an embedded portion fixedly connected to the fixed portion. The fixed portion and the embedded portion may be integrally formed. The fixed portion is located on the inner side of the bezel. The embedded portion is partially or wholly accommodated in the through hole. An end face that is of the embedded portion and that is away from the fixed portion includes the first surface. In other words, the first surface may be a part of the end face or may be all of the end face. In this embodiment of this application, the first surface being the end face is taken as an example to improve utilization of the end face, so that an area of an opening that is disposed on the outer surface of the bezel and is of the through hole is relatively small. An end face that is of the fixed portion and that is away from the embedded portion is provided with an inward mounting slot. A bottom wall of the mounting slot includes the second surface. The second surface may be a part of the bottom wall of the mounting slot. The proximity light assembly is accommodated in the mounting slot. In other words, a recessed cavity is formed on one side that is of the fixed portion and that is away from the embedded portion, and the proximity light assembly is accommodated in the cavity.

In this embodiment, the proximity light assembly is accommodated in the mounting slot, and the proximity light assembly is substantially embedded inside the lampshade, thereby improving the utilization of the light. At the same time, the proximity light assembly and the lampshade may also be assembled to achieve modularization, thereby simplifying a whole machine assembly process of the terminal.

In an optional embodiment, the fixed portion includes a fixed surface. The embedded portion is located on the fixed surface. The embedded portion is a projecting portion convexly disposed on the fixed surface. The embedded portion includes a limiting surface. The limiting surface is connected between the fixed surface and the end face that is of the embedded portion and that is away from the fixed portion. That is, the limiting surface is connected between the fixed surface and the first surface. The limiting surface is a peripheral surface of the embedded portion.

The lampshade further includes a light-absorbing layer. The light-absorbing layer is capable of absorbing infrared light. The light-absorbing layer covers a part or all of the limiting surface and the fixed surface. Coverage of the light-absorbing layer includes, but is not limited to the following: the light-absorbing layer may cover a part of the limiting surface, cover a part of the fixed surface, cover a part of the limiting surface and a part of the fixed surface, cover all of the limiting surface, cover all of the fixed surface, cover all of the limiting surface and all of the fixed surface, cover a part of the limiting surface and all of the fixed surface, cover all of the limiting surface and a part of the fixed surface, and the like.

In this embodiment, because the light-absorbing layer covers a part or all of the limiting surface and the fixed surface and the light-absorbing layer is capable of absorbing infrared light, the light-absorbing layer is capable of absorbing stray reflected light to suppress reflected stray light inside the lampshade, so as to selectively emit and then selectively receive effective light refracted and twisted by the lampshade, that is, selectively emit and receive effective light. This achieves a light filtering effect, improves a signal-to-noise ratio, and ensures proximity sensing performance of the proximity light assembly.

In this embodiment of this application, the entire fixed surface and the entire limiting surface are coated by the light-absorbing layer to absorb reflection energy of scattered light. In another embodiment, regions in which noise reflection paths are concentrated may also be acquired by simulation, and the light-absorbing layer coats one or more regions, in which noise reflection paths are relatively concentrated, of the fixed surface and the limiting surface.

In the design of relative position relationships between the first surface, the second surface, the screen, and the axial surface, light filtering performance of the lampshade needs also to be taken into account at the same time, so that the light has a relatively large refraction deflection angle without too much light being filtered out (i.e., less refraction attenuation).

In an optional embodiment, the light-absorbing layer is made of a black ink material. Particles in the black ink can absorb light energy.

In an optional embodiment, an incident angle at which the emitted light is emitted into the second surface is less than or equal to 40°. In this case, the lampshade may not only meet deflection requirements of the light through an optical refraction effect, but also suppress reflected light of the light and reduce a reflection proportion. That is, the lampshade reduces a proportion of a loss of stray light by controlling a ratio of reflection energy of the light to refraction energy of the light within a specific range, so that the proximity light assembly has higher detection accuracy.

A material of the lampshade may be polymethyl methacrylate (polymethyl methacrylate, PMMA). Alternatively, the material of the lampshade may also be a polycarbonate (polycarbonate, PC) material.

An intersection line between the limiting surface and the fixed surface includes two opposite straight lines and arc lines oppositely connected between the two straight lines. A shape of a hole wall of the through hole matches a shape of the limiting surface.

In an optional embodiment, a projection of the embedded portion on the fixed surface falls into a range of the fixed surface. In this case, the lampshade is of a structure substantially big end down, and the fixed portion can well bear the embedded portion. Light in the fixed portion can be emitted out through the embedded portion, and the fixed portion can also well receive light of the embedded portion.

In an optional embodiment, the terminal further includes a sealing member. The sealing member is disposed around the embedded portion. The sealing member is in a sealed connection to the fixed surface and the bezel. The sealing member may be a double-sided adhesive or a glue layer. The sealing member can be configured to prevent water vapor, dust, and the like outside the terminal from entering the inside of the terminal through the through hole, thereby improving electrical static discharge (electrical static discharge, ESD) performance and electrical over stress (electrical over stress, EDS) performance of the terminal, and extending the service life of the terminal.

In an optional embodiment, the terminal further includes a circuit board. The circuit board is fastened to the end face that is of the fixed portion and that is away from the embedded portion and covers the mounting slot. The proximity light assembly is fastened to the circuit board. The circuit board can bear the proximity light assembly. The circuit board covers the mounting slot, and can make the proximity light assembly connected to the lampshade. A seal ring may also be disposed between the fixed portion and the circuit board to improve sealing performance. The seal ring may be a double-sided adhesive or a glue layer.

The circuit board may include a body and a reinforcing member. The body may be a flexible printed circuit board. The reinforcing member is configured to reinforce strength of a part of the body. For example, the reinforcing member may cover a part that is used to cover the mounting slot and is of the body, so that the circuit board can be better fastened to and sealed with the lampshade.

In an optional embodiment, the lampshade further includes one or more heat stakes. The one or more heat stakes are convexly disposed on the end face that is of the fixed portion and that is away from the embedded portion. The circuit board is provided with one or more through holes. The one or more heat stakes pass through the one or more through holes.

The heat stake is made of thermoplastic. The heat stake is softened by heating, and a force is applied to make the heat stake deform into a desired shape (for example a mushroom head). After cooling, the shape remains unchanged, so that the heat stake can play a fixing role.

In this embodiment of this application, the circuit board may be pressed on the lampshade through the heat stake, and a fixed relationship between the circuit board and the lampshade is reliable, so that the proximity light assembly fastened to the circuit board may not shake relative to the lampshade in use of the terminal, thereby ensuring reliability of the detection of the proximity light assembly.

The lampshade may further include one or more positioning posts. The one or more positioning posts are convexly disposed on the end face that is of the fixed portion and that is away from the embedded portion. The one or more positioning posts are used to position the circuit board, so that assembly precision of the circuit board and the lampshade is relatively high.

In an optional embodiment, a plurality of support blocks are convexly disposed on the end face that is of the fixed portion and that is away from the embedded portion. The terminal further includes a seal ring. The seal ring is fastened to the end face that is of the fixed portion and that is away from the embedded portion and surrounds the plurality of support blocks. The circuit board abuts against the support blocks and the seal ring.

In this embodiment, a force needs to be applied to the heat stake in a softening and shaping process, and this part of force may act between the lampshade and the circuit board; therefore, when the lampshade is provided with a plurality of support blocks and the plurality of support blocks can abut against the circuit board, the plurality of support blocks can support the circuit board, so that relative positions of the circuit board and the lampshade are maintained, thereby having relatively high assembly precision. The plurality of support blocks may further cooperate with the one or more positioning posts to better position the circuit board. The seal ring surrounds the plurality of support blocks and abuts against the circuit board and the lampshade. This is conducive to sealed connection between the circuit board and the lampshade.

The circuit board and the lampshade may be further fixed by dispensing. For example, a triangular region is formed at a junction between a protruding part of the one or more positioning posts relative to the circuit board and the circuit board, and the dispensing may be performed in the triangular region to glue the circuit board and the positioning posts, thereby further fixing the circuit board and the lampshade.

In an optional embodiment, the bottom wall of the mounting slot further includes a third surface. The third surface and the second surface are arranged in a staggered manner. The terminal further includes an infrared emitting lamp. The infrared emitting lamp is accommodated in the mounting slot and fastened to the circuit board. The infrared emitting lamp is configured to emit infrared light to the third surface.

In the embodiments of this application, the infrared emitting lamp may be configured to implement an infrared remote control function. The infrared emitting lamp and an infrared proximity assembly share the lampshade and the circuit board, so that the infrared remote control function and a proximity sensing function can be integrated into a module to simplify an assembly process of the terminal and also achieve a more uniform effect on the appearance of the terminal.

Fresnel waves may be provided on the third surface to diffuse infrared light emitted by the infrared emitting lamp.

In an optional embodiment, the terminal further includes a back cover. The back cover is fastened to one side that is of the bezel and that is away from the screen. A distance between an opening of the through hole on the outer surface of the bezel and the screen is less than that between the opening and the back cover.

In this embodiment, the opening of the through hole on the outer surface of the bezel is closer to the screen than the back cover, so that the first surface is closer to the screen than the back cover, thereby facilitating proximity sensing detection of the proximity lilt assembly. Based on an arc contour of a conventional bezel, the outer surface of the bezel may be substantially a curved surface and inclined toward the plane on which the screen is located. Therefore, the first surface may also be substantially inclined toward the plane on which the screen is located. This is conducive to achieving a relatively large front inclination angle of the emergent light of the proximity light assembly.

In another embodiment, the distance between the opening of the through hole on the outer surface of the bezel and the screen may also be equal to or greater than that between the opening of the through hole on the outer surface of the bezel and the back cover. In this case, a position of the second surface of the lampshade may be set, so that the emergent light of the proximity light assembly has a front inclination angle meeting requirements.

In an optional embodiment, the axis of the through hole intersects with the plane on which the screen is located. The hole wall of the through hole matches the shape of the limiting surface, and the limiting surface is provided with the light-absorbing layer. Therefore, a direction in which the light enters or exits the lampshade may be affected by the through hole. When the axis of the through hole intersects with the plane on which the screen is located, it facilitates emission of the emitted light intersecting with the plane on which the screen is located and also facilitates entry of the induced light into the proximity light assembly.

In an optional embodiment, the axis of the through hole is parallel to an emission direction of the emitted light. In this case, the lampshade can detect required light through more proximity light assemblies and filter some useless reflected stray light.

In an optional embodiment, the terminal further includes an auxiliary proximity light assembly. One side of the bezel provided with the through hole is provided with a communicating hole. For example, the through hole is provided on a top side of the bezel. That is, when the opening of the through hole is disposed on the top surface of the bezel, an opening of the communicating hole is also disposed on the top surface. The communicating hole and the through hole are arranged at an interval. The auxiliary proximity light assembly is located on the inner side of the bezel and emits and receives infrared light through the communicating hole. A direction in which the auxiliary proximity light assembly emits the infrared light is parallel to the screen.

In this embodiment, the auxiliary proximity light assembly and the proximity light assembly are combined for use, so that an approach direction of the obstacle can be determined, thereby reducing a probability of detection errors. For example, the auxiliary proximity light assembly can detect a space directly above the top of the terminal, and the proximity light assembly can detect a space obliquely above the terminal. When an obstacle approaches or moves away from directly above, an energy change sensed by the auxiliary proximity light assembly is greater than that sensed by the proximity light assembly, and the terminal does not activate a function corresponding to the obstacle approaching the screen (for example, screen-off or screen-on in a call). When the obstacle approaches or moves away from the front of the screen, an energy change sensed by the auxiliary proximity light assembly is smaller than that sensed by the proximity light assembly, and the terminal may activate the function corresponding to the obstacle approaching the screen (for example, screen-off or screen-on in a call).

In an optional embodiment, the bezel further includes a left side surface and a right side surface disposed opposite to each other. The left side surface and the right side surface each are connected between the top surface and the bottom surface. A center plane of the left side surface and the right side surface is an axial surface.

A quantity of the through holes is two. The two through holes are located on two sides of the axial surface respectively. A quantity of the lampshades is two. The two lampshades are mounted into the two through holes respectively. A quantity of the proximity light assemblies is two. The two proximity light assemblies transmit light through the two lampshades respectively.

In this implementation, two groups of proximity induction assemblies (including the lampshade and the proximity light assembly) are arranged on two sides of the axial surface of the terminal respectively, so as to give consideration of experience of left and right hands and ears of the user, and proximity detection performance can be ensured through collaborative determination of the two groups of proximity induction assemblies.

In an optional embodiment, the emitter of the proximity light assembly is accommodated in the lampshade, the receiver of the proximity light assembly is physically independent of the emitter, and the receiver is located in a gap between the screen and the bezel or located below the screen. The screen may be an organic fight-emitting diode (organic light-emitting diode, OLED) display screen.

In an optional embodiment, the terminal includes a first part and a second part. The second part and the first part are slidable relative to each other. The bezel includes an upper bezel and a lower bezel. The first part includes the upper bezel and the screen. The second part includes the lower bezel. When the through hole is disposed on the upper bezel, the first part further includes the lampshade and the proximity light assembly. When the through hole is disposed on the lower bezel, the second part further includes the lampshade and the proximity light assembly. When the second part and the first part slide relative to each other to open, the second part and the first part do not overlap or partially overlap. When the second part and the first pail slide relative to each other to dose, the second part and the first part basically and completely overlap, or the second part is located in a space of the first part. A form of the terminal is not limited in this embodiment of this application.

DESCRIPTION OF EMBODIMENTS

The following describes the embodiments of this application with reference to the accompanying drawings in the embodiments of this application.

Figure 1:
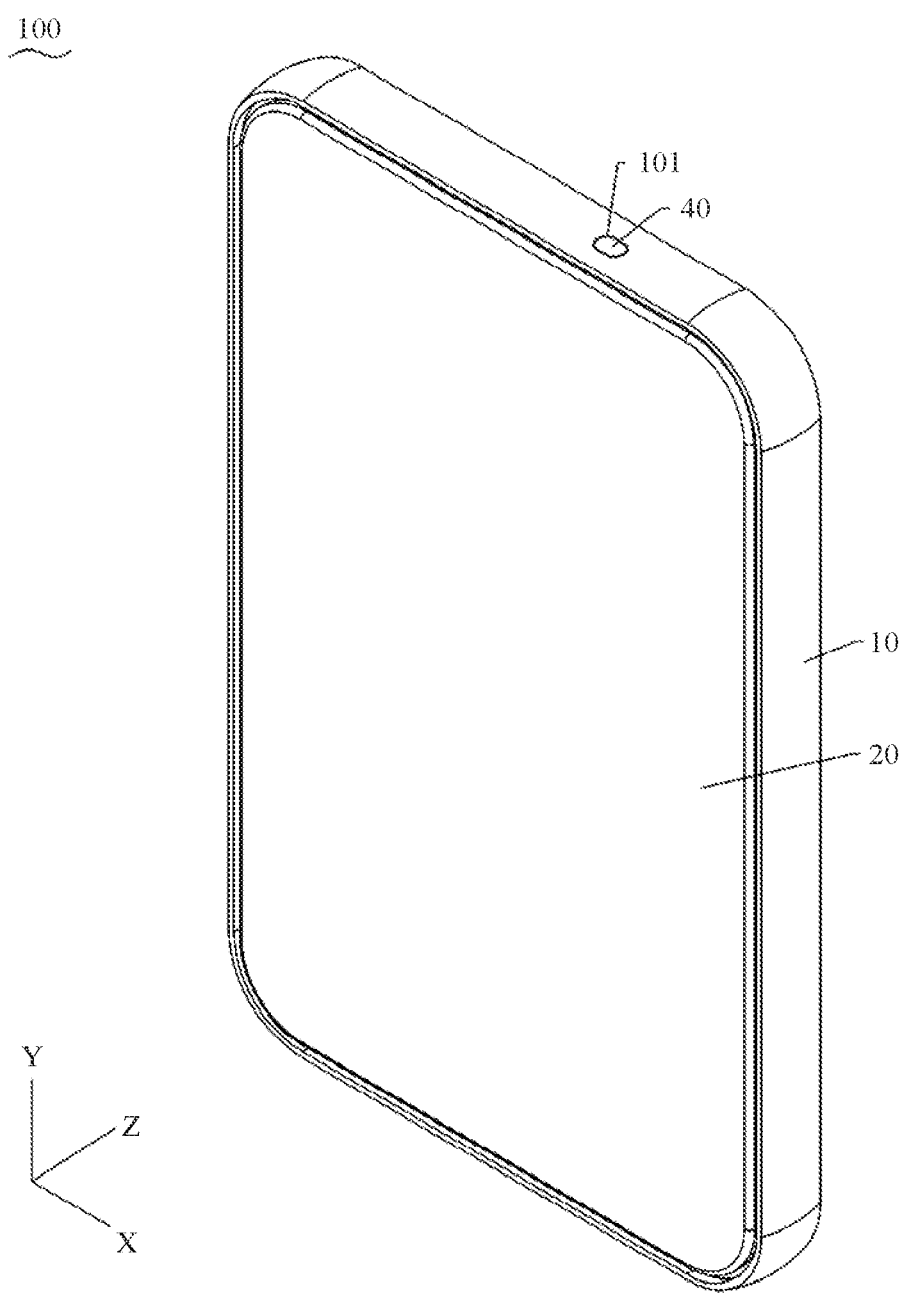
FIG. 1 is a schematic structural diagram of a terminal according to this application in an embodiment.

FIG. 1 is a schematic structural diagram of a terminal 100 according to this application in an embodiment. The terminal 100 may be, for example, a mobile phone, a tablet computer, an e-reader, a notebook computer, a vehicle-mounted device, or a wearable device, or the like. Description is made by using an example in which the terminal 100 is a mobile phone in FIG. 1

Figure 2:
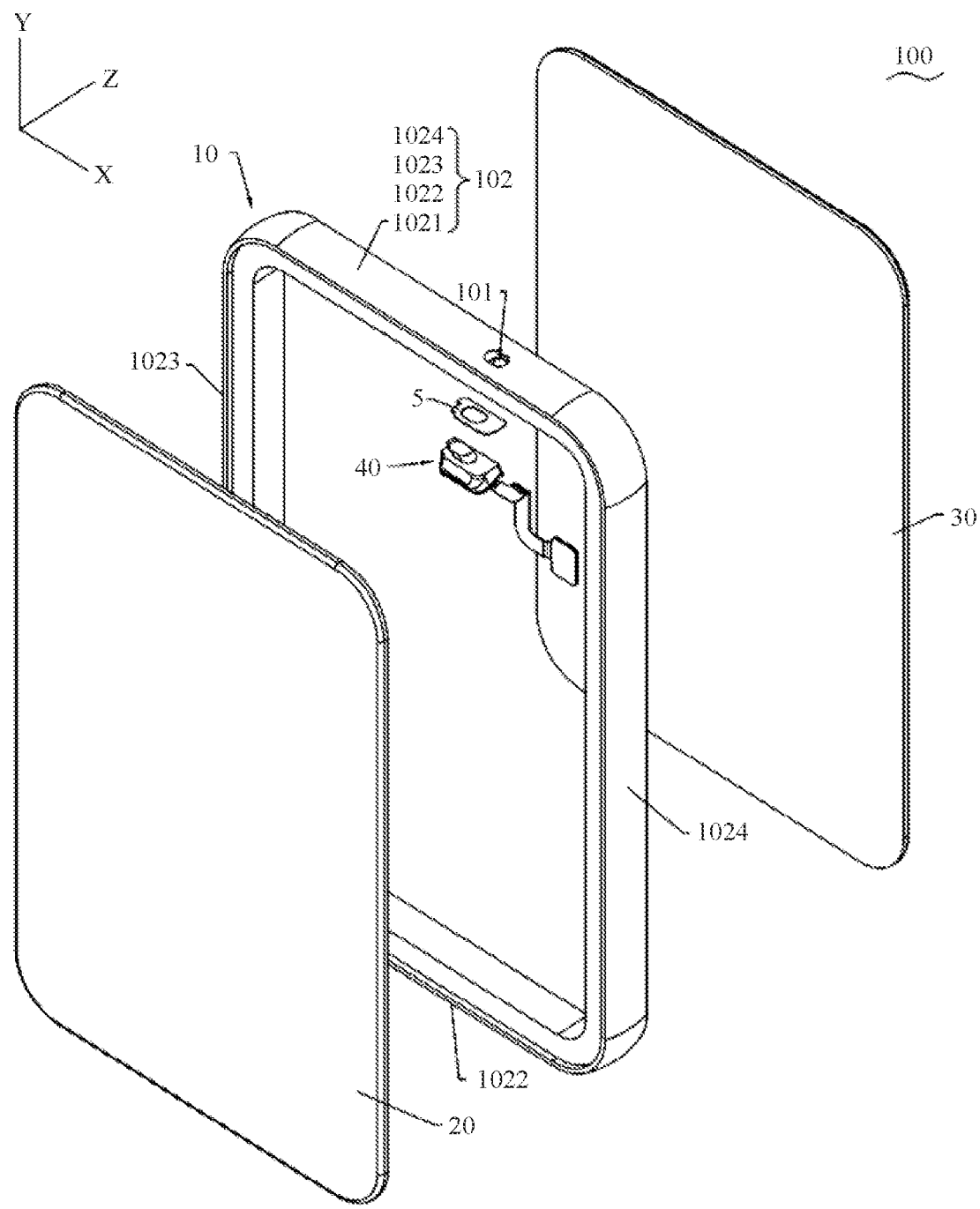
FIG. 2 is a schematic exploded view of a partial structure of the terminal shown in FIG. 1.

Referring to FIG. 1 and FIG. 2 together, FIG. 2 is a schematic exploded view of a partial structure of the terminal 100 shown in FIG. 1.

The terminal 100 includes a bezel 10, a screen 20, a back cover 30, and a proximity light (proximity light) module 40. The bezel 10 is an integral structure, and the bezel 10 has two openings substantially opposite to each other. A periphery of the screen 20 is fixedly connected to the bezel 10. "Fixedly connected to" in the embodiments of this application refers to a state in which two members are relatively fastened to each other after connection. The screen 20 covers one of the two openings. A periphery of the back cover 30 is fixedly connected to the bezel 10. The back cover 30 covers the other one of the openings. The screen 20, the bezel 10, and the back cover 30 jointly enclose a whole machine inner cavity. The bezel 10 and the back cover 30 may be integrally formed. In this case, the bezel 10 and the back cover 30 may be made of a metal material. Alternatively, the bezel 10 and the back cover 30 may form an integral structure through assembly. In this case, the bezel 10 may be made of a metal material. The back cover 30 may be made of a metal material or a glass material. The proximity light module 40 is accommodated in the whole machine inner cavity.

When a user uses the terminal 100, the screen 20 faces the user, one side of the terminal 100 provided with the screen 20 is considered as the front of the terminal 100, one side of the terminal 100 provided with the back cover 30 is considered as the back of the terminal 100, and an outer surface 102 of the bezel 10 is considered as a peripheral side of the terminal 100.

The bezel 10 is provided with a through hole 101. The through hole 101 runs through the bezel 10 to communicate with an inside space (that is, the whole machine inner cavity) and an outside space of the bezel 10 that deviate from each other. A side opening of the through hole 101 is disposed on the outer surface 102 of the bezel 10. The proximity light module 40 is located on an inner side of the bezel 10 and partially accommodated in the through hole 101. The proximity light module 40 can emit light and receive light through the through hole 101 to implement a proximity induction function.

The screen 20 includes a front cover and a display screen fastened to the front cover. The front cover may be made of a glass material. The display screen may be an LCD (liquid crystal display, LCD), or an OLED (organic light-emitting diode, OLED) display screen. The proximity light module 40 is located below the screen 20. A projection of the proximity light module 40 on the front cover partially or wholly overlaps with that of the display screen on the front cover. "Wholly overlap" means that the projection of the proximity light module 40 on the front cover is completely included in the projection of the display screen on the front cover.

In this embodiment of this application, the proximity light module 40 of the terminal 100 receives and emits light through the through hole 101 on the bezel 10. The screen 20 does not need to reserve a space in an edge region thereof for light entry and exit. A width of the edge region thereof is reduced and the screen even has no bezel, and a display region of the screen 20 is increased, so that a screen-to-body ratio (screen-to-body ratio) of the terminal 100 is relatively high. In an embodiment, the terminal 100 can implement bezel-less screen, and the screen-to-body ratio of the terminal 100 is greater than 90%.

The terminal 100 further includes a battery (not shown), a motherboard (not shown), and the like. The battery, the motherboard, and the like may be accommodated in the inside space of the bezel 10. A circuit board 3 may be electrically connected to the motherboard. The motherboard is provided with devices such as a processor and a memory.

Figure 3A:
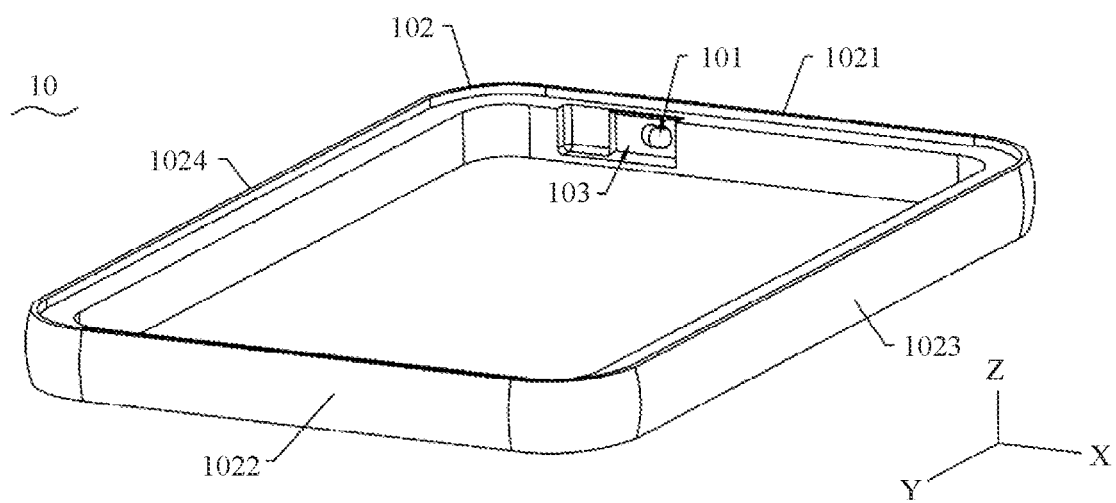
FIG. 3A is a schematic structural diagram of a bezel shown in FIG. 2.

Referring to FIG. 1 to FIG. 3A together, FIG. 3A is a schematic structural diagram of the bezel 10 shown in FIG. 2. A perspective from which the bezel 10 is shown in FIG. 3A is a perspective after the bezel 10 shown in FIG. 2 is flipped around a Y axis by about 180°.

The bezel 10 includes a top surface 1021 and a bottom surface 1022 disposed opposite to each other. The top surface 1021 and the bottom surface 1022 are a part of the outer surface 102 of the bezel 10. The outer surface 102 of the bezel 10 further includes a left side surface 1023 and a right side surface 1024 disposed opposite to each other, and the left side surface 1023 and the right side surface 1024 are connected between the top surface 1021 and the bottom surface 1022. A transition between the top surface 1021 and the right side surface 1024 may be implemented by using a cambered surface. A transition between the right side surface 1024 and the bottom surface 1022 may be implemented by using a cambered surface. A transition between the bottom surface 1022 and the left side surface 1023 may be implemented by using a cambered surface. A transition between the left side surface 1023 and the top surface 1021 may be implemented by using a cambered surface.

When the user uses the terminal 100, the top surface 1021 is substantially upward, the bottom surface 1022 is substantially downward, the left side surface 1023 is close to a left-hand side of the user, and the right side surface 1024 is close to a right-hand side of the user.

A perpendicular direction of the top surface 1021 toward the bottom surface 1022 is a vertical direction. In this embodiment of this application, a vertical direction of the terminal 100 is defined as a Y direction, and a perpendicular direction of the bottom surface 1022 toward the top surface 1021 is also the vertical direction; a horizontal direction of the terminal 100 is defined as an X direction, a perpendicular direction of the left side surface 1023 toward the right side surface 1024 is the horizontal direction, and a perpendicular direction of the right side surface 1024 toward the left side surface 1023 is also the horizontal direction; a thickness direction of the terminal 100 is defined as a Z direction, and a direction substantially perpendicular to the screen 20 is the thickness direction. The X direction, the Y direction, and the Z direction are perpendicular to each other. A plane on which the X direction and the Y direction are located is an XY plane. A plane on which the X direction and the Z direction are located is an XZ plane. A plane on which the Y direction and the Z direction are located is a YZ plane. The XY plane, the XZ plane, and the YZ plane are perpendicular to each other.

In this embodiment, a side opening of the through hole 101 is disposed on the top surface 1021. In this case, the proximity light module 40 is substantially disposed at the top of the terminal 100. In another embodiment, the side opening of the through hole 101 may also be disposed in another position of the outer surface 102.

In an implementation, the inner side of the bezel 10 is provided with a groove 103. The groove 103 is in communication with the through hole 101. The proximity light module 40 may be partially accommodated in the groove 103. In this case, the proximity light module 40 and the bezel 10 share a part of space, so that more devices can be arranged on the inner side of the bezel 10. This is conducive to thinning and lightening of the terminal 100.

It may be understood that in the embodiment shown in FIG. 1, the bezel 10 is an integral structure. Therefore, the screen 20 and the back cover 30 disposed two sides of the bezel 10 and the bezel 10 jointly enclose the whole machine inner cavity.

In another embodiment, the terminal may have other forms. For example, the terminal may include two parts that are slidable relative to each other. The terminal includes a first part and a second part. The second part and the first part are slidable relative to each other. When the second part and the first part slide relative to each other to open, the second part and the first part may not overlap or partially overlap. When the second part and the first part slide relative to each other to close, the second part and the first part basically and wholly overlap, or the second part is located in a space of the first part. A volume of the second part may be smaller than that of the first part, or a volume of the second part is substantially the same as that of the first part. A form of the terminal is not limited in this embodiment of this application.

Figure 3B:
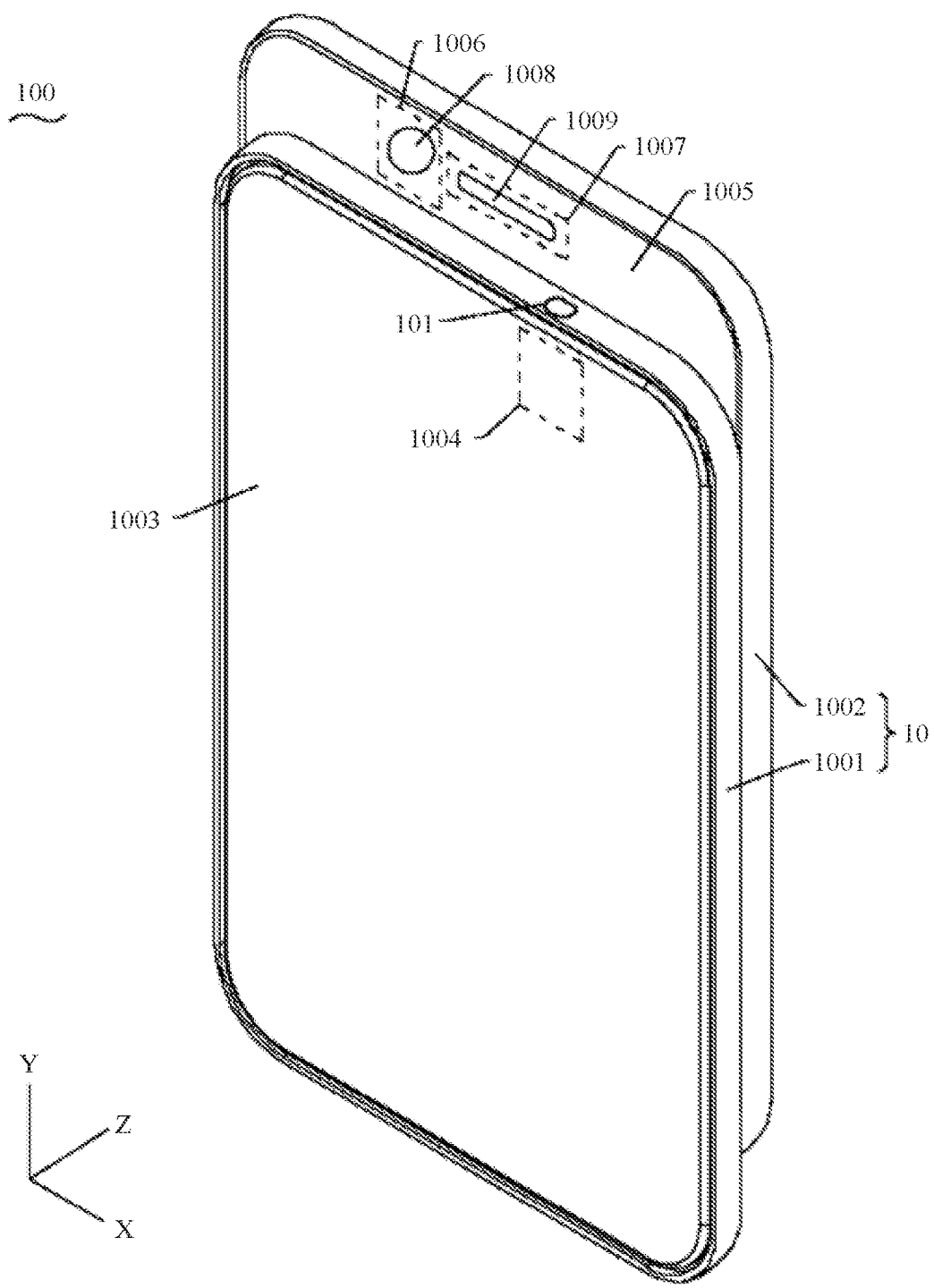
FIG. 3B is a schematic structural diagram of a terminal according to this application in another embodiment.

In an embodiment, FIG. 3B is a schematic structural diagram of the terminal according to this application in another embodiment. The bezel 10 is of a split structure. The bezel 10 includes an upper bezel 1001 and a lower bezel 1002. The upper bezel 1001 and the lower bezel 1002 are slidable relative to each other. The first part includes the upper bezel 1001 and a screen 1003. The second part includes the lower bezel 1002 and a back cover. The through hole 101 is provided on the upper bezel 1001. In this case, the first part further includes a proximity light module 1004.

Specifically, the terminal 100 further includes an upper cover plate and a lower cover plate 1005. The screen 1003 may be fastened to one side of the upper bezel 1001 away from the lower bezel 1002. The upper cover plate may be fastened to one side of the upper bezel 1001 facing the lower bezel 1002 (the upper cover plate is not shown in FIG. 3B due to a perspective). That is, the screen 1003 and the upper cover plate are located, opposite to each other, on front and back sides of the upper bezel 1001. The screen 1003, the upper bezel 1001, and the upper cover plate may jointly enclose a first accommodation space. The through hole 101 is provided on the upper bezel 1001. The proximity light module 1004 may be accommodated in the first accommodation space. The lower cover plate 1005 is fastened to one side of the lower bezel 1002 facing the upper bezel 1001, and the back cover is fastened to one side of the lower bezel 1002 away from the upper bezel 1001 (the back cover is not shown in FIG. 3B due to a perspective). That is, the lower cover plate 1005 and the back cover are located, opposite to each other, on front and back sides of the lower bezel 1002. The lower cover plate 1005 and the upper cover plate are disposed opposite to each other, and the back cover and the screen 1003 are disposed opposite to each other. The lower cover plate 1005, the lower bezel 1002, and the back cover jointly enclose a second accommodation space. Both the second accommodation space and the first accommodation space may be configured to accommodate internal devices of the terminal 100. The first part of the terminal 100 includes the screen 1003, the upper bezel 1001, the upper cover plate, and the device in the first accommodation space. The second part of the terminal 100 includes the lower cover plate 1005, the lower bezel 1002, the back cover, and the device in the second accommodation space. The second part and the first part of the terminal are slidable relative to each other. It needs to be noted that the screen 1003 in this embodiment is equivalent to the screen 20 in another embodiment; and the back cover in this embodiment is equivalent to the back cover 3 in another embodiment. In this embodiment, the position and the structure of the proximity light module 1004 in the terminal are the same as those of the proximity light module 40 (including a lampshade 1 and a proximity light assembly 2, and refer to FIG. 5) in the terminal in another embodiment. That is, structures described in other embodiments may be applicable to the terminal in this embodiment. For another structure (not mentioned above) of the bezel 10 in this embodiment, refer to the structure of the bezel 10 described in another embodiment.

In FIG. 3B, for example, devices such as a camera 1006 and a telephone receiver 1007 may be disposed in the second accommodation space. A light-transmitting portion 1008 may be disposed on the lower cover plate 1005, so that the camera 1006 collects light through the light-transmitting portion 1008. A telephone receiver hole 1009 may be provided on the lower cover plate 1005, so that the telephone receiver 1007 makes a sound through the telephone receiver hole 1009. When the upper bezel 1001 and the lower bezel 1002 slide relative to each other to open (that is, in a state shown in FIG. 3B), the light-transmitting portion 1008 and the telephone receiver hole 1009 are exposed relative to the screen 20. When the upper bezel 1001 and the lower bezel 1002 slide relative to each other to close (an outer peripheral surface of the upper bezel 1001 is substantially flush with that of the lower bezel 1002), the light-transmitting portion 1008 and the telephone receiver hole 1009 overlap relative to the screen 20, and the light-transmitting portion 1008 and the telephone receiver hole 1009 are hidden inside the terminal 100.

Figure 3C:
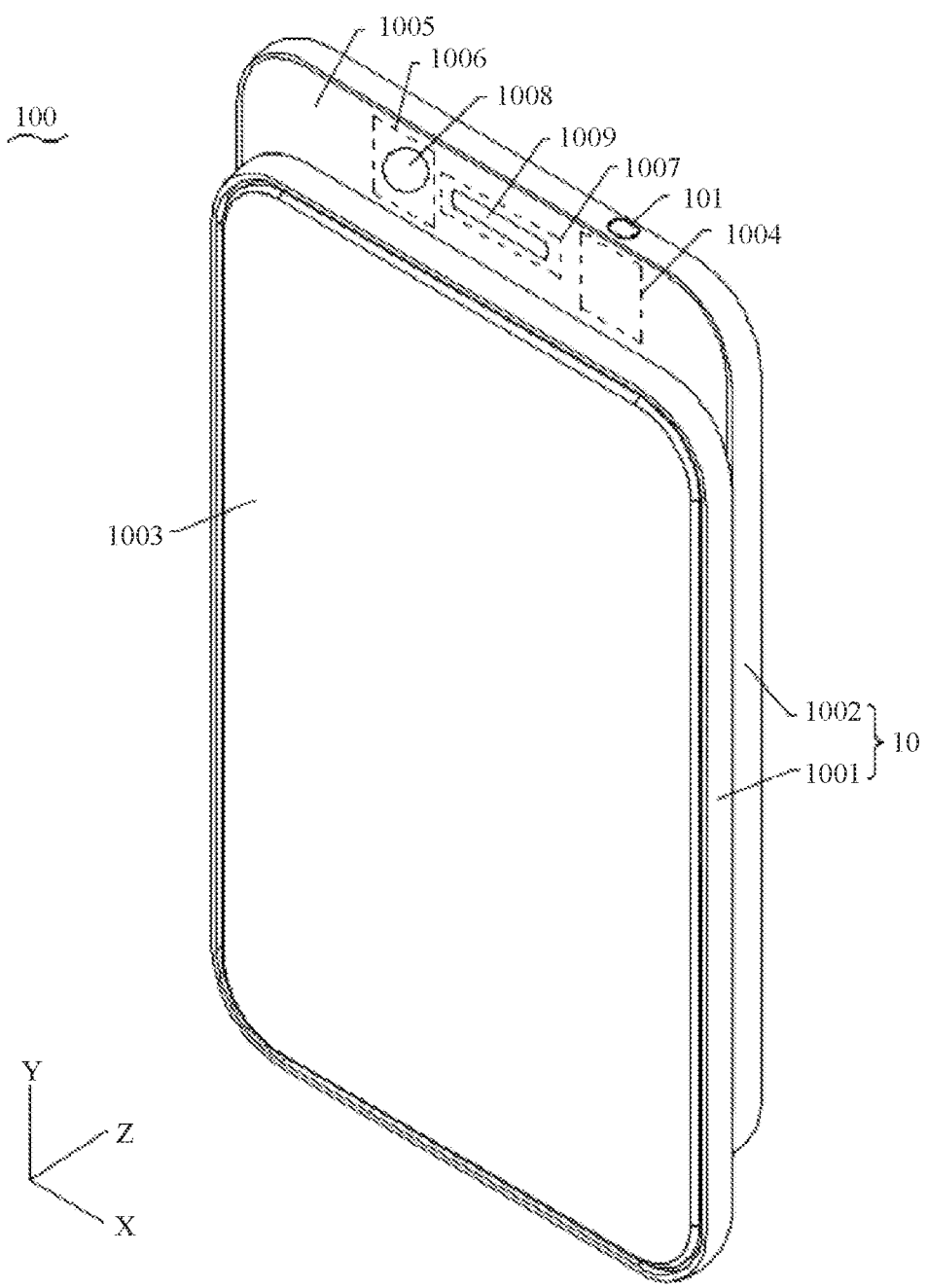
FIG. 3C is a schematic structural diagram of a terminal according to this application in yet another embodiment.

In another embodiment, FIG. 3C is a schematic structural diagram of the terminal according to this application in another embodiment. Most technical contents in this embodiment are the same as those in the above embodiments are not described in detail.

In this embodiment, the through hole 101 is provided on the lower bezel 1002. The proximity light module 1004 may be accommodated in the second accommodation space. In this case, the second part further includes the proximity light module 1004. That is, the second part further includes a lampshade and a proximity light assembly.

Figure 4:
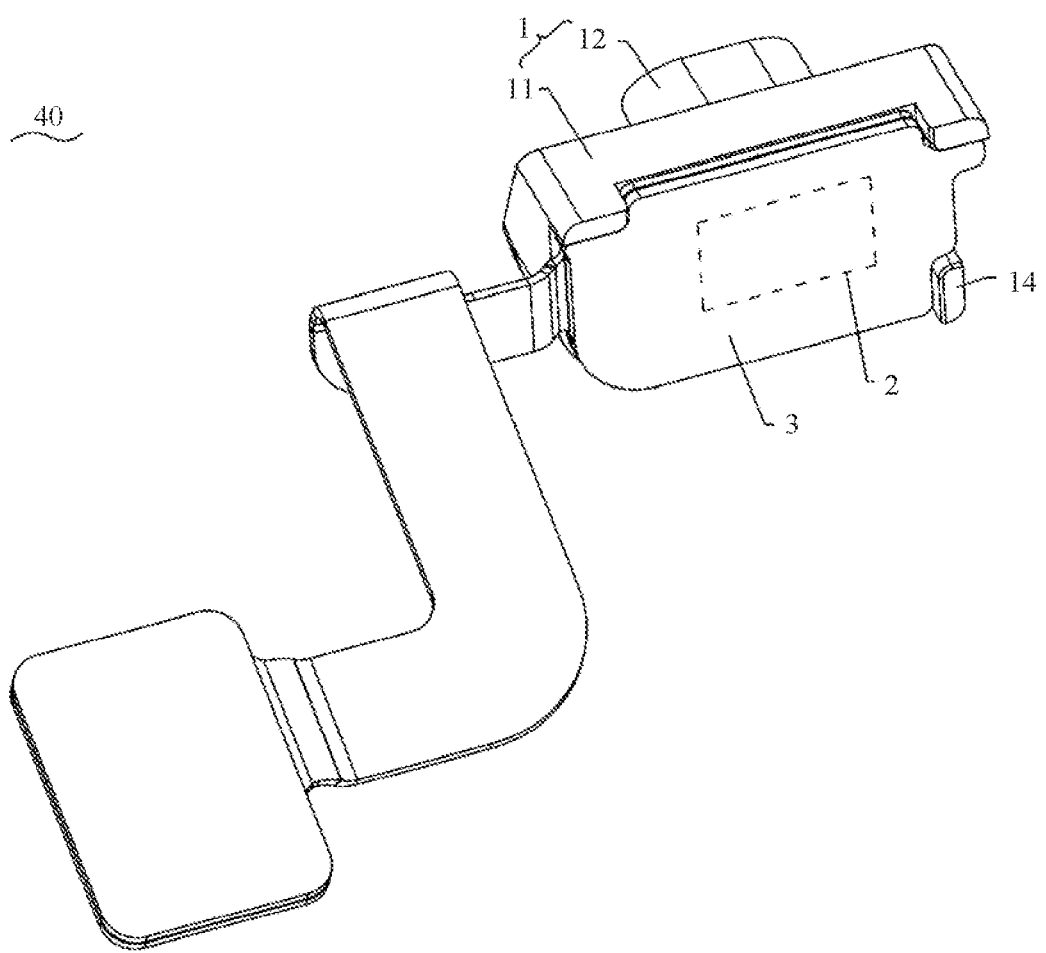
FIG. 4 is a schematic structural diagram of a proximity light module shown in FIG. 2 in an embodiment.
Figure 5:
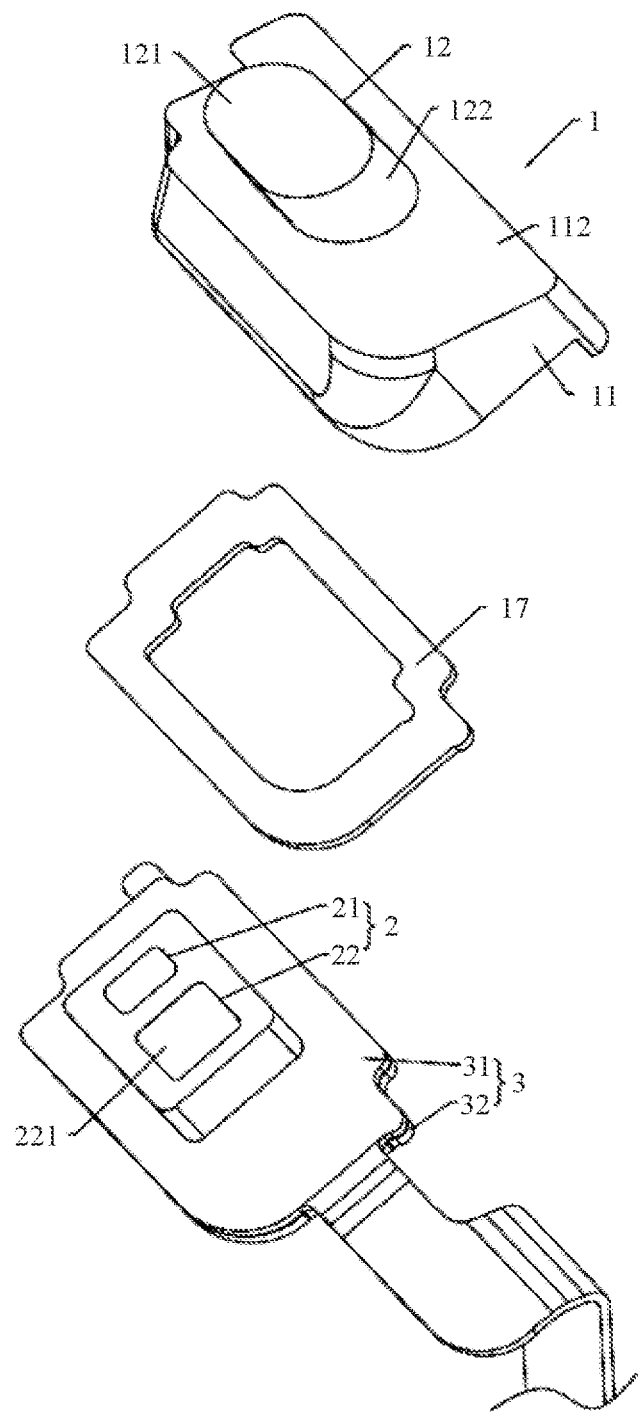
FIG. 5 is a schematic exploded structural diagram of the proximity light module shown in FIG. 4.
Figure 6:
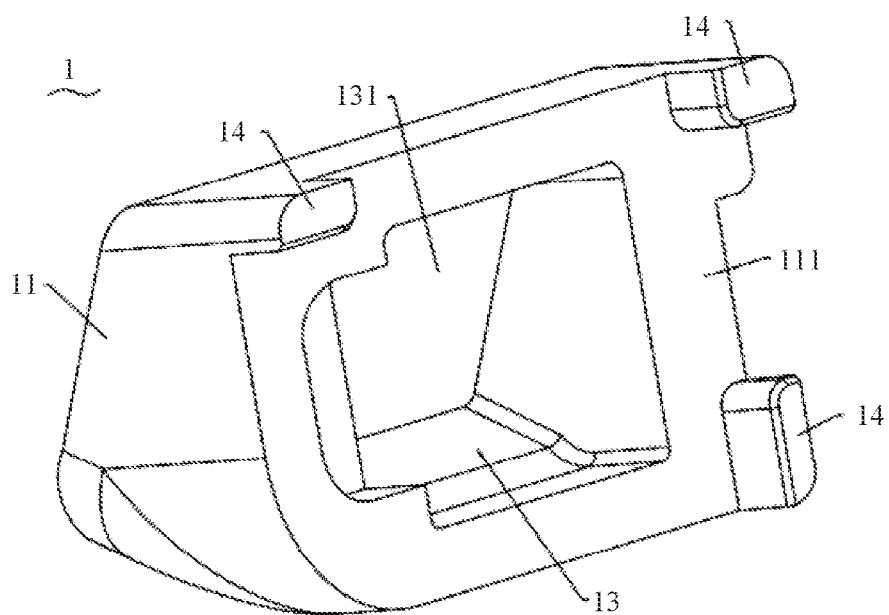
FIG. 6 is a schematic structural diagram of a lampshade shown in FIG. 5.

Referring to FIG. 4 to FIG. 6 together, FIG. 4 is a schematic structural diagram of the proximity light module 40 shown in FIG. 2 in an embodiment, FIG. 5 is a schematic exploded structural diagram of the proximity light module 40 shown in FIG. 4, and FIG. 6 is a schematic structural diagram of the lampshade 1 shown in FIG. 5.

The proximity light module 40 includes the lampshade 1, a proximity light (proximity light) assembly 2, and a circuit board 3.

The lampshade 1 includes a fixed portion 11 and an embedded portion 12 fixedly connected to the fixed portion 11. The fixed portion 11 and the embedded portion 12 may be integrally formed. An end face 111 that is of the fixed portion 11 and that is away from the embedded portion 12 is provided with an inward mounting slot 13. The proximity light assembly 2 is fastened to the circuit board 3. The circuit board 3 is fastened to the end face 111 that is of the fixed portion 11 and that is away from the embedded portion 12 and covers the mounting slot 13. The proximity light assembly 2 is accommodated in the mounting slot 13. In other words, a recessed cavity is formed on one side that is of the fixed portion 11 and that is away from the embedded portion 12, and the proximity light assembly 2 is accommodated in the cavity. The circuit board 3 covers the mounting slot 13, so as to enable the proximity light assembly 2 to be in a sealed connection to the lampshade 1. A seal ring 17 may also be disposed between the fixed portion 11 and the circuit board 3 to improve sealing performance. The seal ring 17 may be a double-sided adhesive or a glue layer.

An end face that is of the embedded portion 12 and that is away from the fixed portion 11 includes a first surface 121. A bottom wall of the mounting slot 13 includes a second surface 131. Light emitted by the proximity light assembly 2 may be emitted out of the proximity light module 40 after passing through the second surface 131 and the first surface 121. Light outside the proximity light module 40 may pass through the first surface 121 and the second surface 131 and then enter the proximity light assembly 2.

In this embodiment, the proximity light assembly 2 is accommodated in the mounting slot 13, and the proximity light assembly 2 is substantially embedded inside the lampshade 1, thereby improving utilization of the light. The lampshade 1 may also play a role in structurally protecting the proximity light assembly 2. At the same time, the terminal 100 may also achieve modularization by assembling the proximity light assembly 2 and the lampshade 1, thereby simplifying an entire machine assembly process of the terminal 100.

The first surface 121 may be a part of the end face that is of the embedded portion 12 and that is away from the fixed portion 11, or all of the end face that is of the embedded portion 12 and that is away from the fixed portion 11. When the proximity light module 40 is mounted to the bezel 10 (refer to FIG. 3A), the lampshade 1 is located on the inner side of the bezel 10 and is partially accommodated in the through hole 101. The embedded portion 12 is partially or wholly accommodated in the through hole 101. The first surface 121 is exposed outside the terminal 100 through an opening of the through hole 101. In this embodiment of this application, the first surface 121 is all of the end face that is of embedded portion 12 and that is away from the fixed portion 11. That is, the first surface 121 covers the entire end face that is of the embedded portion 12 and that is away from the fixed portion 11. The end face is exposed outside the terminal 100 through the opening of the through hole 101. In this case, the entire end face can receive light or emit light, thereby improving utilization of the end face, and an area of the opening of the through hole 101 provided on the outer surface 102 of the bezel 10 may also be correspondingly set to a relatively small value. The fixed portion 11 is located on the inner side of the bezel 10. For example, the fixed portion 11 may be accommodated or partially accommodated in the groove 103 on the inner side of the bezel 10. The groove 103 may play a role in receiving and limiting the fixed portion 11. The second surface 131 may be a part of the bottom wall of the mounting slot 13 of the fixed portion 11.

In an implementation, the fixed portion 11 includes a fixed surface 112. The embedded portion 12 is located on the fixed surface 112. The embedded portion 12 is a projecting portion convexly disposed on the fixed surface 112. The embedded portion 12 includes a limiting surface 122. The limiting surface 122 is connected between the fixed surface 112 and the end face that is of the embedded portion 12 and that is away from the fixed portion 11. That is, the limiting surface 122 is connected between the fixed surface 112 and the first surface 121. The limiting surface 122 is a peripheral surface of the embedded portion 12. When the embedded portion 12 is partially or wholly accommodated in the through hole 101, the limiting surface 122 faces a hole wall of the through hole 101.

In an implementation, a projection of the embedded portion 12 on the fixed surface 112 falls within a range of the fixed surface 112. In this case, the lampshade 1 is of a structure substantially big end down, and the fixed portion 11 can well bear the embedded portion 12. Light in the fixed portion 11 can be emitted out through the embedded portion 12, and the fixed portion 11 can also well receive light of the embedded portion 12. An intersection line between the limiting surface 122 and the fixed surface 112 includes two opposite straight lines and arc lines oppositely connected between the two straight lines. A shape of the hole wall of the through hole 101 matches a shape of the limiting surface 122.

In an implementation, the proximity light assembly 2 includes an emitter 21 and a receiver 22. The emitter 21 is configured to emit the emitted light. The emitted light may be invisible light such as infrared light. The emitter 21 may be an infrared light emitting diode (light emitting diode, LED) or a vertical-cavity surface-emitter laser (vertical-cavity surface-emitter laser, VCSEL). The receiver 22 is configured to receive induced light to form a corresponding electrical signal. The emitted light passes through the lampshade 1 to form emergent light. The emergent light is reflected by an obstacle to form reflected light. A part of the reflected light passes through the lampshade 1 to form the induced light. In this implementation, both the emitter 21 and the receiver 22 are accommodated in the mounting slot 13. The receiver 22 of the proximity light assembly 2 has an induction surface 221. The induction surface 221 is used to receive the induced light. A direction of the emitted light emitted by the emitter 21 is substantially perpendicular to the induction surface 221. The proximity light assembly 2 is fastened to one end of the circuit board 3, and the other end of the circuit board 3 may be used to mount a connector.

In another implementation, the emitter 21 of the proximity light assembly 2 is accommodated in the lampshade 1, and the receiver 22 of the proximity light assembly 2 is physically independent of the emitter 21. For example, the receiver 22 may be located in a gap between the screen 20 and the bezel 10 or located below the screen 20. The screen 20 may be an organic light-emitting diode (organic light-emitting diode, OLED) display screen.

In an implementation, the circuit board 3 may include a body 31 and a reinforcing member 32. The body 31 may be a flexible printed circuit hoard. The reinforcing member 32 is configured to reinforce strength of a part of the body 31. For example, the reinforcing member 32 may cover a part that is used to cover the groove 103 and is of the body 31, that is, the body 31 includes a part covering the groove 103, and the reinforcing member 32 covers the part, so that the circuit board 3 can be better fastened to and sealed with the lampshade 1.

In an implementation, the lampshade 1 includes one or more positioning posts 14. The one or more positioning posts 14 are convexly disposed on the end face 111 that is of the fixed portion 11 and that is away from the embedded portion 12. The one or more positioning posts 14 are used to position the circuit board 3, so that assembly precision of the circuit board 3 and the lampshade 1 is relatively high. As shown in FIG. 4, a part of the circuit board 3 is stuck in a space defined by the plurality of positioning posts 14, and the circuit board 3 abuts against the positioning posts 14.

It may be understood that in this embodiment, the proximity light assembly 2 is accommodated in the mounting slot 13 of the lampshade 1, and the proximity light assembly 2 is embedded in the lampshade 1. In another embodiment, the proximity light assembly 2 may also be spatially located on an outer side of the lampshade 1. The lampshade 1 is no longer provided with the groove 101. The lampshade 1 has the first surface 121 and the second surface 131 the first surface and the second surface in same as those in other embodiments. The proximity light assembly 2 faces the second surface 131, so that the light emitted by the emitter 21 can enter the second surface 131. Light emitted by the second surface 131 can enter the induction surface 221 of the receiver 22.

Referring to FIG. 2, FIG. 3A, and FIG. 5 together, in an implementation, the terminal 100 further includes a sealing member 5. The sealing member 5 is disposed around the embedded portion 12. The sealing member 5 is in a sealed connection to the fixed surface 112 and the bezel 10. The sealing member 5 may abut against a bottom wall of the groove 103. The sealing member 5 may be a double-sided adhesive or a glue layer. The sealing member 5 can be configured to prevent water vapor, dust, and the like outside the terminal 100 from entering the inside of the terminal 100 through the through hole 101, thereby improving electrical static discharge (electrical static discharge, ESD) performance and electrical over stress (electrical over stress, EDS) performance of the terminal 100, and extending the service life of the terminal 100.

Figure 7:
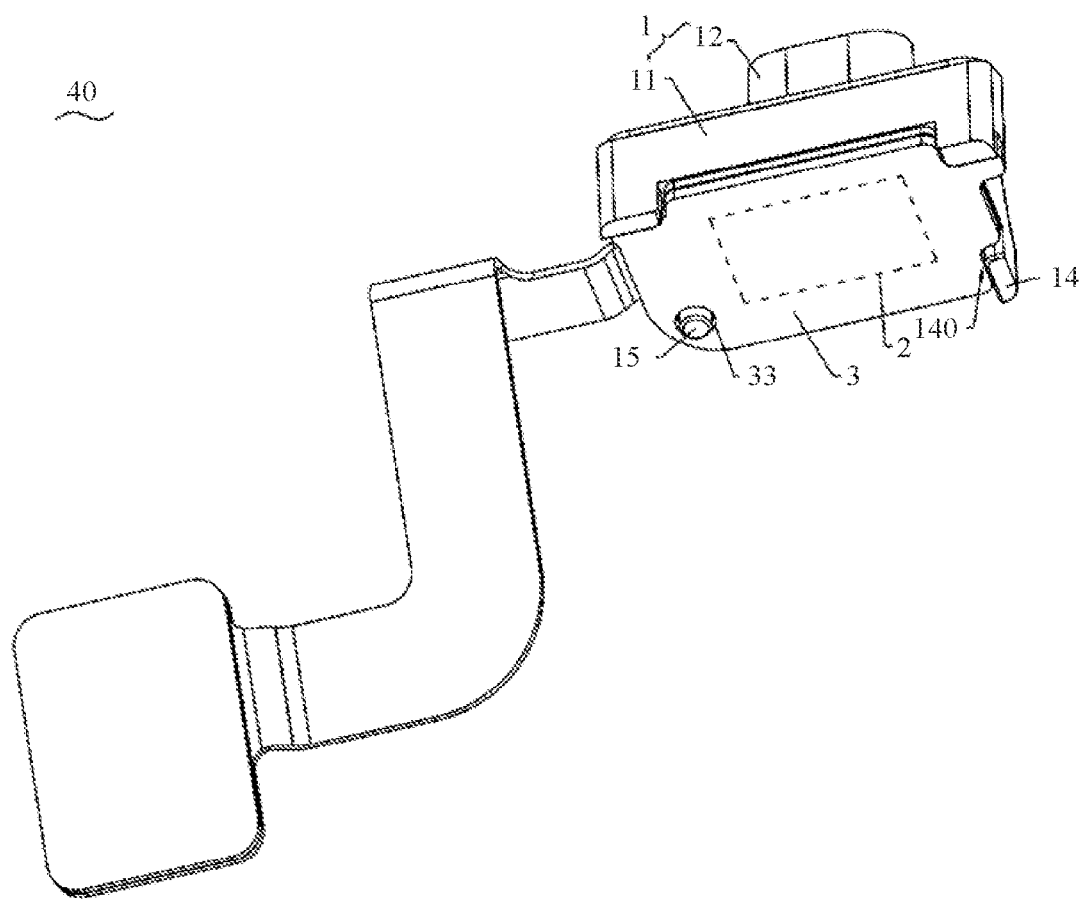
FIG. 7 is a schematic structural diagram of a proximity light module shown in FIG. 2 in another embodiment.
Figure 8:
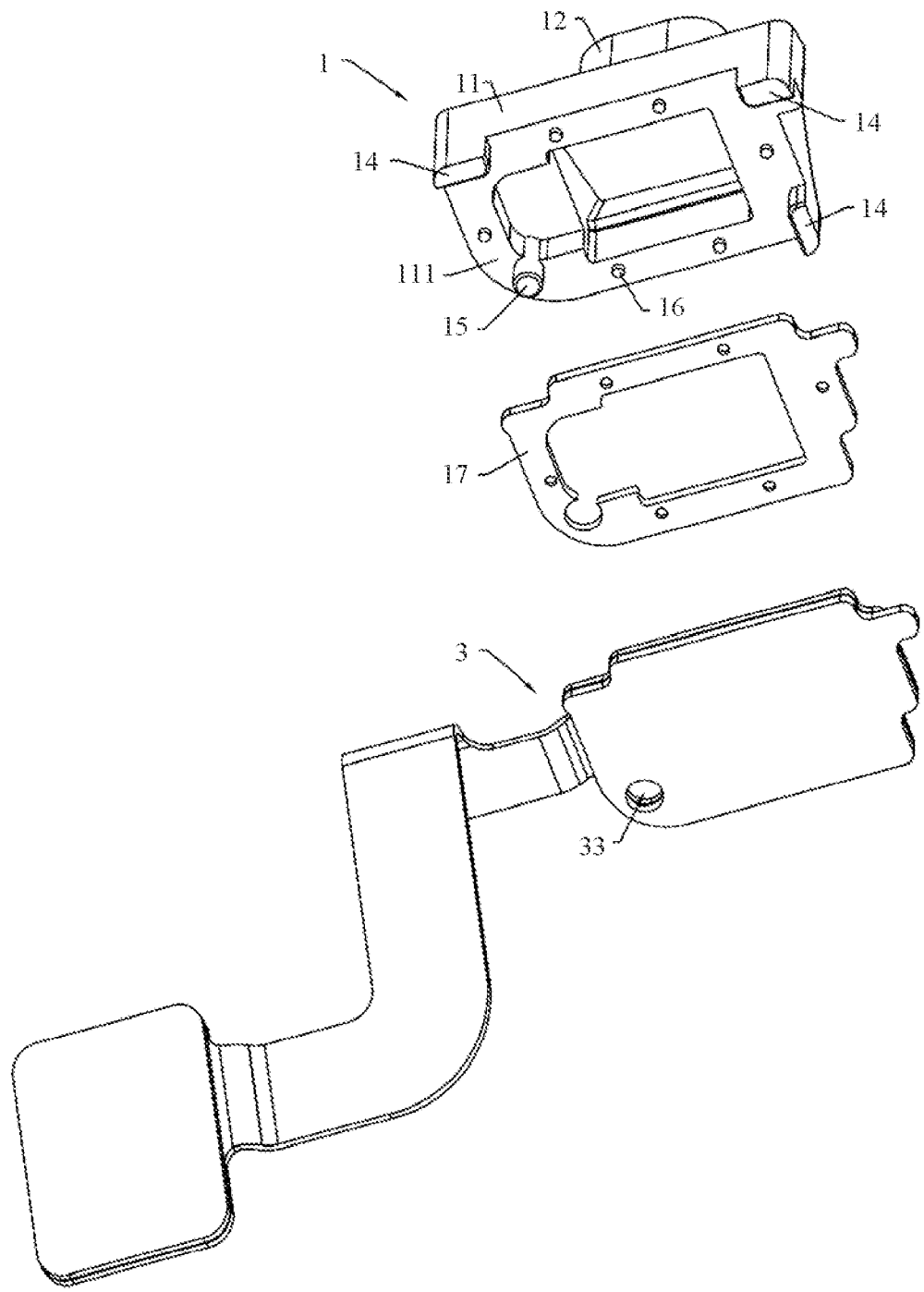
FIG. 8 is a schematic exploded structural diagram of the proximity light module shown in FIG. 7.

Referring to FIG. 7 and FIG. 8 together, FIG. 7 is a schematic structural diagram of the proximity light module 40 shown in FIG. 2 in another embodiment, and FIG. 8 is a schematic exploded structural diagram of the proximity light module 40 shown in FIG. 7. Most technical solution contents in this embodiment the same as those in the above embodiments are not described in detail.

The lampshade 1 further includes one or more heat stakes 15. The one or more heat stakes 15 are convexly disposed on the end face 111 that is of the fixed portion 11 and that is away from the embedded portion 12. The circuit board 3 is provided with one or more through holes 33. The one or more heat stakes 15 pass through the one or more through holes 33. Structures shown in FIG. 7 and FIG. 8 illustrate a structure in which the lampshade 1 includes one heat stake 15 and a structure in which the circuit board 3 includes one through hole 33.

Thermoplastic plastic is used for the heat stake 15. The heat stake 15 is softened by heating, and a force is applied to make the heat stake 15 deform into a desired shape (for example, a mushroom head). After cooling, the shape remains unchanged, so that the heat stake 15 can play a fixing role.

In this embodiment, the circuit board 3 may be pressed on the lampshade 1 by using the deformed heat stake 15, and a fixed relationship between the circuit board 3 and the lampshade 1 is reliable, so that the proximity light assembly 2 fastened to the circuit board 3 may not shake relative to the lampshade 1 in use of the terminal 100, thereby ensuring reliability of the detection of the proximity light assembly 2.

In an implementation, a plurality of support blocks 16 are convexly disposed on the end face 111 that is of the fixed portion 11 and that is away from the embedded portion 12. The terminal 100 further includes a seal ring 17. The seal ring 17 is fastened to the end face 111 that is of the fixed portion 11 and that is away from the embedded portion 12 and surrounds the plurality of support blocks 16. The circuit board 3 abuts against the support blocks 16 and the seal ring 17. In this case, a force needs to be applied to the heat stake 15 in a softening and shaping process, and this part of force may act between the lampshade 1 and the circuit board 3; therefore, when the lampshade 1 is provided with a plurality of support blocks 16 and the plurality of support blocks 16 can abut against the circuit board 3, the plurality of support blocks can support the circuit board 3, so that relative positions of the circuit board 3 and the lampshade 1 are maintained, thereby having relatively high assembly precision. The plurality of support blocks 16 may further cooperate with the one or more positioning posts 14 to better position the circuit board 3. The seal ring 17 surrounds the plurality of support blocks 16 and abuts against the circuit board 3 and the lampshade 1. This is conducive to sealed connection between the circuit board 3 and the lampshade 1.

In an implementation, one or more of the positioning posts 14 shown in FIG. 7 and FIG. 8 may also be replaced with heat stakes.

In an implementation, the circuit board 3 and the lampshade 1 may be further fixed in a dispensing manner. For example, one or more positioning posts 14 are convexly disposed on the end face 111 that is of the fixed portion 11 and that is away from the embedded portion 12. The one or more positioning posts 14 have a part protruding relative to the circuit board 3, and dispensing is performed at a junction 140 between the part and the circuit board 3 to glue the circuit board 3 and the positioning posts 14, thereby further fixing the circuit board 3 and the lampshade 1.

Figure 9:
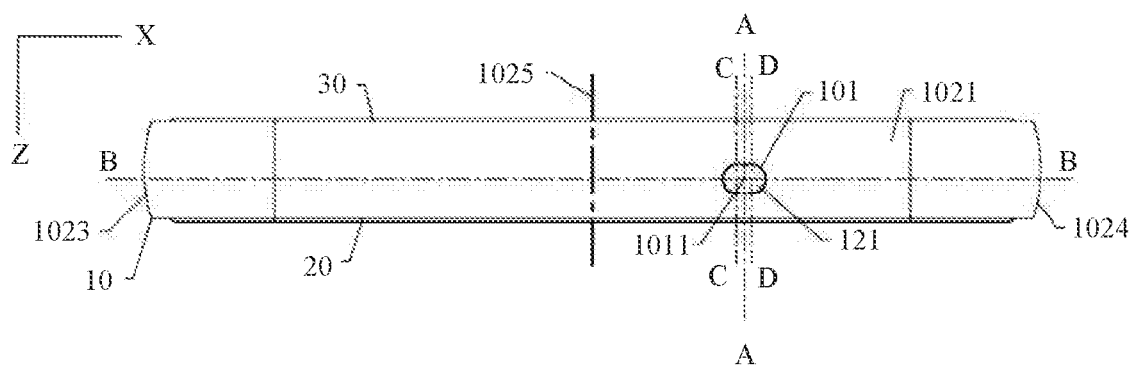
FIG. 9 is a schematic structural diagram of the terminal shown in FIG. 1 from another perspective.
Figure 10:
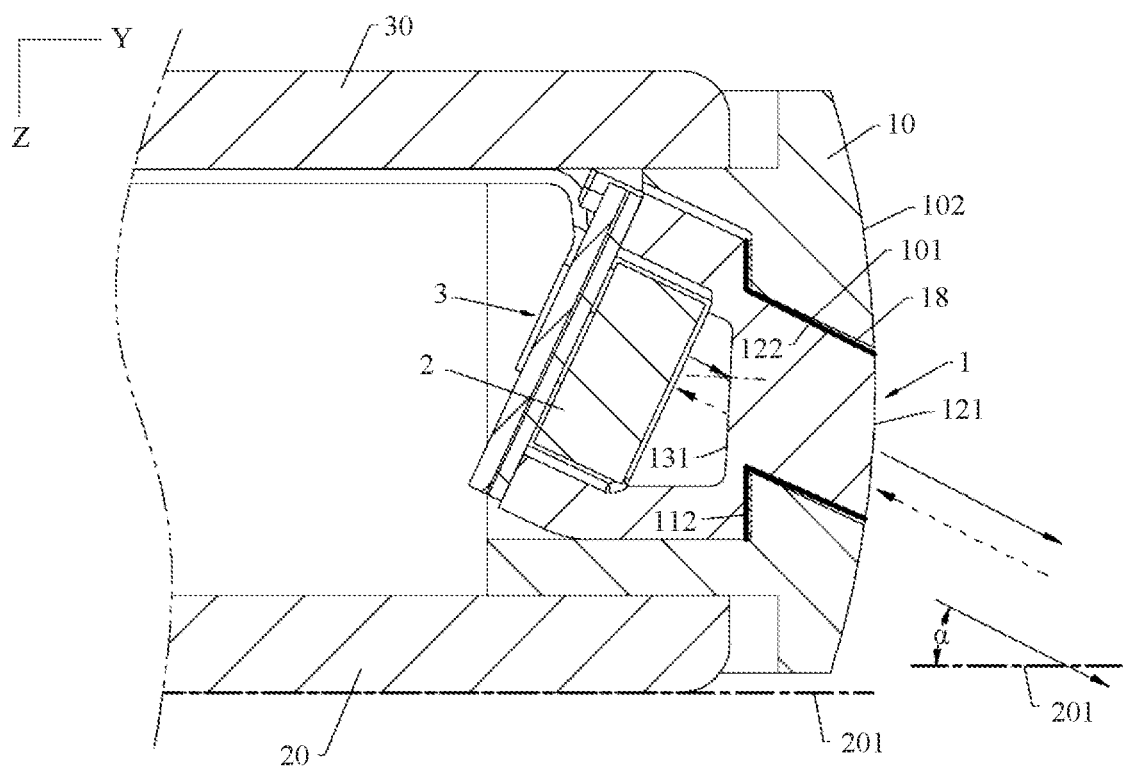
FIG. 10 is a cross-sectional view of a partial structure of the terminal shown in FIG. 9 along an A-A line in a first embodiment.
Figure 11:
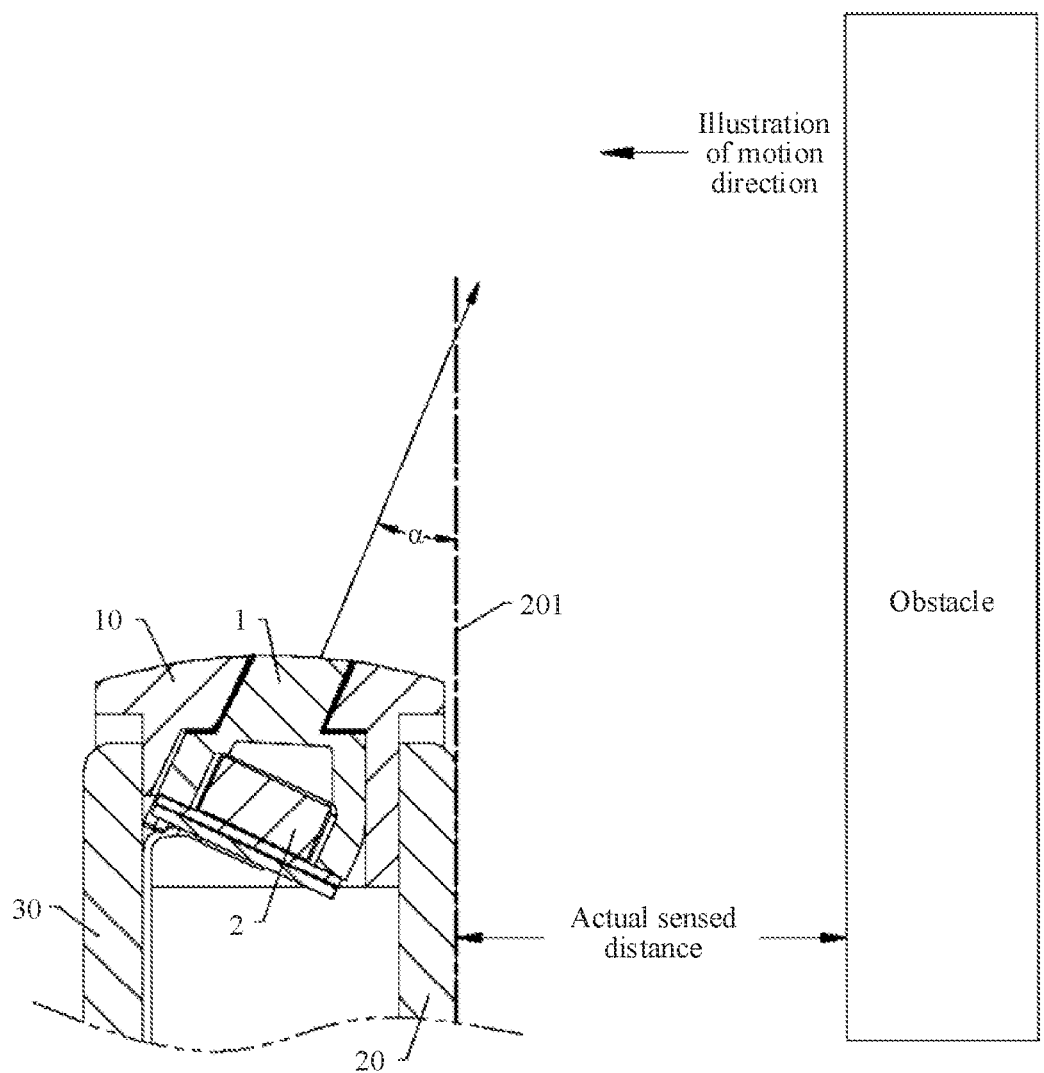
FIG. 11 is a schematic diagram of the structure shown in FIG. 10 in a use state.

Referring to FIG. 9 to FIG. 11 together, FIG. 9 is a schematic structural diagram of the terminal 100 shown in FIG. 1 from another perspective, FIG. 10 is a cross-sectional view of a partial structure of the terminal 100 shown in FIG. 9 along a line A-A in a first embodiment, and FIG. 11 is a schematic diagram of the structure shown in FIG. 10 in a use state. FIG. 9 is a schematic top view of the terminal 100 shown in FIG. 1.

The screen 20 and the back cover 30 are fastened to two sides of the bezel 10 that deviate from each other. The lampshade 1 is located on an inner side of the bezel 10 and partially accommodated in the through hole 101. The proximity light assembly 2 is located on the inner side of the bezel 10. The proximity light assembly 2 is configured to emit emitted light (as shown by a solid-line arrow toward the lampshade 1 in FIG. 10) into the lampshade 1 and receive induced light (as shown by a dotted-line arrow away from the lampshade 1 in FIG. 10) passing through the lampshade 1. The emitted light passes through the lampshade 1 to form emergent light (as shown by a solid-line arrow away from the lampshade 1 in FIG. 10 and FIG. 11). The emergent light intersects with a plane 201 in which the screen 20 is located (the plane 201 is illustrated by dotted lines in FIG. 10 and FIG. 11). That is, the emergent light is inclined toward a direction close to the screen 20. The plane 201 in which the screen 20 is located may be understood as a plane on which a light-exiting surface of the screen 20 is located. For ease of understanding, in this embodiment of this application, the angle formed between the emergent light and the plane 201 in which the screen 20 is located is defined as a front inclination angle $\alpha$. The front inclination angle $\alpha$ may also be understood as an angle at which the emergent light is inclined toward the direction close to the screen 20 relative to the XY plane. Because the emergent light intersects with the plane 201 in which the screen 20 is located, the emergent light has a front inclination angle. When the user uses the terminal 100 and approaches the screen 20, the emergent light can be emitted to the user. The emergent light is reflected by the user to form reflected light (as shown by a dotted-line arrow toward the lampshade 1 in FIG. 10). A part of the reflected light passes through the lampshade 1 to form induced light. The proximity light assembly 2 receives the induced light to form a corresponding signal. The terminal 100 can determine a distance between the user and the screen 20 through the signal, so as to determine whether a user is approaching, and then the screen 20 may be turned off or turned on in some scenarios.

In this embodiment of this application, the terminal 100 can change a direction of light through an optical refraction effect of the lampshade 1, so that the emitted light emitted by the proximity light assembly 2 passes through the lampshade 1 to form the emergent light, and the emergent light intersects with the plane 201 in which the screen 20 is located. The emergent light can be emitted to an obstacle located in front of the screen 20 or in contact with the screen 20 to detect an approaching state of the obstacle. Because the through hole 101 is disposed on the bezel 10, the lampshade 1 is partially accommodated in the through hole 101, the light can pass through the through hole 101 through the lampshade 1, so that the proximity light assembly 2 located on the inner side of the bezel 10 implements detection.

The proximity light assembly 2 can sense a distance between an obstacle (for example, a human face) and the screen 20 based on a use scenario of the user. The proximity light assembly 2 may be used in a near-screen-off scenario in a regular phone call and an anti-accidental touch scenario for daily use. For example, a user puts the terminal 100 in a pocket, and the screen 20 is turned on due to movement or accidental touch. In this case, an unintentional operation on the screen 20 may occur, for example, mistakenly triggering password unlock, track unlock, dialing, fingerprint recognition, and other scenarios. If the terminal 100 is not provided with an anti-accidental touch function, in the above scenarios, due to unconscious unlocking and other operations, it is easy to lock the terminal 100 because of a large quantity of incorrect password inputs or dial incorrectly. When the proximity light assembly 2 is added to prevent an unintentional misoperation, an operation response action of the screen 20 may be shielded by using software when the proximity light assembly 2 senses that a user is relatively close to the screen 20, so that the terminal 100 has more accurate response actions for different usage scenarios, thereby improving user experience. In the scenarios of dialing, during a call (for example, when a call is made or a call is connected), the terminal 100 may determine, according to the proximity light assembly 2, whether an external object is approaching. If an external object is approaching, the screen 20 is turned off to prevent accidental touch of the external object on the screen 20 during a call. If the external object moves away, the screen 20 is turned on, so that the screen 20 is in an operable state.

The lampshade 1 includes a first surface 121 (refer to FIG. 5) and a second surface 131 (refer to FIG. 6) disposed opposite to each other.

The first surface 121 is flush with the outer surface 102 of the bezel 10. In other words, the first surface 121 transits to the outer surface 102 of the bezel 10 in a flush manner. For example, if the outer surface 102 of the bezel 10 is flat, the first surface 121 is also flat if the outer surface 102 of the bezel 10 has a radian, the first surface 121 also has a radian, and the radian is consistent with that of the outer surface 102 of the bezel 10. In the embodiment of this application, description is made by using an example in which the first surface 121 has a radian.

The emitted light enters the lampshade 1 through the second surface 131. The emergent light exits the lampshade 1 through the first surface 121. When the emergent light is reflected by an obstacle to form reflected light, the reflected light enters the lampshade 1 through the first surface 121. The reflected light emits the induced light from the second surface 131 after being refracted by the lampshade 1.

In this embodiment, because the first surface 121 is flush with the outer surface 102 of the bezel 10, the terminal 100 has a high aesthetic appearance, and it is not easy to accumulate dust and other dirt between the first surface 121 and the outer surface 102 of the bezel 10.

The appearance of the first surface 121 is black. The outer surface 102 of the bezel 10 may also be black, so that the first surface 121 well matches the outer surface 102 of the bezel 10 in appearance.

Figure 12A:
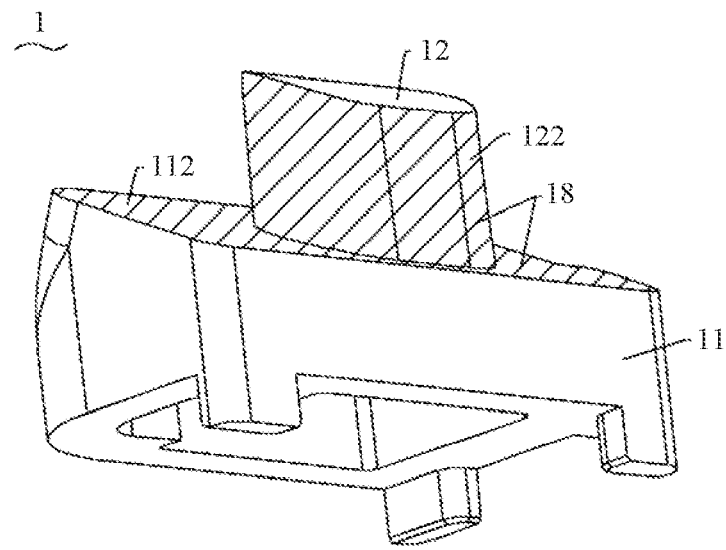
FIG. 12A is a schematic three-dimensional structural diagram of a lampshade shown in FIG. 10 in an implementation.
Figure 12B:
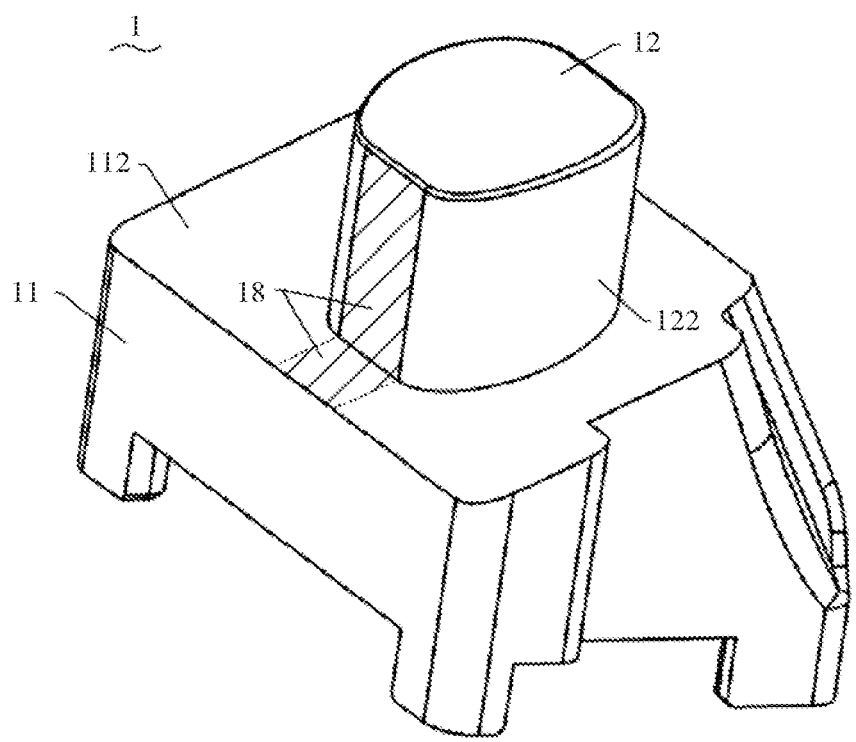
FIG. 12B is a schematic three-dimensional structural diagram of the lampshade shown in FIG. 10 in another implementation.
Figure 12C:
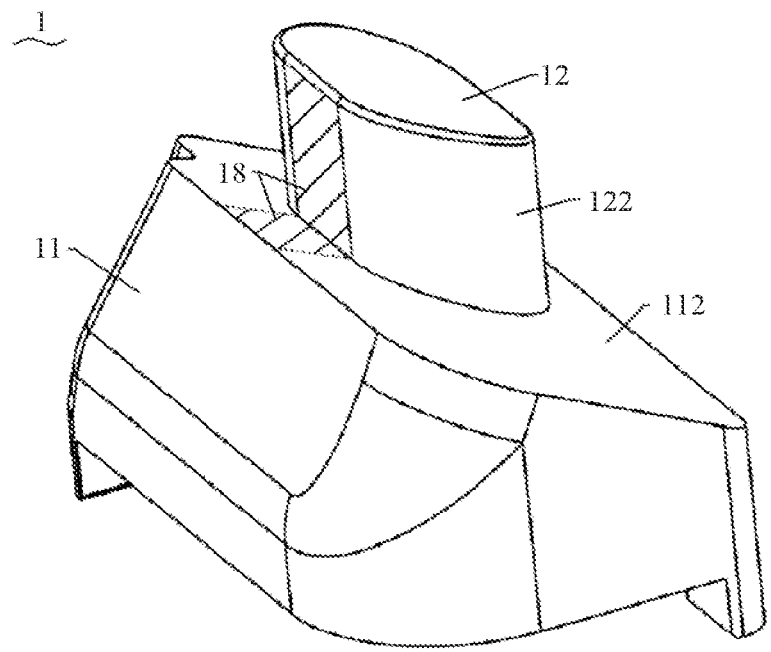
FIG. 12C is a schematic structural diagram of the lampshade shown in FIG. 12B from another perspective.

Referring to FIG. 10 and FIG. 12A to FIG. 12C together, FIG. 12A is a schematic three-dimensional structural diagram of the lampshade 1 shown in FIG. 10 in an implementation, FIG. 12B is a schematic three-dimensional structural diagram of the lampshade 1 shown in FIG. 10 in another implementation, and FIG. 12C is a schematic structural diagram of the lampshade shown in FIG. 12B from another perspective. The structure of the lampshade 1 shown in FIG. 12A to FIG. 12C corresponds to that of the lampshade 1 shown in FIG. 6.

The lampshade 1 further includes a light-absorbing layer 18. The light-absorbing layer 18 is capable of absorbing infrared light. The lampshade 1 includes a fixed portion 11 and an embedded portion 12 fixedly connected to the fixed portion 11. The fixed portion 11 includes a fixed surface 112. The embedded portion 12 is located on the fixed surface 112. The embedded portion 12 includes a limiting surface 122. The limiting surface 122 is connected to the fixed surface 112.

The light-absorbing layer 18 covers a part or all of the limiting surface 122 and the fixed surface 112. Coverage of the light-absorbing layer 18 includes, but is not limited to, the following: the light-absorbing layer 18 may cover a part of the limiting surface 122, cover a part of the fixed surface 112, cover a part of the limiting surface 122 and a part of the fixed surface 112, cover all of the limiting surface 122, cover all of the fixed surface 112, cover all of the limiting surface 122 and all of the fixed surface 112, cover a part of the limiting surface 122 and all of the fixed surface 112, cover all of the limiting surface 122 and a part of the fixed surface 112, and so on.

In this embodiment, because the light-absorbing layer 18 covers a part or all of the limiting surface 122 and the fixed surface 112 and the light-absorbing layer 18 is capable of absorbing infrared light, the light-absorbing layer 18 is capable of absorbing stray reflected light to suppress reflected stray light inside the lampshade 1, so as to selectively emit and then selectively receive effective light refracted and twisted by the lampshade 1, that is, selectively emit and receive effective light. This achieves a light filtering effect, improves a signal-to-noise ratio, and ensures proximity sensing performance of the proximity light assembly 2.

In an implementation, the entire fixed surface 112 and the entire limiting surface 122 are coated by the light-absorbing layer 18 to better absorb reflection energy of scattered light. In FIG. 10, the light-absorbing layer 18 is shown by using bold lines, and in FIG. 12A, a position of the light-absorbing layer 18 is highlighted by using regions covered by slashes.

In another implementation, the light-absorbing layer 18 coats one or more regions, in which noise reflection paths are relatively concentrated, of the fixed surface 112 and the limiting surface 122. For example, as shown in FIG. 12B and FIG. 12C, the position of the light-absorbing layer 18 is highlighted by using regions covered by slashes in FIG. 12B and FIG. 12C. The light-absorbing layer 18 coats two regions of the limiting surface 122 and two regions of the fixed surface 112. In FIG. 12B, the regions of the limiting surface 122 that are covered by the light-absorbing layer 18 are substantially toward the back cover 30, and the regions of the fixed surface 112 that are coated by the light-absorbing layer 18 are adjacent to the regions of the limiting surface 122 that are covered by the light-absorbing layer 18. In FIG. 12C, the regions of the limiting surface 122 that are covered by the light-absorbing layer 18 are substantially toward the screen 20, and the regions of the fixed surface 112 that are coated by the light-absorbing layer 18 are adjacent to the regions of the limiting surface 122 that are covered by the light-absorbing layer 18. In this embodiment of this application, regions, in which noise reflection paths are concentrated, of the fixed surface 112 and the limiting surface 122 may also be obtained by simulation.

In another embodiment, in addition to the fixed surface 112 and the limiting surface 122, the light-absorbing layer 18 may further cover another region in a surface of the lampshade 1 other than the first surface 121 and the second surface 131.

The light-absorbing layer 18 is made of a block ink material. Particles in the black ink can absorb light energy.

Referring to FIG. 10, optionally, the first surface 121 may be optically polished. The second surface 131 may also be optically polished. The fixed surface 112 and the limiting surface 122 may be spark-textured to ensure a low reflection effect.

Referring to FIG. 10, optionally, an incident angle at which the emitted light is emitted into the second surface 131 is less than or equal to 40°. In this case, the lampshade 1 may not only meet deflection requirements of the light through an optical refraction effect, but also suppress reflected light of the light and reduce a reflection proportion. That is, the lampshade 1 reduces a proportion of a loss of stray light by controlling a ratio of reflection energy of the light to refraction energy of the light within a specific range, so that the proximity light assembly 2 has higher detection accuracy.

In an implementation, a material of the lampshade 1 may be polymethyl methacrylate (polymethyl methacrylate, PMMA). Alternatively, a material of the lampshade 1 may be a polycarbonate (polycarbonate, PC) material. When the lampshade 1 is made of different materials, an upper limit of the incident angle at which the emitted light is emitted into the second surface 131 may also be adjusted correspondingly. For example, when the material of the lampshade 1 is PMMA, the incident angle at which the emitted light is emitted into the second surface 131 is less than or equal to 35°.

In an implementation, the material of the lampshade 1 may have a refractive index ranging from 1.49 to 1.53.

Figure 13:
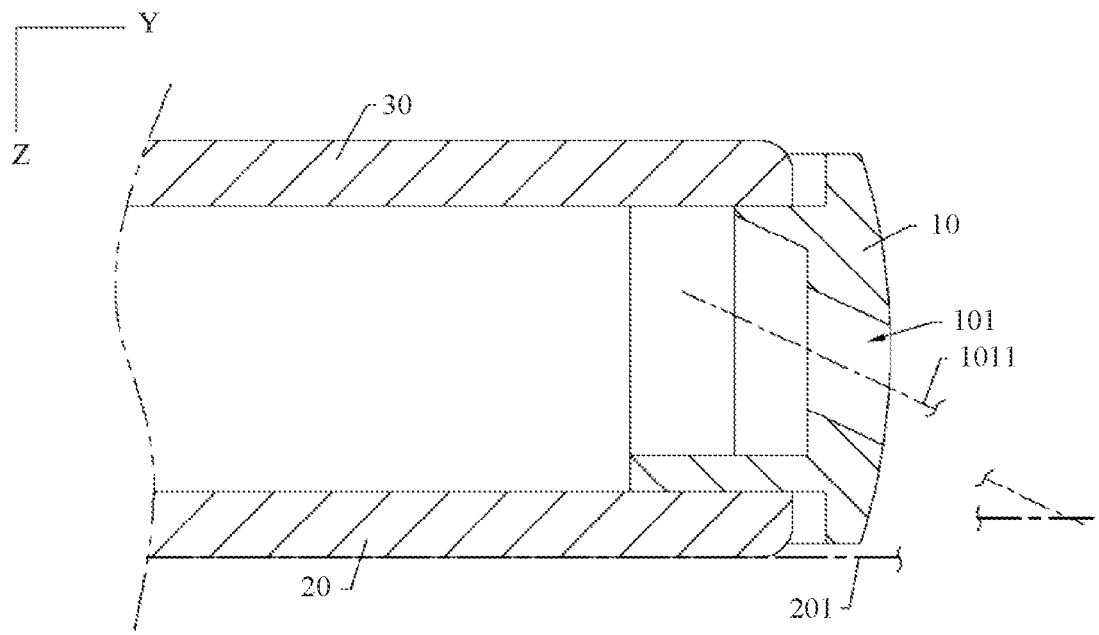
FIG. 13 is a schematic structural diagram of a part of the structure shown in FIG. 10.

Referring to FIG. 10 and FIG. 13 together, FIG. 13 is a schematic structural diagram of a part of the structure shown in FIG. 10.

In an implementation, an axis 1011 of the through hole 101 intersects with the plane 201 in which the screen 20 is located. The hole wall of the through hole 101 matches the shape of the limiting surface 122, and the limiting surface 122 is provided with the light-absorbing layer 18. Therefore, a direction in which the light enters or exits the lampshade 1 may be affected by the through hole 101. When the axis 1011 of the through hole 101 intersects with the plane 201 in which the screen 20 is located, it facilitates emission of the emitted light intersecting with the plane 201 in which the screen 20 is located and also facilitates entry of the induced light into the proximity light assembly 2.

In an implementation, the axis 1011 of the through hole 101 is parallel to an emission direction of the emitted light. In this case, the lampshade 1 can detect required light through more proximity light assemblies 2 and filter some useless reflected stray light.

In an implementation, referring to FIG. 3A and FIG. 9 together, the bezel 10 includes a left side surface 1023 and a right side surface 1024 disposed opposite to each other. The left side surface 1023 and the right side surface 1024 are connected between the top surface 1021 and the bottom surface 1022. A center plane of the left side surface 1023 and the right side surface 1024 is an axial surface 1025. A distance between the axial surface 1025 and the left side surface 1023 is substantially equal to that between the axial surface 1025 and the right side surface 1024. The axis 1011 of the through hole 101 is located between the axial surface 1025 and the right side surface 1024, and a distance between the axis 1011 of the through hole 101 and the axial surface 1025 is less than that between the axis 1011 of the through hole 101 and the right side surface 1024.

In this embodiment, although the axis 1011 of the through hole 101 deviates from the axial surface 1025, the through hole 101 is still located in a position close to the axial surface 1025, so that the lampshade 1 can be located in a position close to the middle of the terminal 100. Because a side opening of the through hole 101 is disposed on the top surface 1021 of the bezel 10, the lampshade 1 is located in a position close to the middle of the top of the terminal 100, that is, the proximity light assembly 2 performs detection through the position close to the middle of the top of the terminal 100. In this case, when the user answers a call, the proximity light assembly 2 can also better give consideration to experience of left and right hands and ears of the user, and ensure better proximity sensing performance.

In another implementation, the axis 1011 of the through hole 101 is located between the axial surface 1025 and the left side surface 1023, and a distance between the axis 1011 of the through hole 101 and the axial surface 1025 is less than that between the axis 1011 of the through hole 101 and the left side surface 1023. Similarly, in this implementation, the proximity light assembly 2 can also give consideration to experience of left and right hands and ears of the user, and ensure better proximity sensing performance.

In another implementation, the axis 1011 of the through hole 101 is located in the axial surface 1025. Because the lampshade 1 is partially accommodated in the through hole 101, the position of the lampshade 1 is defined by the through hole 101. When the axis 1011 of the through hole 101 is located in the axial surface 1025, the lampshade 1 is located in a middle position of the terminal 100. Because a side opening of the through hole 101 is disposed on the top surface 1021 of the bezel 10, the lampshade 1 is located in a middle position at the top of the terminal 100, that is, the proximity light assembly 2 performs detection through the middle position at the top of the terminal 100. In this case, when the user answers a call, the proximity light assembly 2 can give consideration to experience of left and right hands and ears of the user, and ensure better proximity sensing performance.

Referring to FIG. 9 and FIG. 10 together, in an implementation, the back cover 30 is fastened to one side that is of the bezel 10 and that is away from the screen 20. A distance between an opening of the through hole 101 on the outer surface 102 of the bezel 10 and the screen 20 is less than that between the opening and the back cover 30. That is, the distance between the opening of the through hole 101 on the outer surface 102 of the bezel 10 and the screen 20 is less than that between the opening of the through hole 101 on the outer surface 102 of the bezel 10 and the back cover 30.

In this embodiment, the opening of the through hole 101 on the outer surface 102 of the bezel 10 is closer to the screen 20 than the back cover 30, so that the first surface 121 is closer to the screen 20 than the back cover 30, thereby facilitating proximity sensing detection of the proximity light assembly 2. Based on an arc contour of a conventional bezel, the outer surface 102 of the bezel 10 may be substantially a curved surface and inclined toward the plane 201 in which the screen 20 is located. Therefore, the first surface 121 may also be substantially inclined toward the plane 201 in which the screen 20 is located. This is conducive to achieving a relatively large front inclination angle of the emergent light of the proximity light assembly 2.

In another embodiment, the distance between the opening of the through hole 101 on the outer surface 102 of the bezel 10 and the screen 20 may also be equal to or greater than that between the opening of the through hole 101 on the outer surface 102 of the bezel 10 and the back cover 30. In this case, a position of the second surface 131 of the lampshade 1 may be set, so that the emergent light of the proximity light assembly 2 has a front inclination angle meeting requirements.

Referring to FIG. 10 and FIG. 11 together, in an implementation, an angle greater than or equal to 25° is formed between the emergent light and the plane 201 in which the screen 20 is located. That is, the front inclination angle $\alpha$ is greater than or equal to 25°. In this embodiment of this application, an acute angle is formed between the emergent light and the plane 201 in which the screen 20 is located. That is, when the emergent light has an acute front inclination angle $\alpha$, the emergent light tilts toward the screen 20 at a sufficient angle, so that the emergent light can better cover a space range that needs to be detected by the proximity light assembly 2, so as to meet use requirements of the terminal 100. When the angle formed between the emergent light and the plane 201 in which the screen 20 is located is greater than or equal to 25°, the emergent light can basically cover the space range that needs to be detected by the proximity light assembly 2. In this embodiment of this application, a detection effect of the proximity light assembly 2 when the proximity light assembly emits and receives light through the through hole 101 on the bezel 10 is relatively close to a detection effect of the proximity light assembly that emits and receives light through an edge region of the front cover (in this case, the proximity light assembly is located on the periphery of the screen) in a conventional solution.

When sensing performance of the proximity light assembly 2 is unchanged, an actual proximity detection success rate is higher if the angle between the emergent light and the plane 201 in which the screen 20 is located is greater and an actual induction distance of the proximity light assembly 2 in a direction perpendicular to the plane 201 in which the screen 20 is located is farther. As shown in FIG. 11, because energy of light is constantly attenuated during propagation, an effective propagation distance of the emergent light is limited, and a distance that can be sensed by the proximity light assembly 2 is also limited. When the emergent light is reflected within the effective propagation distance to form reflected light, the reflected light can be sensed by the proximity light assembly 2. As shown in FIG. 11, it is assumed that the effective propagation distance of the emergent light is a first value and that an actual sensed distance of the proximity light assembly 2 in a direction perpendicular to the plane 201 in which the screen 20 is located is a second value. A ratio of the second value to the first value is correlated with magnitude of the angle $\alpha$ between the emergent light and the plane 201 in which the screen 20 is located. When the first value is unchanged, the second value is greater if $\alpha$ is greater. That is, the actual sensed distance of the proximity light assembly 2 in the direction perpendicular to the plane 201 in which the screen 20 is located is farther if the angle $\alpha$ between the emergent light and the plane 201 in which the screen 20 is located is greater.

Figure 14A:
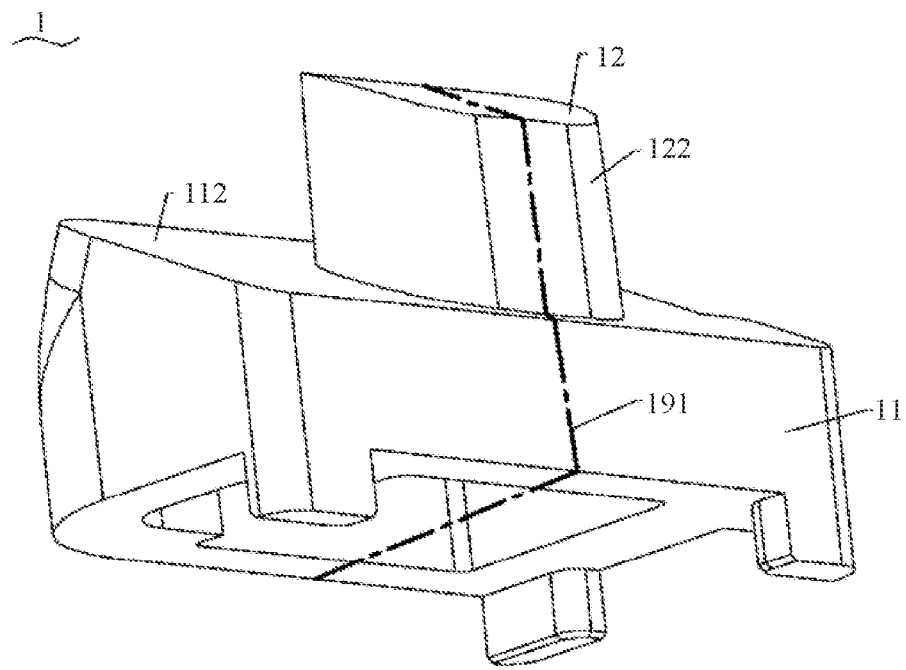
FIG. 14A is another schematic structural diagram of the lampshade shown in FIG. 12A.
Figure 14B:
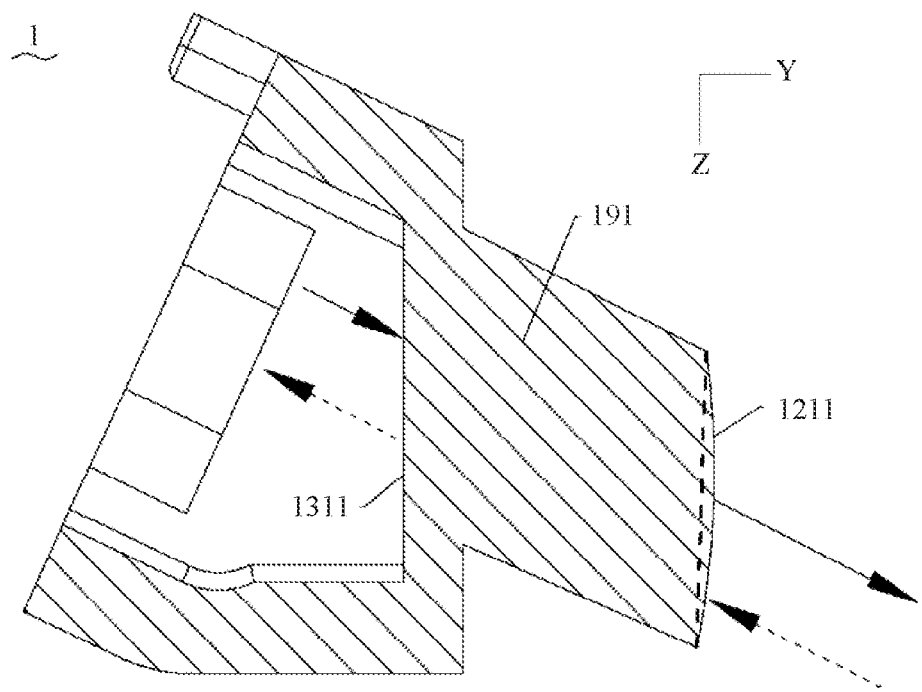
FIG. 14B is a schematic planar structural diagram of the lampshade shown in FIG. 12A cut along a first reference plane.
Figure 15:
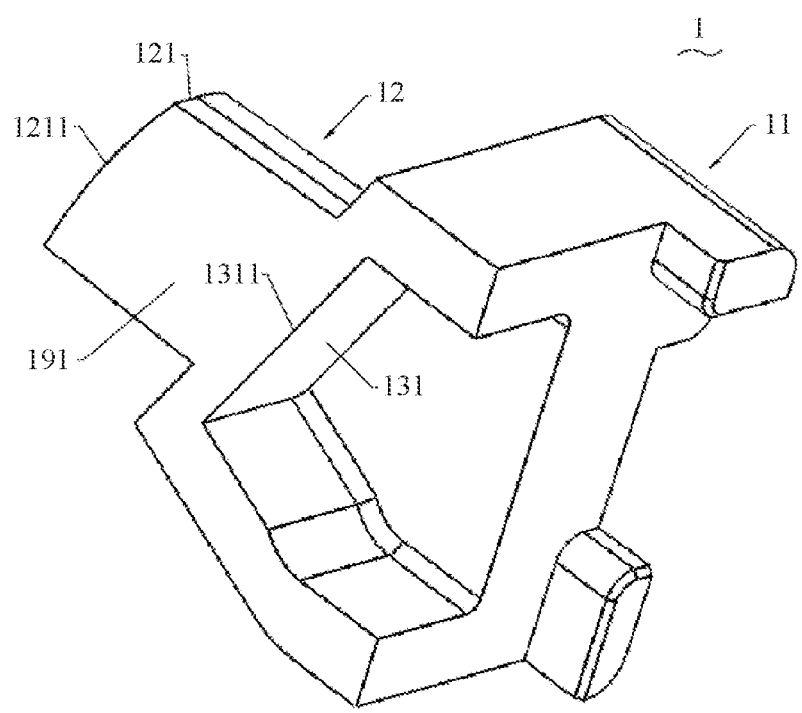
FIG. 15 is a schematic three-dimensional structural diagram of the lampshade shown in FIG. 12A cut along the first reference plane.

Referring to FIG. 2, FIG. 10, and FIG. 14A to FIG. 15, FIG. 14A is another schematic structural diagram of the lampshade 1 shown in FIG. 12A, FIG. 14B is a schematic planar structural diagram of the lampshade 1 shown in FIG. 12A cut along a first reference plane 191, and FIG. 15 is a schematic three-dimensional structural diagram of the lampshade 1 shown in FIG. 12A cut along the first reference plane 191. FIG. 14A illustrates an approximate position of the first reference plane 191 through dash-dotted lines in bold.

The bezel 10 includes a top surface 1021 and a bottom surface 1022 disposed opposite to each other. The top surface 1021 and the bottom surface 1022 are a part of the outer surface 102 of the bezel 10. The outer surface 102 of the bezel 10 further includes a left side surface 1023 and a right side surface 1024 disposed opposite to each other, and the left side surface 1023 and the right side surface 1024 are connected between the top surface 1021 and the bottom surface 1022. When the user uses the terminal 100, the top surface 1021 is substantially upward, the bottom surface 1022 is substantially downward, the left side surface 1023 is close to a left-hand side of the user, and the right side surface 1024 is close to a right-hand side of the user.

A side opening of the through hole 101 is disposed on the top surface 1021. The lampshade 1 and the proximity light assembly 2 are disposed at the top of the terminal 100. A perpendicular direction of the top surface 1021 toward the bottom surface 1022 is a vertical direction (that is, Y direction). A section of the lampshade 1 in the vertical direction (that is, Y direction) includes a first reference plane 191 perpendicular to the screen 20. The lampshade 1 includes a plurality of sections parallel to the vertical direction (that is, Y direction) and perpendicular to the screen 20, and the first reference plane 191 is one of the plurality of sections. The first reference plane 191 is parallel to the YZ plane. The first reference plane 191 coincides with the A-A line shown in FIG. 9. Therefore, the section of the lampshade 1 shown in FIG. 10 is the first reference plane 191. The structure of the lampshade 1 shown in FIG. 14B corresponds to that of the lampshade 1 shown in FIG. 10.

The first surface 121 intersects with the first reference plane 191 to form a first intersection line 1211. The second surface 131 intersects with the first reference plane 191 to form a second intersection line 1311. The first intersection line 1211 is substantially parallel to the second intersection line 1311. An emission direction of the emitted light of the proximity light assembly 2 intersects with the plane 201 in which the screen 20 is located.

In this embodiment, because the first intersection line 1211 is parallel to the second intersection line 1311, light passing through the first surface 121 and the second surface 131 may not or almost not deflect in the direction of the first reference plane 191, that is, the light may not deflect in the YZ plane. In other words, in the YZ plane, when the emitted light passes through the lampshade 1 to form the emergent light, the direction of the emergent light is substantially the same as the direction of the emitted light, so as to ensure relatively low optical noise and avoid affecting the normal use of the receiving performance of the proximity light assembly 2. The direction of the emitted light intersects with the plane 201 in which the screen 20 is located, and then the direction of the emergent light also intersects with the plane 201 in which the screen 20 is located. An angle greater than or equal to 25° may be formed between the direction of the emitted light and the plane 201 in which the screen 20 is located.

It may be understood that when the first surface 121 has a radian, the first intersection line 1211 is an arc line. In this embodiment of this application, to simplify a relative position relationship between the first intersection line 1211 and other structures, description is provided by making the first intersection line 1211 equal to a straight-line segment (as shown by the dotted line in FIG. 14B). The straight-line segment passes through two endpoints of the first intersection line 1211. For example, in FIG. 14B, the first intersection line 1211 being parallel to the second intersection line 1311 actually means that the straight-line segment passing through the two endpoints of the first intersection line 1211 is parallel to the second intersection line 1311. In another embodiment, an included angle being formed between the first intersection line 1211 and the second intersection line 1311 actually means that an included angle is formed between the straight-line segment passing through the two endpoints of the first intersection line 1211 and the second intersection line 1311. In the following embodiments, the description of the relative position relationship between the first intersection line and other structures may be understood with reference to the description in this paragraph.

In an implementation, both the first surface 121 and the second surface 131 are perpendicular to the first reference plane 191. In this case, the first surface 121 is parallel to the second surface 131, a light path after the light passes through the first surface 121 and the second surface 131 may not or almost not deflect, and optical noise when the light passes through the lampshade 1 is relatively low.

It may be understood that the first surface 121 may be either a cambered surface or a plane. In this embodiment of this application, to simplify a relative position relationship between the first surface 121 and other structures, description is provided by making the cambered first surface 121 equal to a plane. The plane is a plane on which edge lines of the first surface 121 are located. For example, the first surface 121 being perpendicular to the first reference plane 191 means that the plane on which the edge lines of the first surface 121 are located is perpendicular to the first reference plane 191. The first surface 121 being parallel to the second surface 131 means that the plane on which the edge lines of the first surface 121 are located is parallel to the second surface 131. An included angle being formed between the first surface 121 and the second surface 131 means that an included angle is formed between the plane on which the edge lines of the first surface 121 are located and the second surface 131. In the following embodiments, the description of the relative position relationship between the first surface and other structures may be understood with reference to the description in this paragraph.

Figure 16:
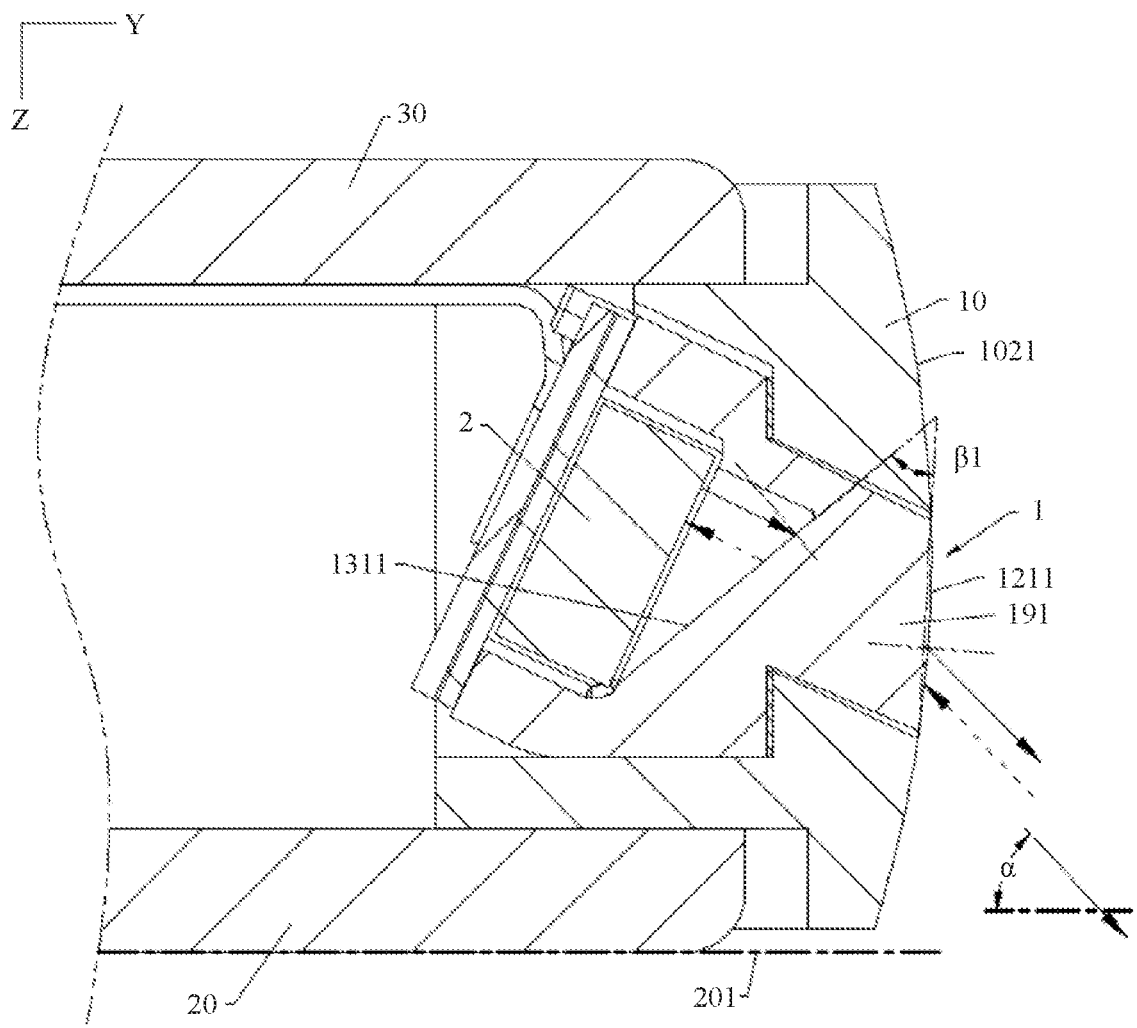
FIG. 16 is a cross-sectional view of a partial structure of the terminal shown in FIG. 9 along an A-A line in a second embodiment.

FIG. 16 is a cross-sectional view of a partial structure of the terminal 100 shown in FIG. 9 along the A-A line in a second embodiment. Most technical solution contents in this embodiment the same as those in the above embodiments are not described in detail.

An angle greater than or equal to 45° is formed between the emergent light (as shown by the solid-line arrow away from the lampshade 1 in FIG. 16) and the plane 201 in which the screen 20 is located. That is, the front inclination angle α is greater than or equal to 45°. In this embodiment of this application, when the front inclination angle α of the emergent light is greater than or equal to 45°, the proximity sensing performance of the proximity light assembly 2 can be significantly improved. The front inclination angle α of the emergent light may be greater than or equal to 60°, and the proximity sensing performance of the proximity light assembly 2 can achieve or be better than the performance of the proximity light assembly emitting and receiving light through the periphery of the screen in the conventional solution.

Figure 17:
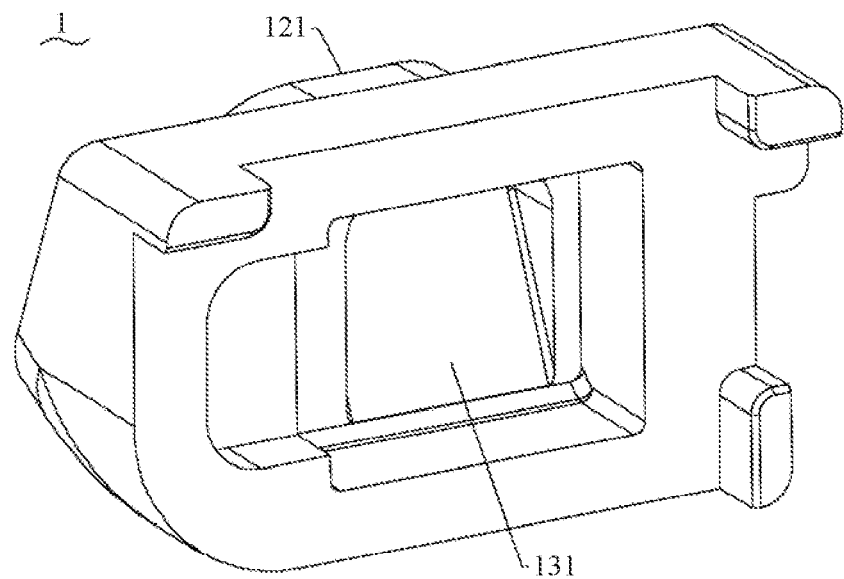
FIG. 17 is a schematic three-dimensional structural diagram of a lampshade shown in FIG. 16.
Figure 18:
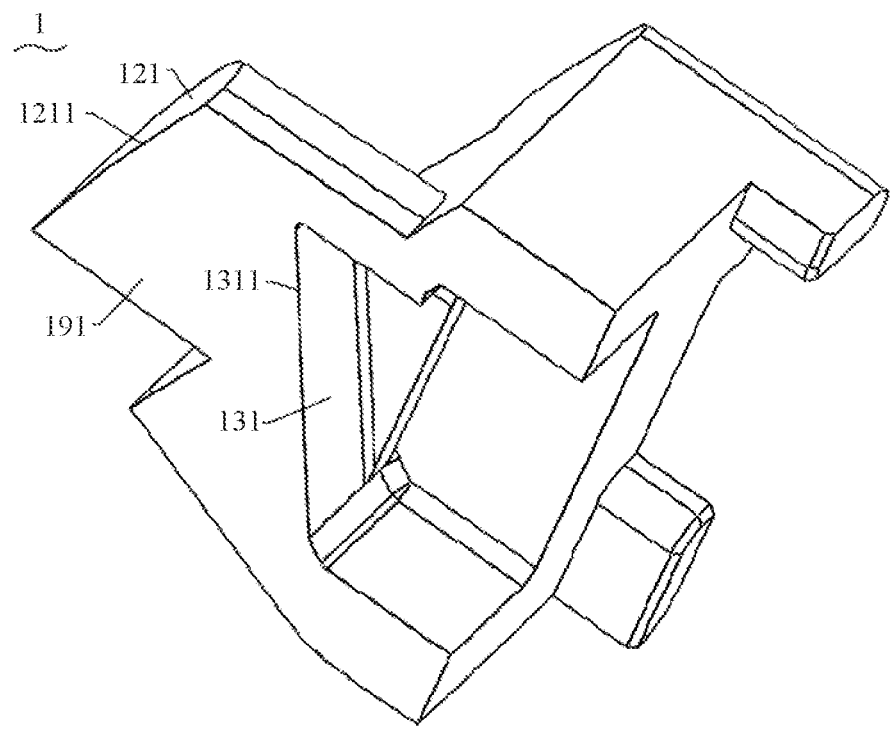
FIG. 18 is a schematic three-dimensional structural diagram of the lampshade shown in FIG. 17 cut along the first reference plane.

Referring to FIG. 16 to FIG. 18 together, FIG. 17 is a schematic three-dimensional structural diagram of the lampshade 1 shown in FIG. 16, and FIG. 18 is a schematic three-dimensional structural diagram of the lampshade 1 shown in FIG. 17 cut along the first reference plane 191.

A section of the lampshade 1 in the vertical direction (that is, Y direction) includes a first reference plane 191 perpendicular to the screen 20. The first reference plane 191 coincides with the A-A line shown in FIG. 9. Therefore, the section of the lampshade 1 shown in FIG. 16 is the first reference plane 191. The first surface 121 intersects with the first reference plane 191 to form a first intersection line 1211. The second surface 131 intersects with the first reference plane 191 to form a second intersection line 1311. The first intersection line 1211 and the second intersection line 1311 gradually move away from each other in a direction close to the screen 20. In other words, a first angle β1 is formed between the first intersection line 1211 and the second intersection line 1311, and an opening of the first angle β1 is toward the screen 20.

In this embodiment, because the first intersection line 1211 and the second intersection line 1311 gradually move away from each other in the direction close to the screen 20, light passing through the first surface 121 and the second surface 131 may deflect in the direction of the first reference plane 191 toward the direction close to the screen 20, that is, the light deflects in the YZ plane toward the direction close to the screen 20, so as to increase the front inclination angle α of the emergent light to improve the proximity sensing performance of the proximity light assembly 2.

The lampshade 1 forms a structure similar to a prism through a relative position relationship between the first surface 121 and the second surface 131, so that the light is refracted when passing through the lampshade 1, thereby changing a direction of a light path. Moreover, the lampshade 1 makes the light passing through the lampshade 1 closer to the screen 20 through a relative position relationship between the first surface 121, the second surface 131, and the screen 20, thereby increasing the front inclination angle α of the emergent light.

In an implementation, an included angle greater than or equal to 45° is formed between the first intersection line 1211 and the second intersection line 1311. That is, the first angle β1 is greater than or equal to 45°. In this embodiment, when the included angle between the first intersection line 1211 and the second intersection line 1311 is greater than or equal to 45°, the front inclination angle α of the emergent light passing through the lampshade 1 may be relatively large, thereby meeting use requirements.

For example, in FIG. 16, an incident angle of the emitted light (shown by the solid-line arrow toward the lampshade 1) is 25°, the first angle β1 between the first intersection line 1211 and the second intersection line 1311 is 50°, and when the lampshade 1 is made of a material with a refractive index of 1.49, an exit angle of the emergent light (shown by the solid-line arrow away from the lampshade 1) is 56°. In the XY plane, the emergent light deviates by 31° toward the direction close to the screen 20 relative to the emitted light.

In an implementation, both the first surface 121 and the second surface 131 are perpendicular to the first reference plane 191. In this case, the first surface 121 and the second surface 131 also gradually move away from each other in the direction close to the screen 20, an included angle is formed between the first surface 121 and the second surface 131, the lampshade 1 forms a structure similar to a prism, and the light further deflects toward the direction dose to the screen 20 after passing through the first surface 121 and the second surface 131.

In an implementation, the emitted light (as shown by the solid-line arrow toward the lampshade 1 in FIG. 16) emitted by the proximity light assembly 2 may be obliquely emitted into the second surface 131. An emission angle of the emitted light intersects with the plane 201 in which the screen 20 is located. The emitted light deflects toward the direction close to the screen 20 for the first time when entering the first surface 121, and deflects toward the direction close to the screen 20 for the second time when the light exits the second surface 131 and forms the emergent light (as shown by the solid-line arrow away from the lampshade 1 in FIG. 16), so that the emergent light has a larger front inclination angle α.

Figure 19:
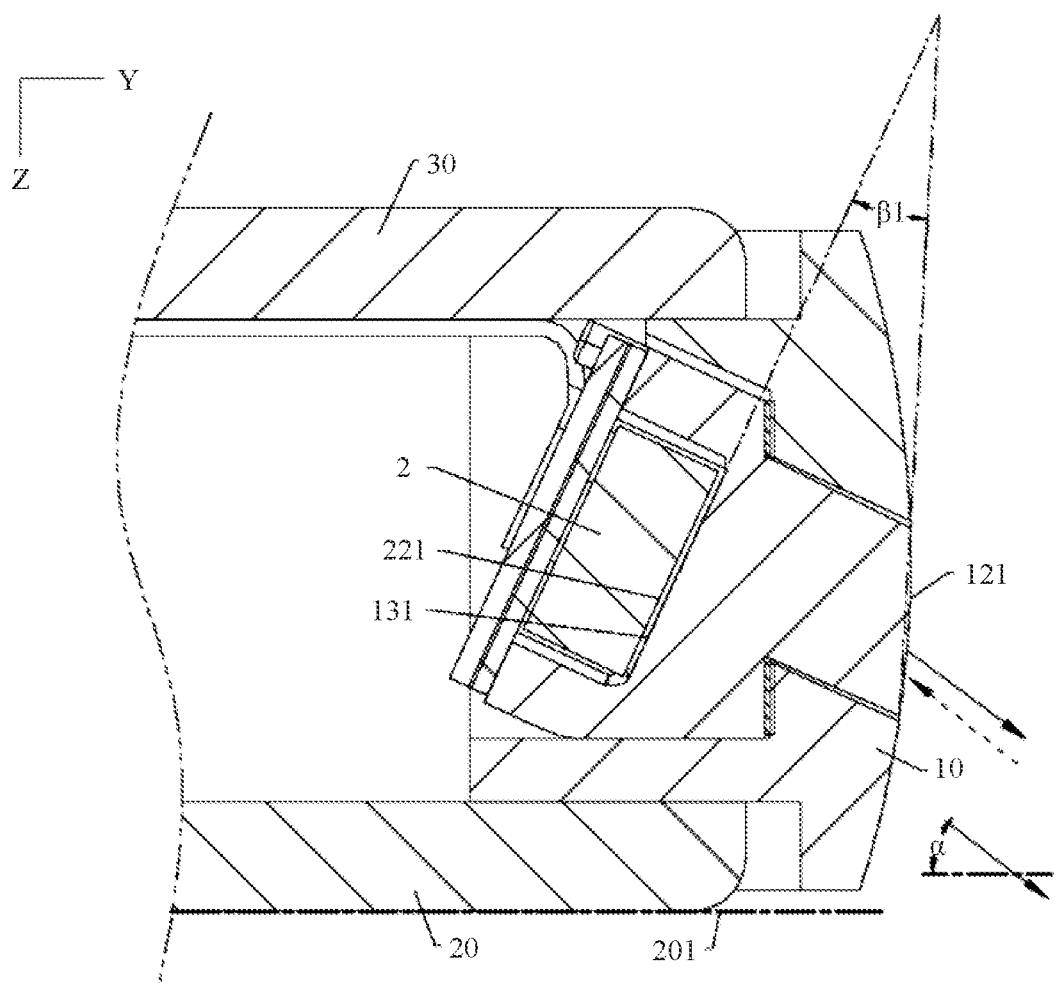
FIG. 19 is a cross-sectional view of a partial structure of the terminal shown in FIG. 9 along the A-A line in a third embodiment.
Figure 20:
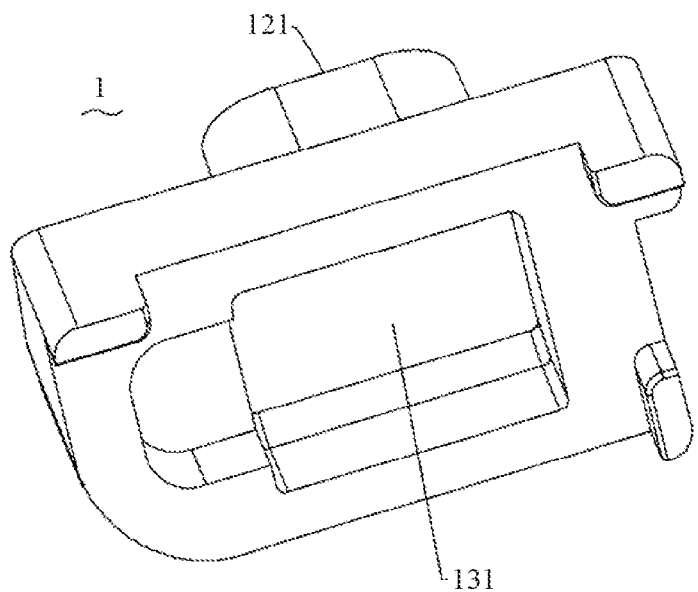
FIG. 20 is a schematic three-dimensional structural diagram of a lampshade shown in FIG. 19.
Figure 21:
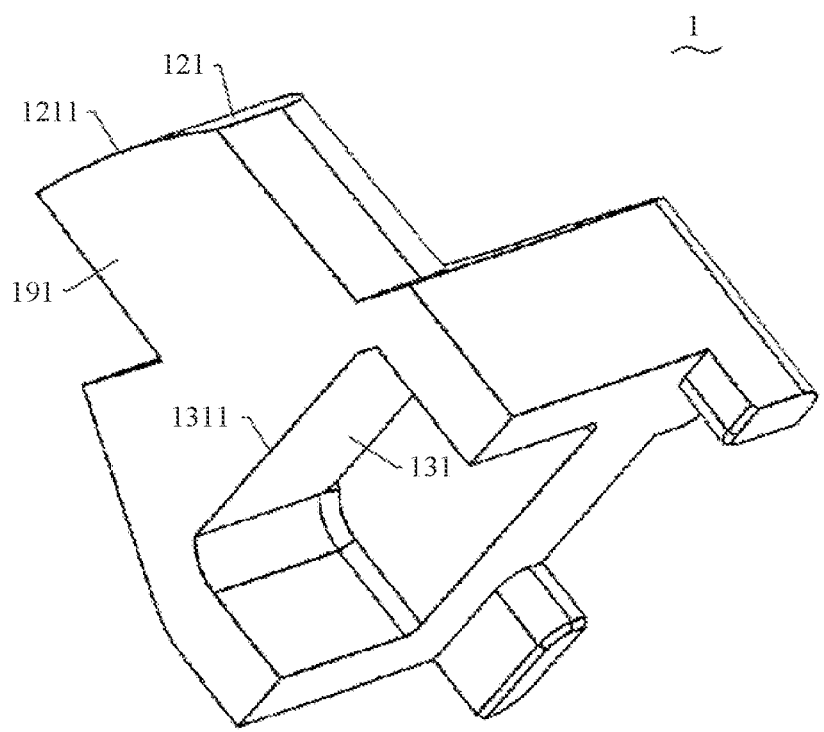
FIG. 21 is a schematic three-dimensional structural diagram of the lampshade shown in FIG. 20 cut along the first reference plane.

Referring to FIG. 19 to FIG. 21 together, FIG. 19 is a cross-sectional view of a partial structure of the terminal 100 shown in FIG. 9 along the A-A line in a third embodiment, FIG. 20 is a schematic three-dimensional structural diagram of the lampshade 1 shown in FIG. 19, and FIG. 21 is a schematic three-dimensional structural diagram of the lampshade 1 shown in FIG. 20 cut along the first reference plane 191. Most technical solution contents in this embodiment the same as those in the above embodiments are not described in detail.

The emitted light emitted by the proximity light assembly 2 is perpendicularly emitted into the second surface 131. An induction surface 221 of the proximity light assembly 2 is substantially parallel to the second surface 131. In this case, a light path when the emitted light enters the second surface 131 hardly changes, and the light deflects toward the direction close to the screen 20 when passing through the first surface 121 to form the emergent light, so that the emergent light has a larger front inclination angle α.

In this embodiment, because the emitted light is perpendicularly emitted into the second surface 131, a reflection loss of the emitted light is small and light utilization is high. An induction surface 221 of the proximity light assembly 2 is substantially parallel to the second surface 131, and a distance between the proximity light assembly 2 and the second surface 131 may be relatively small, so that arrangement between the proximity light assembly 2 and the lampshade 1 is more compact.

Figure 22:
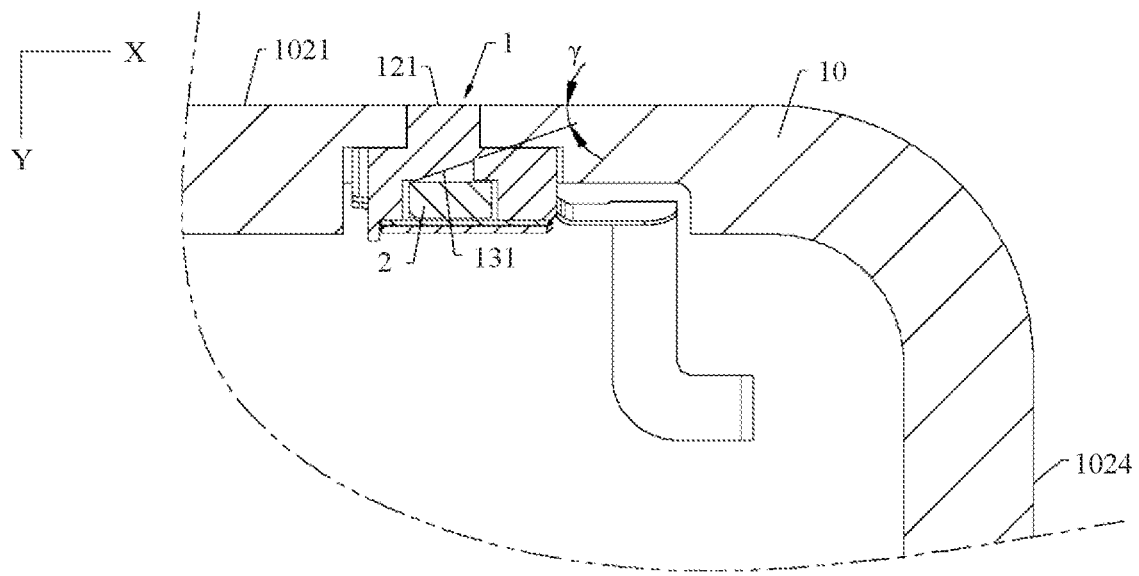
FIG. 22 is a cross-sectional view of a partial structure of the terminal shown in FIG. 9 along a B-B line in a fourth embodiment.
Figure 23:
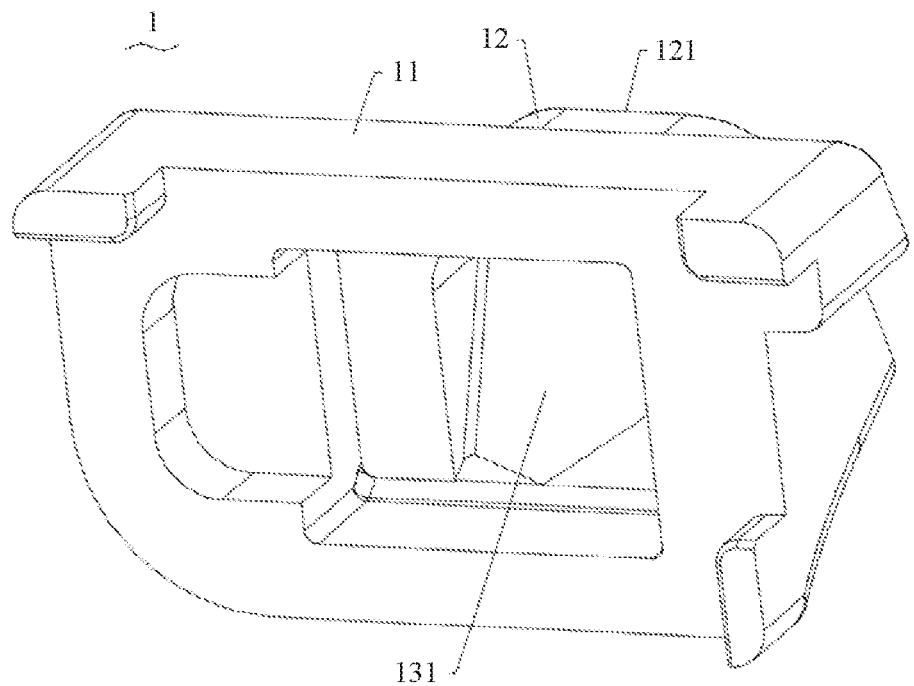
FIG. 23 is a schematic three-dimensional structural diagram of a lampshade shown in FIG. 22.
Figure 24:
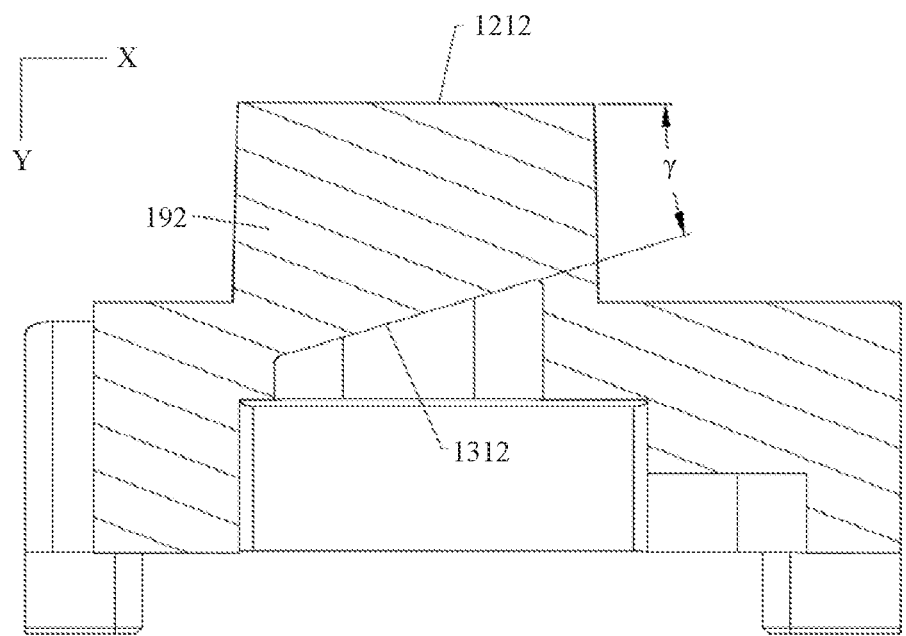
FIG. 24 is a schematic planar structural diagram of the lampshade shown in FIG. 23 cut along a second reference plane.
Figure 25:
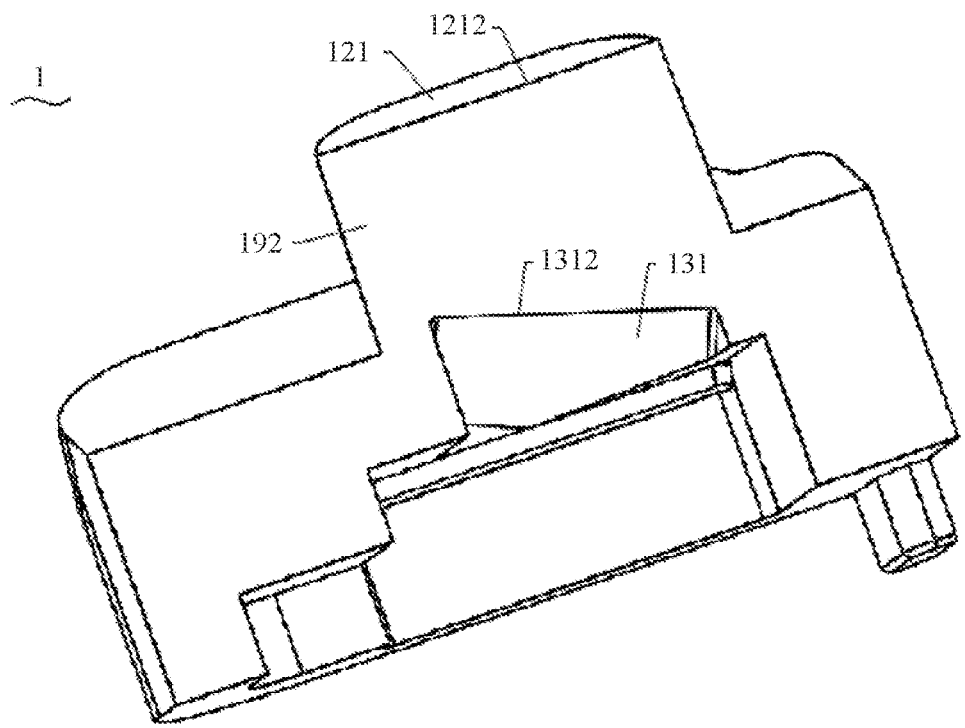
FIG. 25 is a schematic three-dimensional structural diagram of the lampshade shown in FIG. 23 cut along a second reference plane.

Referring to FIG. 9 and FIG. 22 to FIG. 25 together, FIG. 22 is a cross-sectional view of a partial structure of the terminal 100 shown in FIG. 9 along the B-B line in a fourth embodiment, FIG. 23 is a schematic three-dimensional structural diagram of the lampshade 1 shown in FIG. 22, FIG. 24 is a schematic planar structural diagram of the lampshade 1 shown in FIG. 23 cut along a second reference plane 192, and FIG. 25 is a schematic three-dimensional structural diagram of the lampshade 1 shown in FIG. 23 cut along the second reference plane 192. Most technical solution contents in this embodiment the same as those in the above embodiments are not described in detail.

A section of the lampshade 1 in the vertical direction (that is. Y direction) includes a second reference plane 192 perpendicular to the screen 20. The lampshade 1 includes a plurality of sections parallel to the vertical direction (that is, Y direction) and perpendicular to the screen 20, and the second reference plane 192 is one of the plurality of sections. The second reference plane 192 is parallel to the XY plane. The second reference plane 192 is perpendicular to the first reference plane 191. The second reference plane 192 coincides with the B-B line shown in FIG. 9. Therefore, the section of the lampshade 1 shown in FIG. 22 is the first reference plane 191. The structure of the lampshade 1 shown in FIG. 24 corresponds to that of the lampshade 1 shown in FIG. 22.

The first surface 121 intersects with the second reference plane 192 to form a third intersection line 1212. The second surface 131 intersects with the second reference plane 192 to form a fourth intersection line 1312. The third intersection line 1212 and the fourth intersection line 1312 gradually move away from each other in a direction close to the axial surface 1025. In other words, a second angle γ is formed between the third intersection line 1212 and the fourth intersection line 1312, and an opening of the second angle is toward the axial surface 1025.

In this embodiment of this application, when the lampshade 1 and the proximity light assembly 2 cannot be arranged in the middle of the terminal 100 (for example, to avoid a device such as a receiver arranged in the middle), the lampshade 1 and the proximity light assembly 2 may be arranged near the middle of the terminal 100. Because the third intersection line 1212 and the fourth intersection line 1312 gradually move away from each other in a direction close to the axial surface 1025, light passing through the first surface 121 and the second surface 131 may deflect in the direction of the second reference plane 192 toward the direction close to the axial surface 1025, that is, the light deflects in the XY plane toward the direction close to the middle position of the terminal 100, so that the proximity light assembly 2 can detect a space in front of the middle position of the terminal 100 to give consideration to experience of left and right hands and ears of the user and ensure better proximity sensing performance.

Figure 26A:
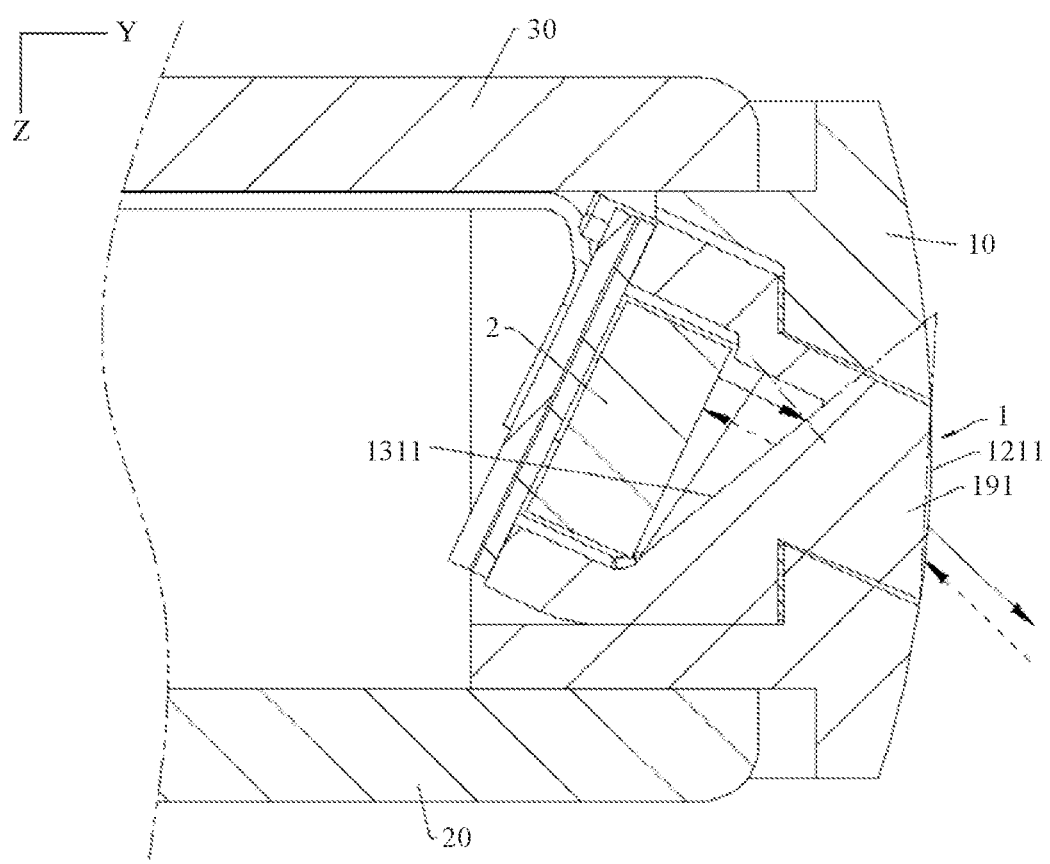
FIG. 26A is a cross-sectional view of a partial structure of the terminal shown in FIG. 9 along an A-A line in the fourth embodiment.
Figure 26B:
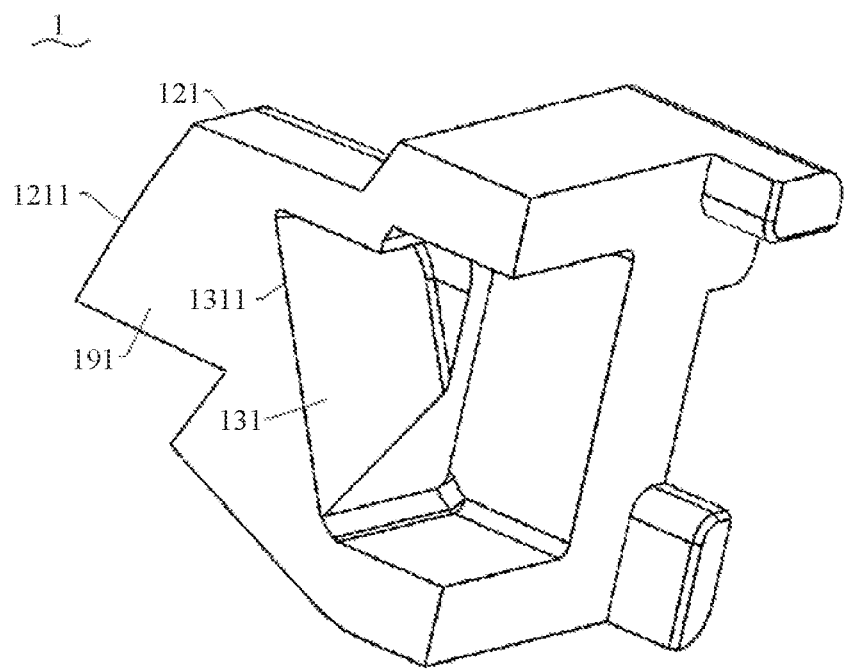
FIG. 26B is a schematic three-dimensional structural diagram of the lampshade shown in FIG. 23 cut along the first reference plane.

Referring to FIG. 26A and FIG. 26B together, FIG. 26A is a cross-sectional view of a partial structure of the terminal 100 shown in FIG. 9 along the A-A line in the fourth embodiment, and FIG. 26B is a schematic three-dimensional structural diagram of the lampshade 1 shown in FIG. 23 cut along the first reference plane 191. A section of the lampshade 1 in the vertical direction (that is, Y direction) includes a first reference plane 191 perpendicular to the screen 20. The first reference plane 191 coincides with the A-A line shown in FIG. 9. Therefore, the section of the lampshade 1 shown in FIG. 26A is the first reference plane 191. The first surface 121 intersects with the first reference plane 191 to form a first intersection line 1211. The second surface 131 intersects with the first reference plane 191 to form a second intersection line 1311. The first intersection line 1211 and the second intersection line 1311 gradually move away from each other in a direction close to the screen 20. In another embodiment, the first intersection line 1211 and the second intersection line 1311 may also be parallel to each other.

In this embodiment of this application, the terminal 100 may cause, through the relative position relationship between the first surface 121 and the second surface 131 of the lampshade 1 and the relative position relationship between the first surface 121, the second surface 131, and the plane 201 in which the screen 20 is located, the light passing through the first surface 121 and the second surface 131 to deflect in the YZ plane toward the direction close to the screen 20, thereby achieving front inclination. The terminal 100 may further cause, through the relative position relationship between the first surface 121 and the second surface 131 of the lampshade 1 and the relative position relationship between the second surface 131 and the axial surface 1025, the light passing through the first surface 121 and the second surface 131 to deflect in the XY plane toward the direction close to a middle position of the terminal 100, thereby implementing detection on the middle position of the terminal 100. Thus, the light can deflect in both the YZ plane and the XY plane through the setting of the first surface 121 and the second surface 131 of the lampshade 1, an exit angle of the emergent light of the proximity light assembly 2 after superimposition of the two not only ensures deflection toward the direction close to the screen 20, but also ensures an effect of deflection toward the direction close to the axial surface 1025, thereby ensuring reliability of detection of the proximity light assembly 2 in terms of two dimensional spaces.

In the design of relative position relationships between the first surface 121, the second surface 131, the screen 20, and the axial surface 1025, light filtering performance of the lampshade needs also to be taken into account at the same time, so that the light has a relatively large refraction deflection angle without too much light being filtered out (i.e., less refraction attenuation).

Figure 27A:
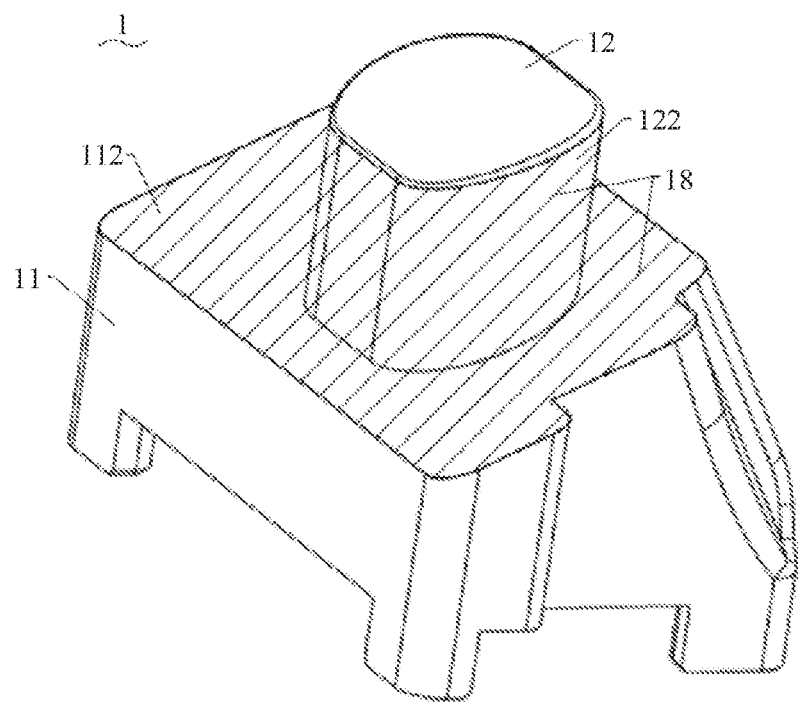
FIG. 27A is a schematic structural diagram of the lampshade shown in FIG. 23 in an implementation.
Figure 27B:
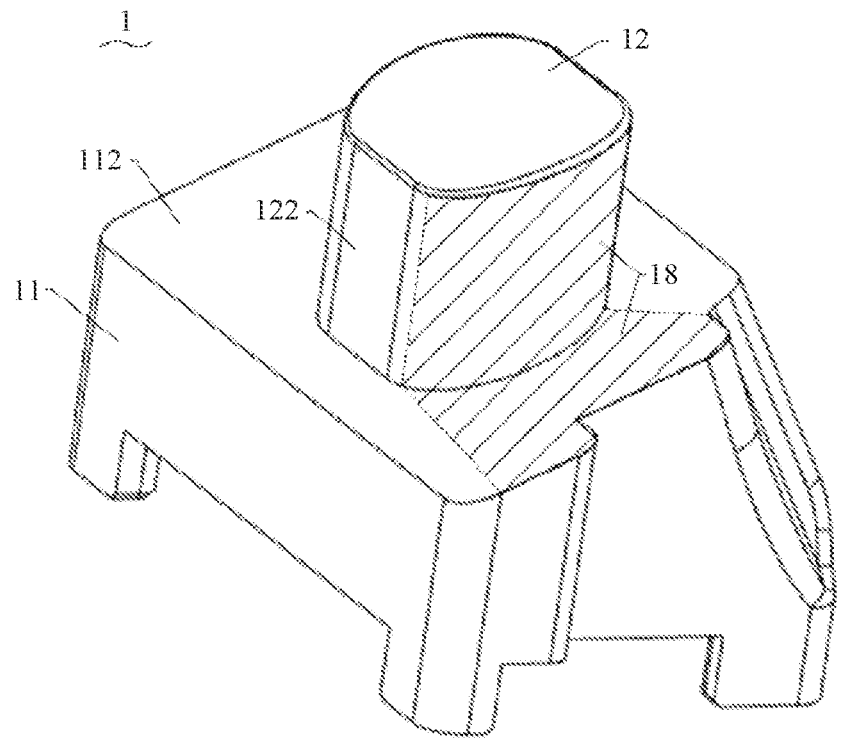
FIG. 27B is a schematic structural diagram of the lampshade shown in FIG. 23 in another implementation.
Figure 27C:
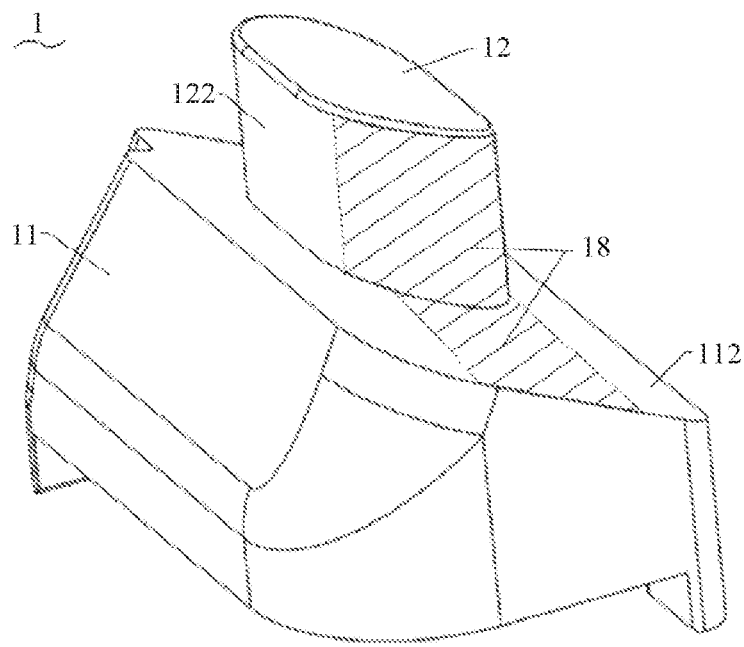
FIG. 27C is a schematic structural diagram of the lampshade shown in FIG. 27B from another perspective.

Referring to FIG. 27A and FIG. 27B together, FIG. 27A is a schematic structural diagram of the lampshade shown in FIG. 23 in an implementation, FIG. 27B is a schematic structural diagram of the lampshade shown in FIG. 23 in another implementation, and FIG. 27C is a schematic structural diagram of the lampshade shown in FIG. 27B from another perspective.

In the implementation shown in FIG. 27A, the light-absorbing layer 18 coats the entire fixed surface 112 and the entire limiting surface 122. FIG. 27A highlights a position of the light-absorbing layer 18 through regions covered by slashes.

In the implementations shown in FIG. 27B and FIG. 27C, the light-absorbing layer 18 coats one or more regions, in which noise reflection paths are relatively concentrated, of the fixed surface 112 and the limiting surface 122. FIG. 27B and FIG. 27C highlight the position of the light-absorbing layer 18 through regions covered by slashes. The light-absorbing layer 18 coats two regions of the limiting surface 122 and two regions of the fixed surface 112. In FIG. 27B, regions of the limiting surface 122 that are covered by the light-absorbing layer 18 are substantially toward the axial surface 1025 (refer to FIG. 9), and the regions of the fixed surface 112 that are coated by the light-absorbing layer 18 are adjacent to the regions of the limiting surface 122 that are covered by the light-absorbing layer 18. In FIG. 27C, the regions of the limiting surface 122 that are covered by the light-absorbing layer 18 are substantially toward the axial surface 1025 (refer to FIG. 9), and the regions of the fixed surface 112 that are coated by the light-absorbing layer 18 are adjacent to the regions of the limiting surface 122 that are covered by the light-absorbing layer 18. It may be understood that when the light-absorbing layer 18 covers the regions covered by the slashes in FIG. 27B and FIG. 27C, this is mainly used to suppress a stray light produced when the light deflects in the XY plane toward a direction close to the middle position of the terminal 100. When the light-absorbing layer 18 covers the regions covered by the slashes in FIG. 12B and FIG. 12C, this is mainly used to suppress stray light produced when the light deflects in the YZ plane toward a direction close to the screen 20. Therefore, the light-absorbing layer 18 may simultaneously covers the regions covered by the slashes in FIG. 12B, FIG. 12C, FIG. 27B, and FIG. 27C to absorb stray light produced by folding the light deflecting in the XY plane toward the direction close to the middle position of the terminal 100 and the light deflecting in the YZ plane toward the direction close to the screen 20.

Figure 28:
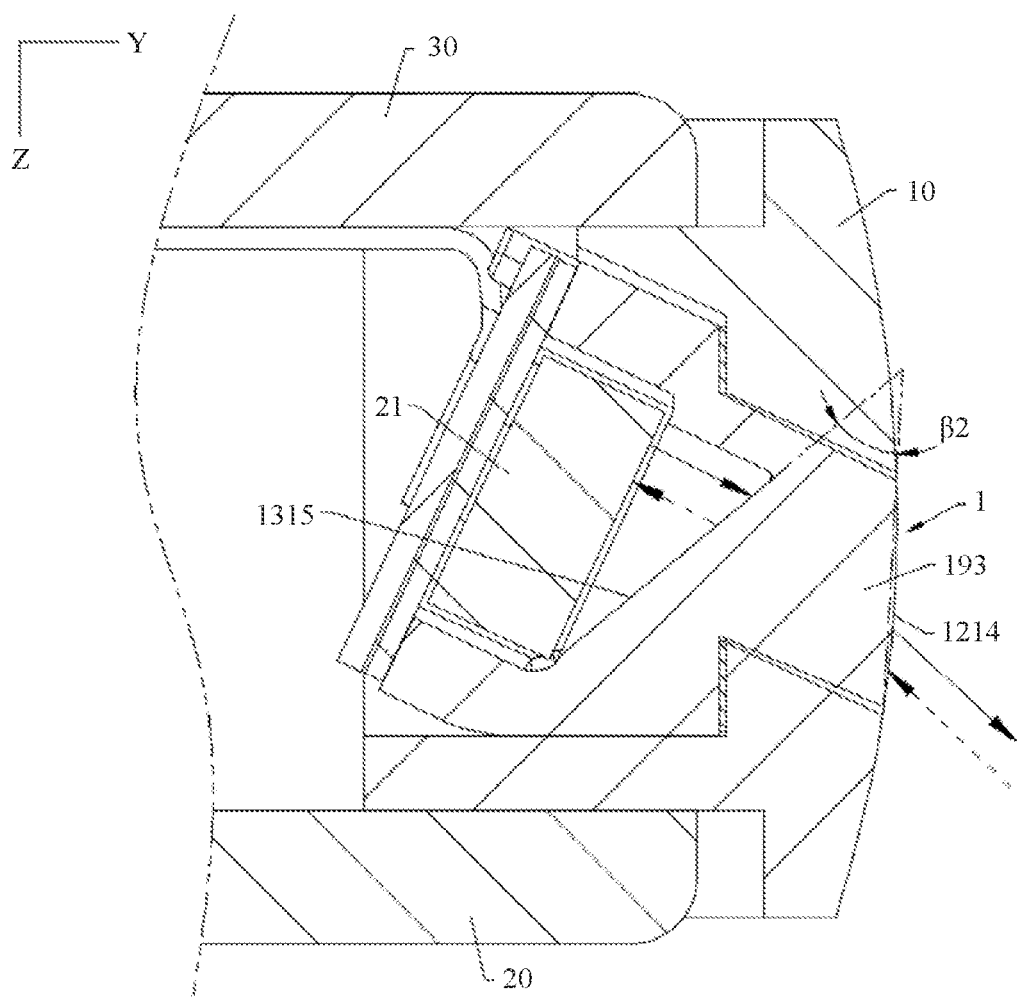
FIG. 28 is a cross-sectional view of a partial structure of the terminal shown in FIG. 9 along a C-C line in a fifth embodiment.
Figure 29:
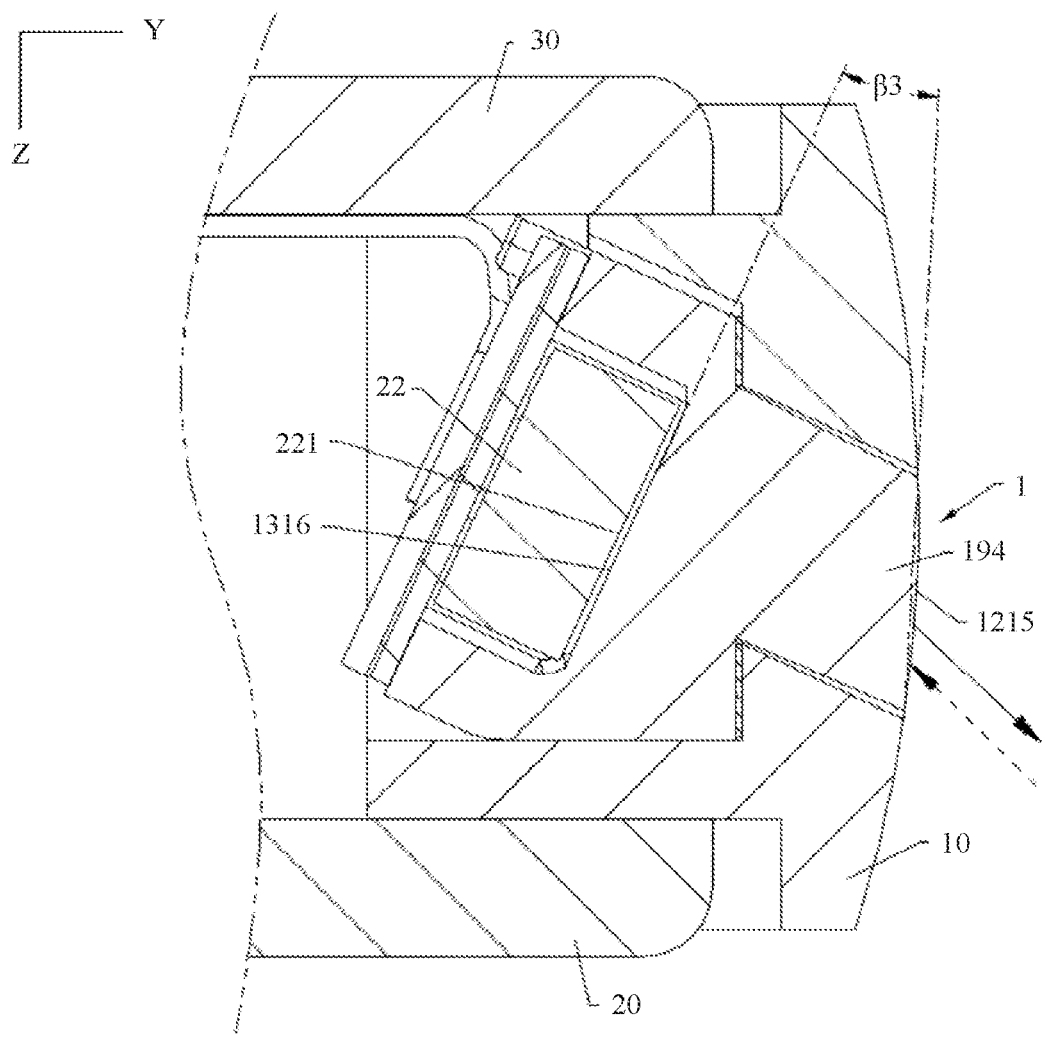
FIG. 29 is a cross-sectional view of a partial structure of the terminal shown in FIG. 9 along a D-D line in the fifth embodiment.
Figure 30:
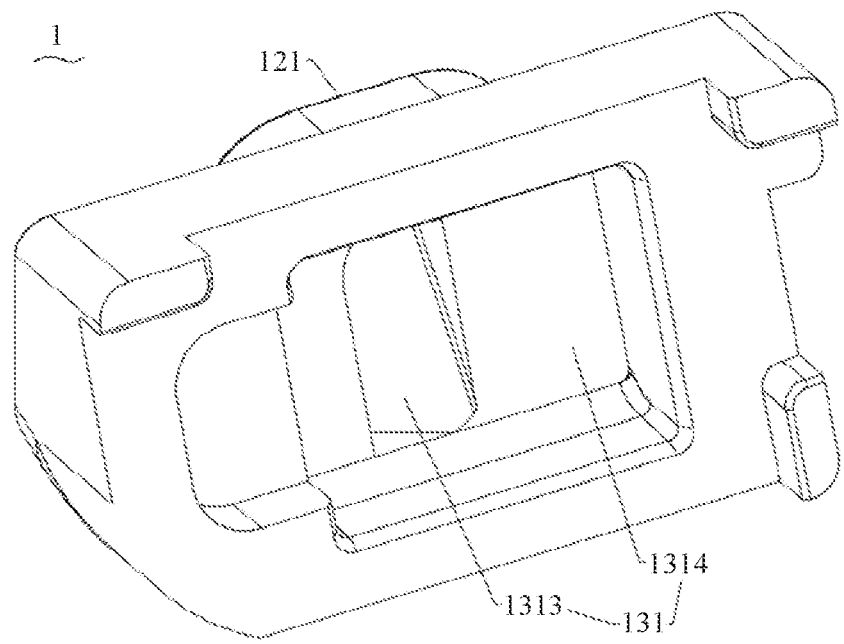
FIG. 30 is a schematic three-dimensional structural diagram of a lampshade shown in FIG. 28.
Figure 31:
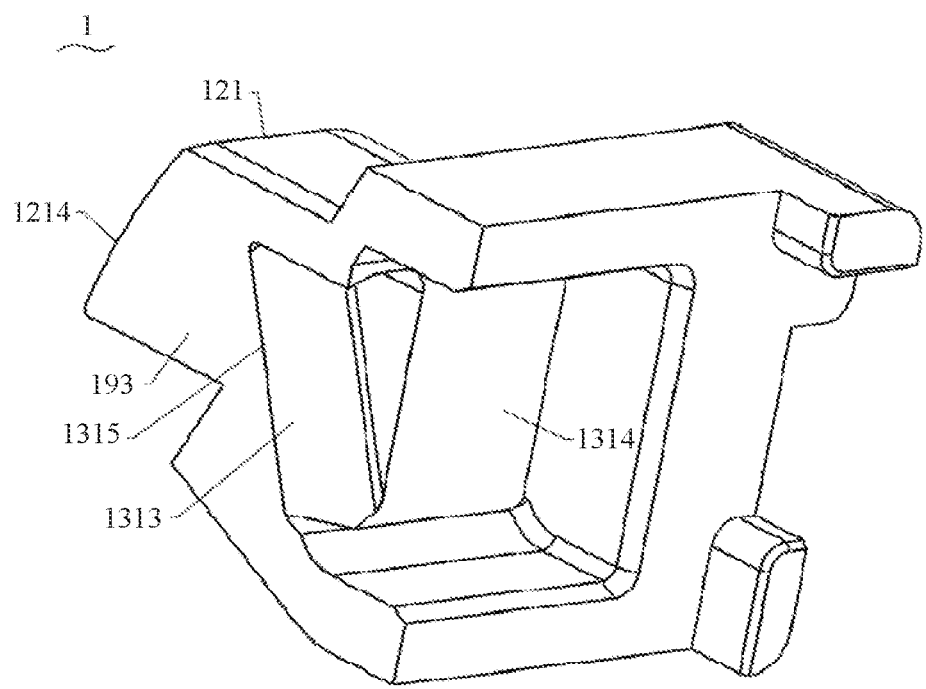
FIG. 31 is a schematic three-dimensional structural diagram of the lampshade shown in FIG. 30 cut along a third reference plane.

Referring to FIG. 28 to FIG. 31 together, FIG. 28 is a cross-sectional view of a partial structure of the terminal 100 shown in FIG. 9 along the C-C line in a fifth embodiment, FIG. 29 is a cross-sectional view of a partial structure of the terminal 100 shown in FIG. 9 along the D-D line in the fifth embodiment, FIG. 30 is a schematic three-dimensional structural diagram of the lampshade 1 shown in FIG. 28, and FIG. 31 is a schematic three-dimensional structural diagram of the lampshade 1 shown in FIG. 30 cut along a third reference plane 193. Most technical solution contents in this embodiment the same as those in the above embodiments are not described in detail.

A section of the lampshade 1 in the vertical direction (that is, Y direction) includes a third reference plane 193 and a fourth reference plane 194 that are perpendicular to the screen 20. The lampshade 1 includes a plurality of sections parallel to the vertical direction (that is, Y direction) and perpendicular to the screen 20. The third reference plane 193 is one of the plurality of sections, and the fourth reference plane 194 is another one of the plurality of sections. The third reference plane 193 and the fourth reference plane 194 are arranged at an interval. The third reference plane 193 and the fourth reference plane 194 are parallel to the YZ plane. The third reference plane 193 coincides with the C-C line shown in FIG. 9. Therefore, the section of the lampshade 1 shown in FIG. 28 is the third reference plane 193. The fourth reference plane 194 coincides with the D-D line shown in FIG. 9. Therefore, the section of the lampshade 1 shown in FIG. 29 is the fourth reference plane 194.

The second surface 131 includes an incident region 1313 and an exit region 1314. The incident region 1313 and the exit region 1314 may be disposed adjacent to each other or arranged at an interval. The emitted light is emitted into the lampshade 1 through the incident region 1313. The induced light exits the lampshade 1 through the exit region 1314. The incident region 1313 intersects with the third reference plane 193 to form a fifth intersection line 1315. The first surface 121 intersects with the third reference plane 193 to form a sixth intersection line 1214. The exit region 1314 intersects with the fourth reference plane 194 to form a seventh intersection line 1316. The first surface 121 intersects with the fourth reference plane 194 to form an eighth intersection line 1215.

The fifth intersection line 1315 and the sixth intersection line 1214 gradually move away from each other in a direction close to the screen 20. The seventh intersection line 1316 and the eighth intersection line 1215 gradually move away from each other in the direction close to the screen 20, and an included angle formed between the seventh intersection line 1316 and the eighth intersection line 1215 is less than that between the fifth intersection line 1315 and the sixth intersection line 1214. An included angle between the fifth intersection line 1315 and the sixth intersection line 1214 is a third angle β2, and an opening of the third angle β2 is toward the screen 20. An included angle between the seventh intersection line 1316 and the eighth intersection line 1215 is a fourth angle 133, and an opening of the fourth angle is toward the screen 20. The fourth angle β3 is less than the third angle β2.

In this embodiment, because the fifth intersection line 1315 and the sixth intersection line 1214 gradually move away from each other in the direction close to the screen 20, light passing through the incident region 1313 and the first surface 121 deflects by a first angle toward the direction close to the screen 20 in the YZ plane. Because the seventh intersection line 1316 and the eighth intersection line 1215 gradually move away from each other in the direction close to the screen 20, light passing through the exit region 1314 and the first surface 121 deflects by a second angle toward the direction close to the screen 20 in the YZ plane. Because the included angle between the seventh intersection line 1316 and the eighth intersection line 1215 is less than that between the fifth intersection line 1315 and the sixth intersection line 1214, the second angle is less than the first angle. The lampshade 1 enables the light passing through the incident region 1313 and the first surface 121 to deflect by a sufficient angle toward the direction close to the screen 20. The emergent light has a relatively large front inclination angle. Moreover, the induced light passing through the first surface 121 and the exit region 1314 is deflected to be smoothly received by the proximity light assembly 2, but a deflection angle of the induced light is relatively small, so as to reduce refraction attenuation of the induced light.

It may be understood that when the first surface 121 has a radian, the sixth intersection line 1214 is an arc line. In this embodiment of this application, to simplify a relative position relationship between the sixth intersection line 1214 and other structures, description is provided by making the sixth intersection line 1214 equal to a straight-line segment. The straight-line segment passes through two endpoints of the sixth intersection line 1214. For example, the fifth intersection line 1315 and the sixth intersection line 1214 gradually moving away from each other in the direction close to the screen 20 actually means that the fifth intersection line 1315 and the straight-line segment passing through the two endpoints of the sixth intersection line 1214 gradually move away from each other in the direction close to the screen 20. In the following embodiments, the description of the relative position relationship between the sixth intersection line and other structures may be understood with reference to the description in this paragraph.

When the first surface 121 has a radian, the eighth intersection line 1215 is an arc line. In this embodiment of this application, to simplify a relative position relationship between the eighth intersection line 1215 and other structures, description is provided by making the eighth intersection line 1215 equal to a straight-line segment. The straight-line segment passes through two endpoints of the eighth intersection line 1215. For example, the seventh intersection line 1316 and the eighth intersection line 1215 gradually moving away from each other in the direction close to the screen 20 actually means that the seventh intersection line 1316 and the straight-line segment passing through the two endpoints of the eighth intersection line 1215 gradually move away from each other in the direction close to the screen 20. In the following embodiments, the description of the relative position relationship between the eighth intersection line and other structures may be understood with reference to the description in this paragraph.

In an implementation, the exit region 1314 may be parallel to the induction surface 221 of the receiver 22 of the proximity light assembly 2, so that an induction direction of the receiver 22 is perpendicular to the exit region 1314 to reduce refraction attenuation of the induced light.

In an implementation, the incident region 1313 may be designed with reference to some features in the fourth embodiment, so that the light passing through the incident region 1313 deflects in the XY plane toward a direction close to the middle position of the terminal 100. The exit region 1314 may be perpendicular to the fourth reference plane 194.

In other implementations, both the first surface 121 and the second surface 131 are perpendicular to the third reference plane 193. In this case, when the fifth intersection line 1315 and the sixth intersection line 1214 gradually move away from each other in the direction close to the screen 20, the incident region 1313 and the first surface 121 also gradually move away from each other in the direction close to the screen 20, an included angle is formed between the incident region 1313 and the first surface 121, a partial structure between the incident region 1313 and the first surface 121 forms a structure similar to a prism, and the light further deflects toward the direction close to the screen 20 after passing through the incident region 1313 and the first surface 121. When the seventh intersection line 1316 and the eighth intersection line 1215 gradually move away from each other in the direction close to the screen 20, the exit region 1314 and the first surface 121 also gradually move away from each other in the direction close to the screen 20, an included angle is formed between the exit region 1314 and the first surface 121, a partial structure between the exit region 1314 and the first surface 121 forms a structure similar to a prism (the induction surface 221 of the proximity light assembly 2 may be parallel to the exit region 1314), and the light can deflect toward a direction away from the screen 20 after passing through the first surface 121 and the exit region 1314, so as to be received by the proximity light assembly 2.

Figure 32:
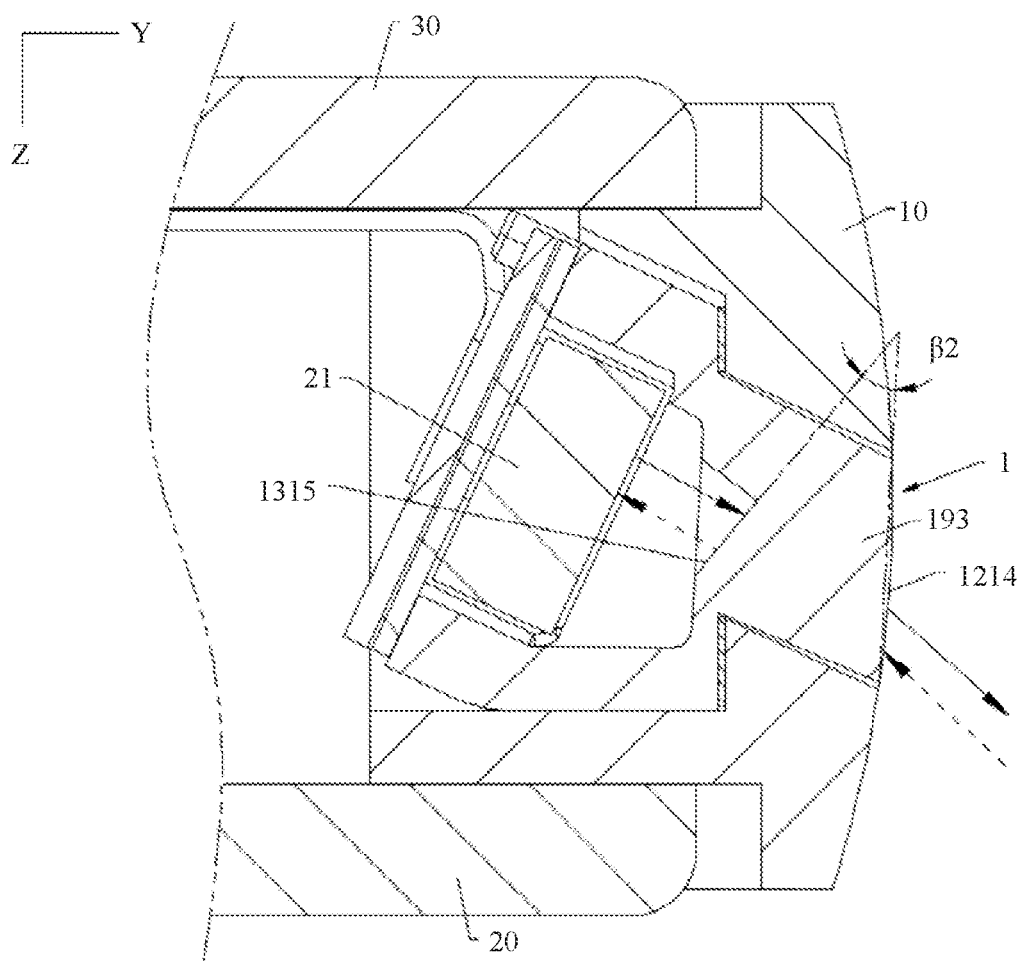
FIG. 32 is a cross-sectional view of a partial structure of the terminal shown in FIG. 9 along a C-C line in a sixth embodiment.
Figure 33:
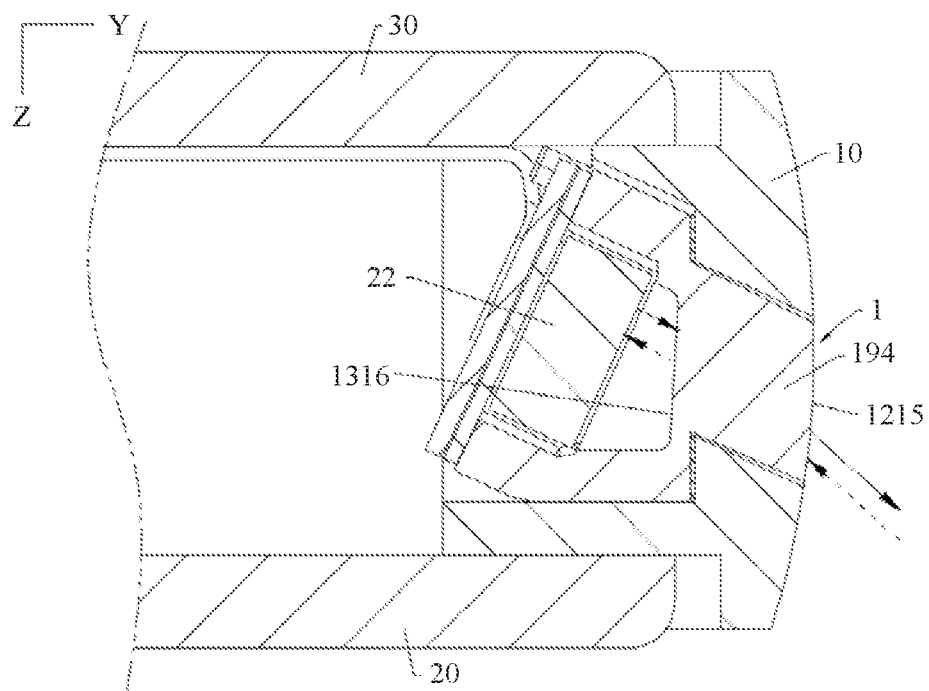
FIG. 33 is a cross-sectional view of a partial structure of the terminal shown in FIG. 9 along a D-D line in the sixth embodiment.
Figure 34:
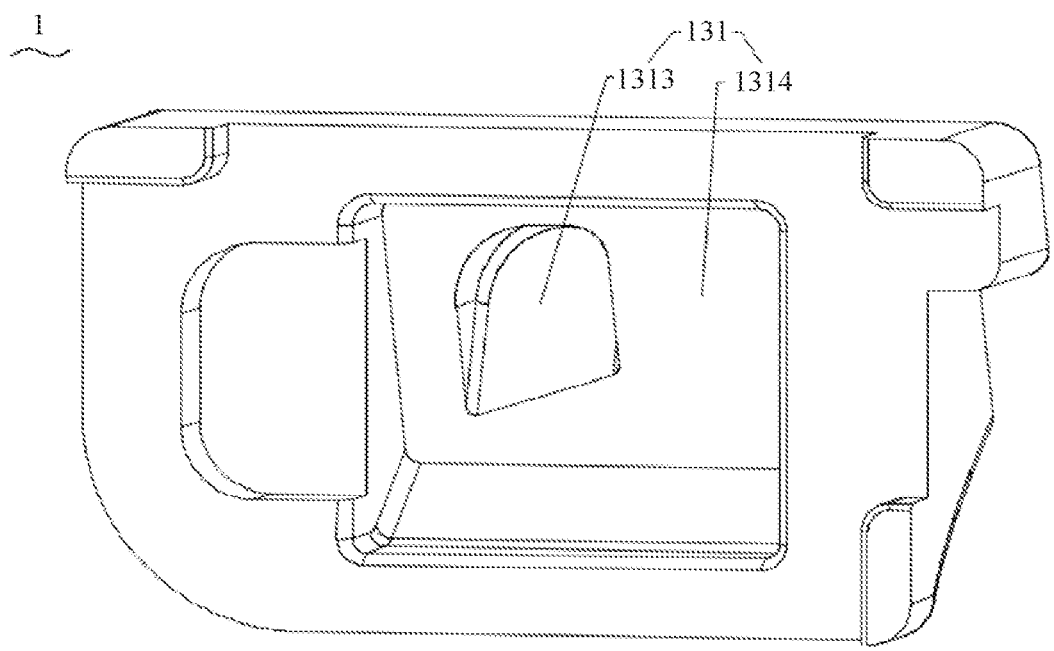
FIG. 34 is a schematic three-dimensional structural diagram of a lampshade shown in FIG. 32.
Figure 35:
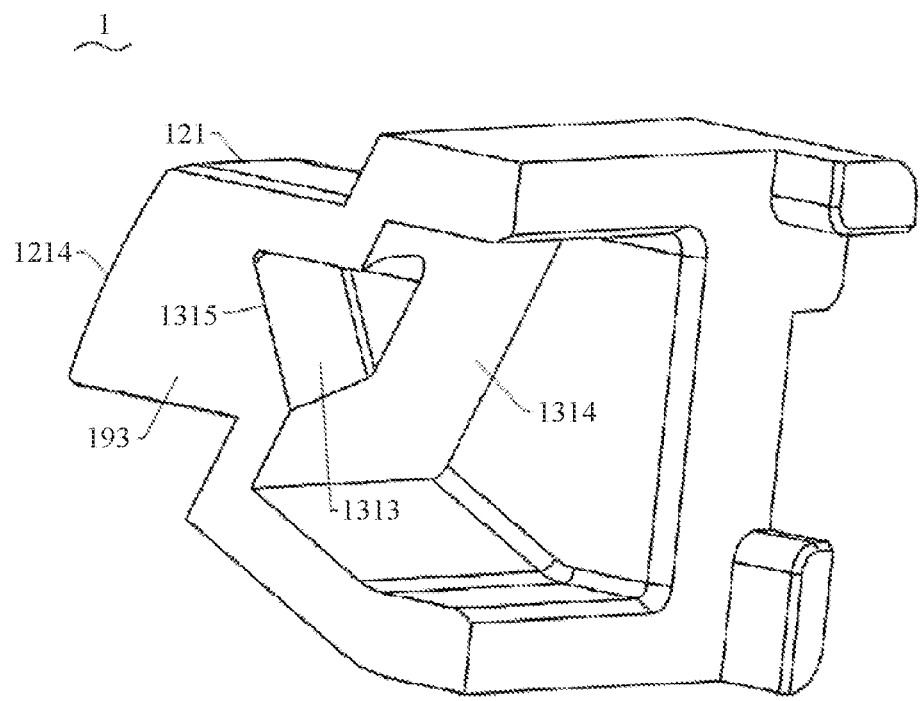
FIG. 35 is a schematic three-dimensional structural diagram of the lampshade shown in FIG. 34 cut along the third reference plane.

Referring to FIG. 32 to FIG. 35 together, FIG. 32 is a cross-sectional view of a partial structure of the terminal 100 shown in FIG. 9 along the C-C line in a sixth embodiment, FIG. 33 is a cross-sectional view of a partial structure of the terminal 100 shown in FIG. 9 along the D-D line in the sixth embodiment, FIG. 34 is a schematic three-dimensional structural diagram of the lampshade 1 shown in FIG. 32, and FIG. 35 is a schematic three-dimensional structural diagram of the lampshade 1 shown in FIG. 34 cut along the third reference plane 193. Most technical solution contents in this embodiment the same as those in the above embodiments are not described in detail.

The incident region 1313 intersects with the third reference plane 193 to form a fifth intersection line 1315. The first surface 121 intersects with the third reference plane 193 to form a sixth intersection line 1214. The exit region 1314 intersects with the fourth reference plane 194 to form a seventh intersection line 1316. The first surface 121 intersects with the fourth reference plane 194 to form an eighth intersection line 1215. The fifth intersection line 1315 and the sixth intersection line 1214 gradually move away from each other in a direction close to the screen 20. An included angle between the fifth intersection line 1315 and the sixth intersection line 1214 is a third angle, and an opening of the third angle is toward the screen 20. The seventh intersection line 1316 is parallel to the eighth intersection line 1215.

In this embodiment, because the fifth intersection line 1315 and the sixth intersection line 1214 gradually move away from each other in the direction close to the screen 20, light passing through the incident region 1313 and the first surface 121 deflects by a first angle toward the direction close to the screen 20 in the YZ plane. Because the seventh intersection line 1316 is parallel to the eighth intersection line 1215, the light passing through the exit region 1314 and the first surface 121 does not deflect or almost does not deflect in the YZ plane. The lampshade 1 causes the light passing through the incident region 1313 and the first surface 121 to deflect by a sufficient angle toward the direction close to the screen 20. The emergent light has a relatively large front inclination angle. Moreover, the induced light passing through the first surface 121 and the exit region 1314 does not deflect or almost does not deflect, thereby reducing refraction attenuation of the induced light.

In another embodiment, the fifth intersection line 1315 and the sixth intersection line 1214 may also gradually move away from each other in the direction close to the screen 20. A middle region of the seventh intersection line 1316 and the eighth intersection line 1215 protrudes toward a direction in which the seventh intersection line and the eighth intersection line depart from each other. In this case, a structure similar to a prism is substantially formed between the incident region 1313 and the first surface 121, and a structure similar to a convex lens is substantially formed between the exit region 1314 and the first surface 121.

Figure 36:
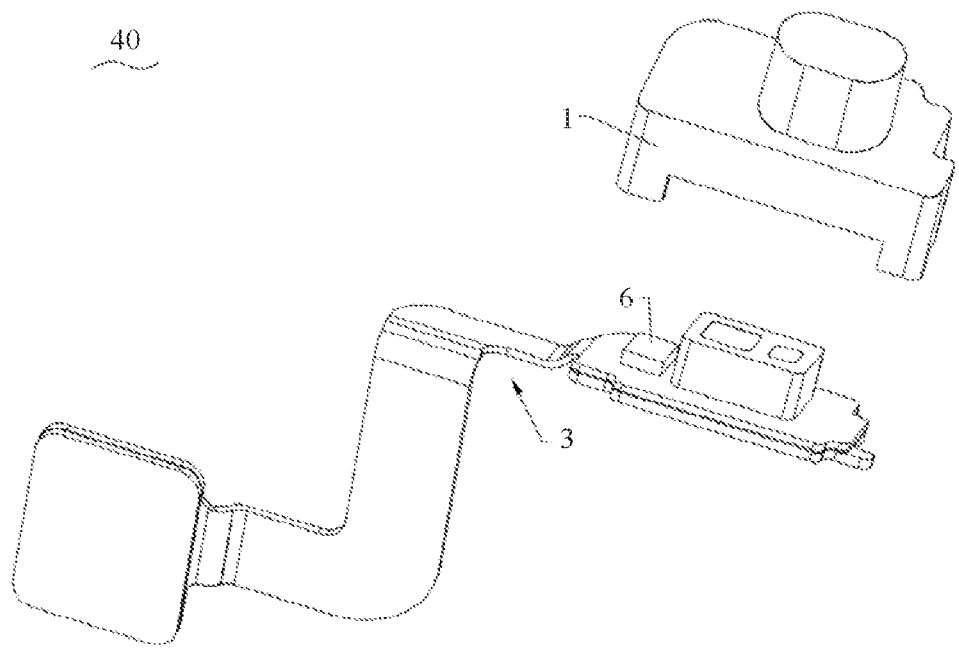
FIG. 36 is a schematic structural diagram of the proximity light module shown in FIG. 2 in another embodiment.
Figure 37:
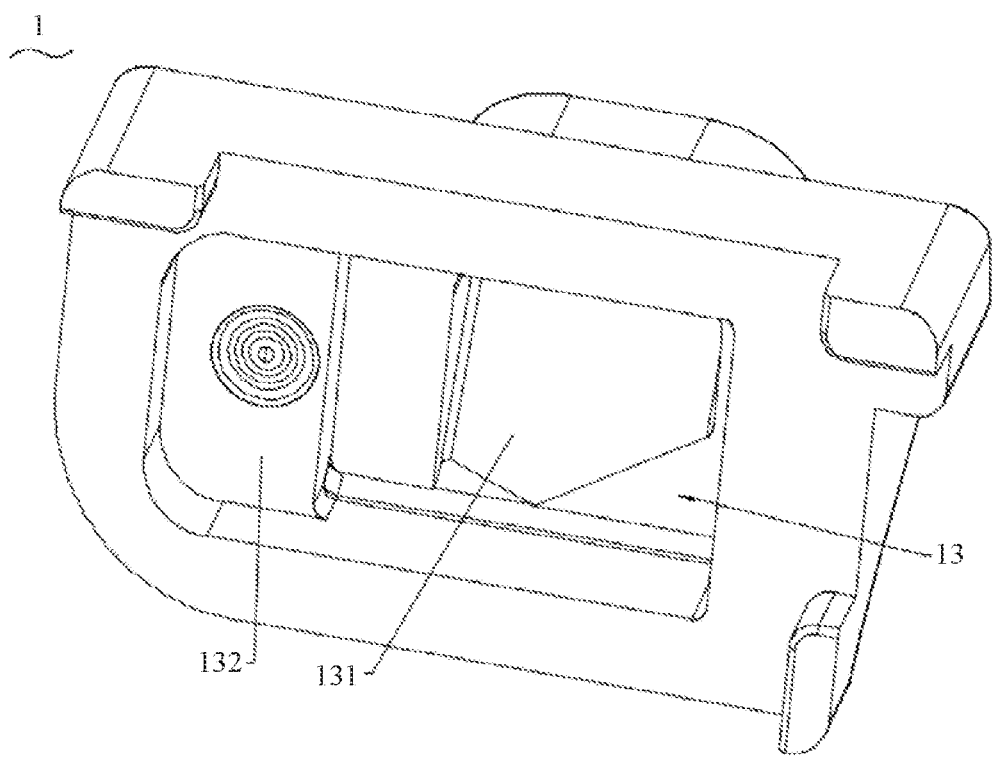
FIG. 37 is a schematic structural diagram of a lampshade shown in FIG. 36.

Referring to FIG. 36 and FIG. 37 together, FIG. 36 is a schematic structural diagram of the proximity light module 40 shown in FIG. 2 in another embodiment, and FIG. 37 is a schematic structural diagram of the lampshade 1 shown in FIG. 36. Most technical solution contents in this embodiment the same as those in the above embodiments are not described in detail.

The bottom wall of the mounting slot 13 of the lampshade 1 further includes a third surface 132. The third surface 132 and the second surface 131 are arranged in a staggered manner. The terminal 100 further includes an infrared emitting lamp 6. The infrared emitting lamp 6 is accommodated in the mounting slot 13 and fastened to the circuit board 3. The infrared emitting lamp 6 is configured to emit infrared light to the third surface 132.

In this embodiment of this application, the infrared emitting lamp 6 may be configured to implement an infrared remote control function. The infrared emitting lamp 6 and an infrared proximity assembly share the lampshade 1 and the circuit board 3, so that the infrared remote control function and a proximity sensing function can be integrated into a module to simplify an assembly process of the terminal 100 and also achieve a more uniform effect on the appearance of the terminal 100.

Fresnel waves may be provided on the third surface 132 to diffuse infrared light emitted by the infrared emitting lamp 6.

Figure 38:
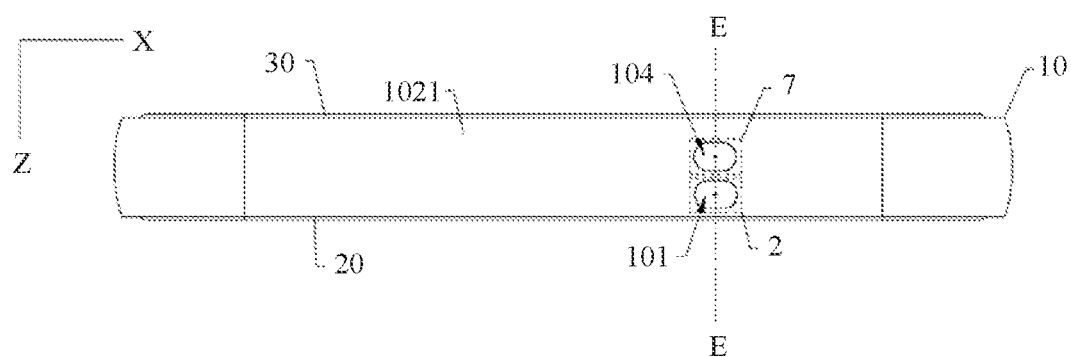
FIG. 38 is a schematic structural diagram of the terminal according to this application in yet another embodiment.
Figure 39:
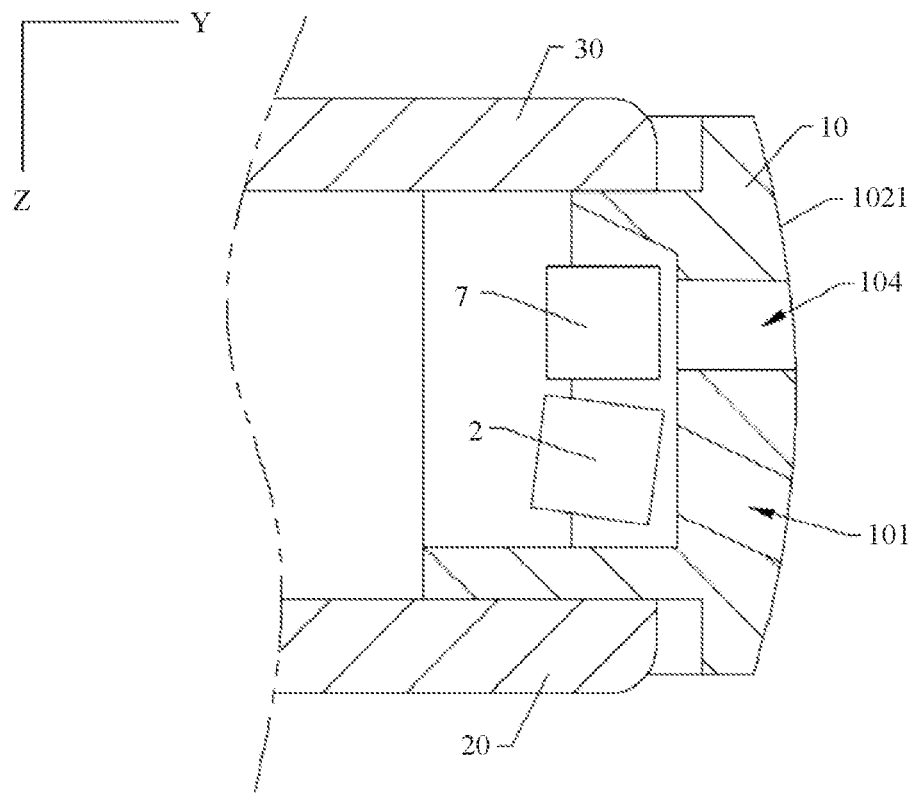
FIG. 39 is a cross-sectional view of a partial structure of the terminal shown in FIG. 38 along an E-E line.

Referring to FIG. 38 and FIG. 39 together, FIG. 38 is a schematic structural diagram of the terminal 100 according to embodiments of this application in yet another embodiment, and FIG. 39 is a cross-sectional view of a partial structure of the terminal 100 shown in FIG. 38 along the E-E line. Most technical solution contents in this embodiment the same as those in the above embodiments are not described in detail.

The terminal 100 further includes a proximity light assembly 2 (refer to the above embodiments) and an auxiliary proximity light assembly 7. One side of the bezel 10 provided with the through hole 101 is provided with a communicating hole 104. For example, the through hole 101 is provided on a top side of the bezel 10, that is, when the opening of the through hole 101 is disposed on the top surface 1021 of the bezel 10, an opening of the communicating hole 104 is also disposed on the top surface 1021. The communicating hole 104 and the through hole 101 are arranged at an interval. The auxiliary proximity light assembly 7 is located on the inner side of the bezel 10 and emits and receives infrared light through the communicating hole 104. A direction in which the auxiliary proximity light assembly 7 emits the infrared light is parallel to the screen 20.

In this embodiment, the auxiliary proximity light assembly 7 and the proximity light assembly 2 are combined for use, so that an approach direction of the obstacle can be determined, thereby reducing a probability of detection errors. For example, the auxiliary proximity light assembly 7 can detect a space directly above the top of the terminal 100, and the proximity light assembly 2 can detect a space obliquely above the terminal 100. When an obstacle approaches or moves away from directly above, an energy change sensed by the auxiliary proximity light assembly 7 is greater than that sensed by the proximity light assembly 2, and the terminal 100 does not activate a function corresponding to the obstacle approaching the screen 20 (for example, screen-off or screen-on in a call). When the obstacle approaches or moves away from the front of the screen 20, an energy change sensed by the auxiliary proximity light assembly 7 is smaller than that sensed by the proximity light assembly 2, and the terminal 100 may activate the function corresponding to the obstacle approaching the screen 20 (for example, screen-off or screen-on in a call).

Figure 40:
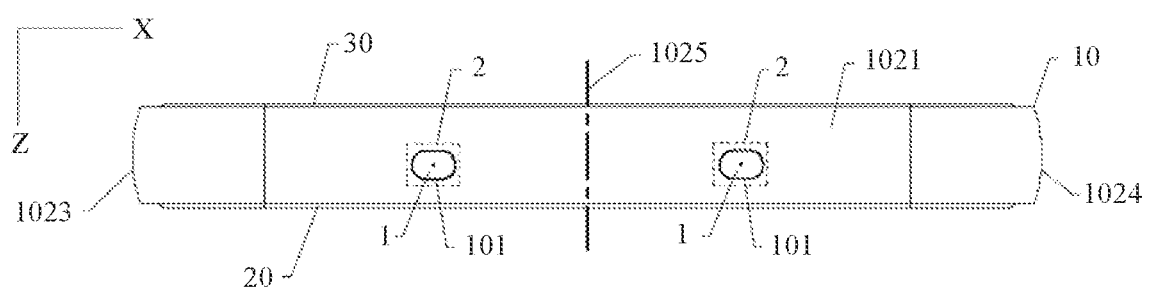
FIG. 40 is a schematic structural diagram of the terminal according to this application in yet another embodiment.

FIG. 40 is a schematic structural diagram of the terminal 100 according to this application in yet another embodiment. Most technical solution contents in this embodiment the same as those in the above embodiments are not described in detail.

The bezel 10 of the terminal 100 includes a left side surface 1023 and a right side surface 1024 disposed opposite to each other. The left side surface 1023 and the right side surface 1024 are connected between the top surface 1021 and the bottom surface (not shown). A center plane of the tell side surface 1023 and the right side surface 1024 is an axial surface 1025.

A quantity of the through holes 101 is two. The two through holes 101 are located on two sides of the axial surface 1025 respectively. A quantity of the lampshades 1 is two. The two lampshades 1 are mourned into the two through holes 101 respectively. A quantity of the proximity light assemblies 2 is two. The two proximity light assemblies 2 transmit light through the two lampshades 1 respectively.

In this implementation, two groups of proximity induction assemblies (including the lampshade 1 and the proximity light assembly 2) are arranged on two sides of the axial surface 1025 of the terminal 100 respectively, so as to give consideration of experience of left and right hands and ears of the user, and proximity detection performance can be ensured through collaborative determination of the two groups of proximity induction assemblies.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. The implementations of this application and features of the implementations can be combined with each other without a conflict. Therefore, the protection scope of the present invention shall be subject to the protection scope of the claims.

What is claimed is:

1. A terminal, comprising:
    a bezel comprising:
        a through hole; and
        an inner side;
    a screen comprising a periphery coupled to the bezel, wherein the screen is located on a plane;
    a lampshade coupled to the inner side and partially accommodated in the through hole; and
    a proximity light assembly coupled to the inner side and configured to:
        emit emitted light towards and through the lampshade to form emergent light, wherein the emergent light intersects with the plane; and
        receive induced light through the lampshade.

2. The terminal of claim 1, wherein the lampshade comprises a first surface and a second surface disposed opposite to each other, wherein the first surface is flush with an outer surface of the bezel, wherein the emitted light enters the lampshade through the second surface, and wherein the emergent light exits the lampshade through the first surface.

3. The terminal of claim 2, wherein the emergent light and the plane form an angle greater than or equal to 25 degrees (°).

4. The terminal of claim 2, wherein the through hole comprises a side opening, and wherein the bezel further comprises:
   a top surface, wherein the side opening is disposed on the top surface; and
   a bottom surface disposed opposite to the top surface,
   wherein a perpendicular direction of the top surface facing the bottom surface is a vertical direction,
   wherein a section of the lampshade in the vertical direction comprises a first reference plane perpendicular to the screen,
   wherein the first surface intersects with the first reference plane to form a first intersection line,
   wherein the second surface intersects with the first reference plane to form a second intersection line,
   wherein the first intersection line is parallel to the second intersection line, and
   wherein an emission direction of the emitted light intersects with the plane.

5. The terminal of claim 2, wherein the emergent light and the plane form an angle greater than or equal to 45 degrees (°).

6. The terminal of claim 2, wherein the bezel further comprises:
   a top surface, wherein the through hole is disposed on the top surface; and
   a bottom surface disposed opposite to the top surface,
   wherein a perpendicular direction of the top surface facing the bottom surface is a vertical direction,
   wherein a section of the lampshade in the vertical direction comprises a first reference plane perpendicular to the screen,
   wherein the first surface intersects with the first reference plane to form a first intersection line,
   wherein the second surface intersects with the first reference plane to form a second intersection line, and
   wherein the first intersection line and the second intersection line move away from each other in a direction adjacent to the screen.

7. The terminal of claim 6, wherein the proximity light assembly is configured to emit the emitted light perpendicularly into the second surface.

8. The terminal of claim 6, wherein the first intersection line and the second intersection line form an included angle greater than or equal to 45 degrees (°).

9. The terminal of claim 4, wherein both the first surface and the second surface are perpendicular to the first reference plane.

10. The terminal of claim 9, wherein the bezel further comprises:
    a left side surface; and
    a right side surface disposed opposite to the left side surface,
    wherein the left side surface and the right side surface each are coupled between the top surface and the bottom surface,
    wherein a center plane of the left side surface and the right side surface is an axial surface,
    wherein the through hole comprises an axis, and
    wherein the axis is located:
       on the axial surface;
       between the axial surface and the left side surface, wherein a first distance between the axis and the axial surface is less than a second distance between the axis and the left side surface; or
       between the axial surface and the right side surface, wherein a third distance between the axis and the axial surface is less than a fourth distance between the axis and the right side surface.

11. The terminal of claim 4, wherein the bezel further comprises:
    a left side surface; and
    a right side surface disposed opposite to the left side surface,
    wherein the left side surface and the right side surface each are coupled between the top surface and the bottom surface,
    wherein a center plane of the left side surface and the right side surface is an axial surface,
    wherein the through hole comprises an axis,
    wherein the axis and the axial surface are arranged at an interval,
    wherein the section of the lampshade in the vertical direction comprises a second reference plane parallel to the screen,
    wherein the first surface intersects with the second reference plane to form a third intersection line,
    wherein the second surface intersects with the second reference plane to form a fourth intersection line, and
    wherein the third intersection line and the fourth intersection line move away from each other in a direction adjacent to the axial surface.

12. The terminal of claim 2, wherein the bezel further comprises:
    a top surface, wherein the through hole is disposed on the top surface; and
    a bottom surface disposed opposite to the top surface,
    wherein a perpendicular direction of the top surface facing the bottom surface is a vertical direction,
    wherein the second surface comprises:
       an incident region, wherein the emitted light is emitted into the lampshade through the incident region; and
       an exit region, wherein the induced light exits the lampshade through the exit region,
    wherein a section of the lampshade in the vertical direction comprises a third reference plane and a fourth reference plane that are each perpendicular to the screen,
    wherein the third reference plane and the fourth reference plane are arranged at an interval,
    wherein the incident region intersects with the third reference plane to form a fifth intersection line,
    wherein the first surface intersects with the third reference plane to form a sixth intersection line,
    wherein the exit region intersects with the fourth reference plane to form a seventh intersection line,
    wherein the first surface intersects with the fourth reference plane to form an eighth intersection line,
    wherein the fifth intersection line and the sixth intersection line move away from each other in a direction adjacent to the screen,
    wherein the seventh intersection line and the eighth intersection line move away from each other in the direction adjacent to the screen, and
    wherein either an included angle between the seventh intersection line and the eighth intersection line is less than an included angle between the fifth intersection line and the sixth intersection line or the seventh intersection line is parallel to the eighth intersection line.

13. The terminal of claim 2, wherein the lampshade comprises:
fixed portion located on an inner side of the bezel; and
an embedded portion fixedly coupled to the fixed portion and partially or wholly accommodated in the through hole,
wherein the embedded portion comprises a first end face that is away from the fixed portion and that comprises the first surface,
wherein the fixed portion comprises a second end face that is away from the embedded portion and that is provided with an inward mounting slot,
wherein the inward mounting slot comprises a bottom wall that comprises the second surface, and
wherein the proximity light assembly is accommodated in the mounting slot.

14. The terminal of claim 13, wherein the fixed portion comprises a fixed surface, wherein the embedded portion is located on the fixed surface, wherein the embedded portion comprises a limiting surface coupled between the fixed surface and the second end face, wherein the lampshade further comprises a light-absorbing layer configured to absorb infrared light, and wherein the light-absorbing layer covers a part or all of the limiting surface and the fixed surface.

15. The terminal of claim 14, wherein the light-absorbing layer is a black ink material.

16. The terminal of claim 14, wherein the proximity light assembly is configured to emit the emitted light into the second surface at an incident angle less than or equal to 40 degrees (°).

17. The terminal of claim 13, wherein a projection of the embedded portion on the fixed surface falls within a range of the fixed surface.

18. The terminal of claim 17, further comprising a sealing member disposed around the embedded portion, wherein the sealing member is in a sealed connection to the fixed surface and the bezel.

19. The terminal of claim 13, further comprising a circuit board that is fastened to the first end face and that covers the mounting slot, wherein the proximity light assembly is fastened to the circuit board.

20. The terminal of claim 19, wherein the lampshade further comprises one or more heat stakes convexly disposed on the first end face, wherein the circuit board comprises one or more through holes, and wherein the one or more heat stakes pass through the one or more through holes.

* * * * *

UNITED STATES PATENT AND TRADEMARK OFFICE
CERTIFICATE OF CORRECTION

PATENT NO. : 11,265,415 B2
APPLICATION NO. : 17/260676
DATED : March 1, 2022
INVENTOR(S) : Chenlong Li and Xuanrui Fan Page 1 of 1

It is certified that error appears in the above-identified patent and that said Letters Patent is hereby corrected as shown below:

On the Title Page

Page 2, item (56) References Cited, Foreign Patent: "NO 2012025029 A1 3/2012" should read "WO 2012025029 A1 3/2012"

Signed and Sealed this
Seventeenth Day of May, 2022

Katherine Kelly Vidal
*Director of the United States Patent and Trademark Office*